US012785498B1

(12) United States Patent
Falls et al.

(10) Patent No.: US 12,785,498 B1
(45) Date of Patent: Nov. 3, 2026

(54) ELECTRIC MOTOR ASSEMBLIES, SYSTEMS INCLUDING ELECTRIC MOTOR ASSEMBLIES, AND METHODS OF OPERATING THE SAME

(71) Applicant: Flyer Next, LLC, Los Angeles, CA (US)

(72) Inventors: Bruce Churchill Falls, Dove Canyon, CA (US); Scott Kochan, Los Angeles, CA (US); Oded Nechushtan, Los Angeles, CA (US)

(73) Assignee: Flyer Next, LLC, Los Angeles, CA (US)

( * ) Notice: Subject to any disclaimer, the term of this patent is extended or adjusted under 35 U.S.C. 154(b) by 0 days.

(21) Appl. No.: 19/233,705

(22) Filed: Jun. 10, 2025

(51) Int. Cl.

*F16H 1/28* (2006.01)
*B60K 1/02* (2006.01)
*H02K 7/00* (2006.01)
*H02K 7/116* (2006.01)

(52) U.S. Cl.

CPC ............... *H02K 7/003* (2013.01); *B60K 1/02* (2013.01); *F16H 1/28* (2013.01); *H02K 7/116* (2013.01)

(58) Field of Classification Search

CPC .......... H02K 7/003; H02K 7/116; B60K 1/02; F16H 1/28

See application file for complete search history.

(56) References Cited

U.S. PATENT DOCUMENTS 4,691,119 A 9/1987 McCabria
5,463,914 A 11/1995 Tyan
11,472,544 B2 10/2022 Heironimus et al.
12,009,729 B1 * 6/2024 Falls ...................... H02K 7/116
12,224,649 B1 * 2/2025 Falls .................... F16H 57/021
2004/0077447 A1 4/2004 Redfern
2013/0175953 A1 7/2013 Astley et al.
2020/0212755 A1 7/2020 Okuhata et al.
2021/0039796 A1 * 2/2021 Hirabayashi ........... B64D 35/08
2021/0054908 A1 2/2021 Loacker
2021/0129664 A1 5/2021 Mepham et al.
2022/0074475 A1 3/2022 Downs et al.

(Continued)

FOREIGN PATENT DOCUMENTS

DE 102019121753 A1 3/2020
EP 4316884 B1 10/2024
WO WO-2019038001 A1 2/2019

OTHER PUBLICATIONS

International Search Report and Written Opinion of the International Searching Authority directed to Application No. PCT/US2024/038672, mailed Dec. 13, 2024; 14 pages.

(Continued)

*Primary Examiner* — Derek D Knight

(74) *Attorney, Agent, or Firm* — Sterne, Kessler, Goldstein & Fox P.L.L.C.

(57) ABSTRACT

An electric engine is disclosed. The electric engine can include multiple electric motor assemblies configured to drive a common output gear, each of the electric motor assemblies including multiple electric motors configured to drive a common sub-output gear. Individual motors and/or motor assemblies within the electric engine can be dynamically controlled to increase the electric engine's efficiency at a given torque and RPM output. Electronic control methods are also disclosed.

21 Claims, 26 Drawing Sheets

(56) References Cited

U.S. PATENT DOCUMENTS

| | | | |
|---|---|---|---|
| 2022/0219520 | A1 | 7/2022 | Wehlen et al. |
| 2025/0202316 | A1 | 6/2025 | Falls et al. |

OTHER PUBLICATIONS

Allison Transmission Holdings Inc.; "Allison Transmission Expands eGen Power e-Axle Portfolio to Address Wide Range of Vehicle Applications and Markets: Allison's eGen Power 100S to Serve Medium and Tandem-Axle Heavy-Duty Vehicles while 130D Serves Outside North America Markets"; https://www.allisontransmission.com/en-gb/company/news-article/2021/09/01/allison-transmission-expands-egen-power-e-axle-portfolio-to-address-wide-range-of-vehicle-applications-and-markets; Indianapolis, Aug. 31, 2021; 2 pages.

Mike Jeffries; "How to Determine Your Motor's Actual Load"; Mader electric, inc.; Motors & Pump Repairs in Sarasota, FL; Jul. 19, 2017; 7 pages.

International Search Report and Written Opinion of the International Searching Authority directed to International Patent Application No. PCT/US2026/030431, mailing date Sep. 11, 2026; 18 pages.

* cited by examiner

ELECTRIC MOTOR ASSEMBLIES, SYSTEMS INCLUDING ELECTRIC MOTOR ASSEMBLIES, AND METHODS OF OPERATING THE SAME

FIELD

Aspects relate to electric motors and implementations within an axle of an electric vehicle (EV).

BACKGROUND

The move towards clean energy is prompting interest, research, and development in the area of EVs, and specifically, systems used to propel EVs. Electric drive systems that can match or exceed the performance of internal combustion (IC) engines are critical to the success and adoption of EVs. EVs require electric drive systems that are energy efficient and can be produced and repaired in a cost efficient manner. In particular, the efficiency of electric drive systems is crucial for enabling EVs to travel for long distances without the need for the EVs' batteries to be recharged. Conventional electric motor assemblies typically consist of a single electric motor driving a gear set.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

DETAILED DESCRIPTION

Figure 1:
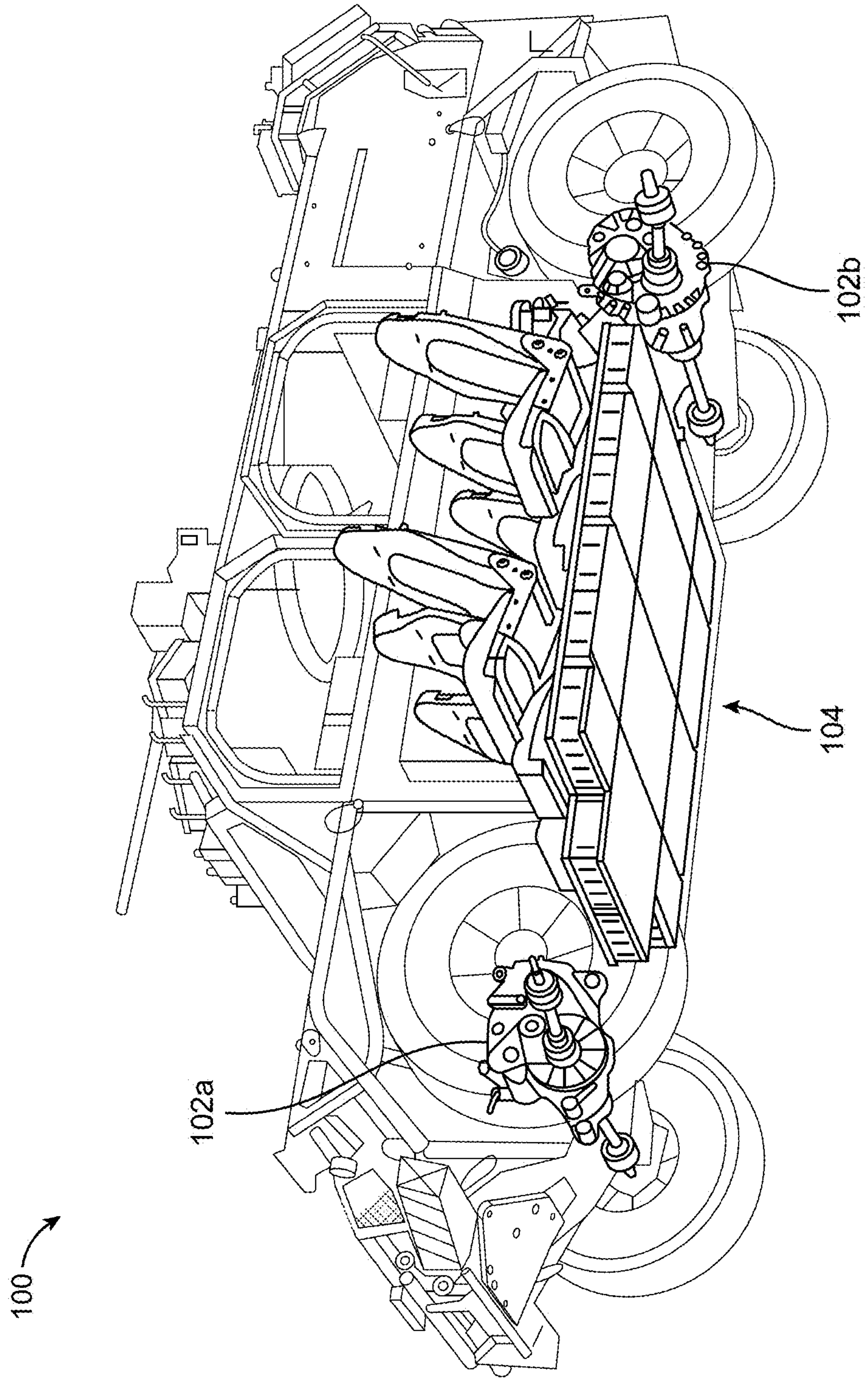
FIG. 1 shows an electric vehicle (EV) according to aspects of the disclosure.

Aspects disclosed herein provide a novel electric motor assembly. The electric motor assembly provides a novel construction over conventional electric motor assemblies, as will be described. This construction may provide several benefits.

First, it allows the electric motor assembly to potentially be less expensive to produce, implement, and repair. For example, the use of a plurality of smaller electric motors in place of a single, larger electric motor can allow for less expensive motors to be produced and/or purchased at higher volumes, reducing production and/or purchasing costs. Further, a wider variety of less expensive power electronic components are available for use with smaller electric motors, reducing costs of implementing electric motors within the electric motor assembly/electric drive system. If a motor within the assembly fails, it can be replaced at a cheaper cost. Additionally, the smaller size of the motors allows a single technician to handle and repair the motor assembly.

Second, the electric motor assembly can have higher power-to-weight ratios, due to the smaller size of the electric motors implemented within the electric motor assembly. Conventional electric motor assemblies have upper RPM operational limits based on the centrifugal forces that are applied to the rotor assemblies. The centrifugal force is directly related to the diameter and mass of the rotating assembly. This effectively limits the power-to-weight ratio because power is directly related to the operating RPM (output power=output torque×RPM). The smaller diameters of the motor rotors used in the present electric motor assembly can enable the electric motors to operate at higher RPM and generate more power for a given amount of magnetics (materials/mass) compared to a larger motor, while having approximately the same torque-to-weight ratio as the larger motor. Accordingly, a plurality of smaller motors can collectively provide the same power output as a single, larger motor while potentially weighing less than the larger motor.

Third, the electric motor assembly can have operational redundancy. Failure of a single electric motor of a plurality of electric motors does not necessarily result in the loss of function of the entire electric motor assembly, since the remaining electric motors of the plurality of electric motors can continue to operate. Thus, the operability of the electric drive system can be maintained through a motor failure.

Fourth, the difference between the peak and continuous power rating of the electric motor assembly can be smaller than for a conventional electric motor assembly. Given the same output power, a plurality of smaller electric motors produces less heat buildup than a single, larger electric motor. This is in part because the plurality of electric motors has a larger surface area, allowing for quicker dissipation of heat into surrounding materials (e.g., a housing, air, etc.), and cooling features can be provided closer to heat generating components. Additionally, this is because the plurality of smaller motors produces less waste heat due to the increases in operating efficiency described herein. The reduction in heat buildup can increase the power the electric motor assembly can provide continuously (e.g., without overheating).

Fifth, the electric motor assembly can be versatile. The use of a plurality of smaller electric motors in place of a single, larger electric motor can provide a single component that can be used in multiple EVs or types of EVs. For example, one or more of the plurality of electric motors can be removed based on the torque needs of the type of EV (e.g., an electric motorcycle can implement an electric motor assembly with fewer motors installed than an electric truck). Further, one or more of the plurality of electric motors can be removed based on the torque needs associated with a use environment (e.g., an electric car that operates primarily in a mountainous area can implement an electric motor assembly with more motors installed than an electric car that operates primarily in a flat region). The electric motor assembly can be easily reconfigured depending on the type and/or use environment of an EV since the electric motor assembly is designed to accommodate the attachment, detachment, and omission of individual electric motors.

Figure 6:
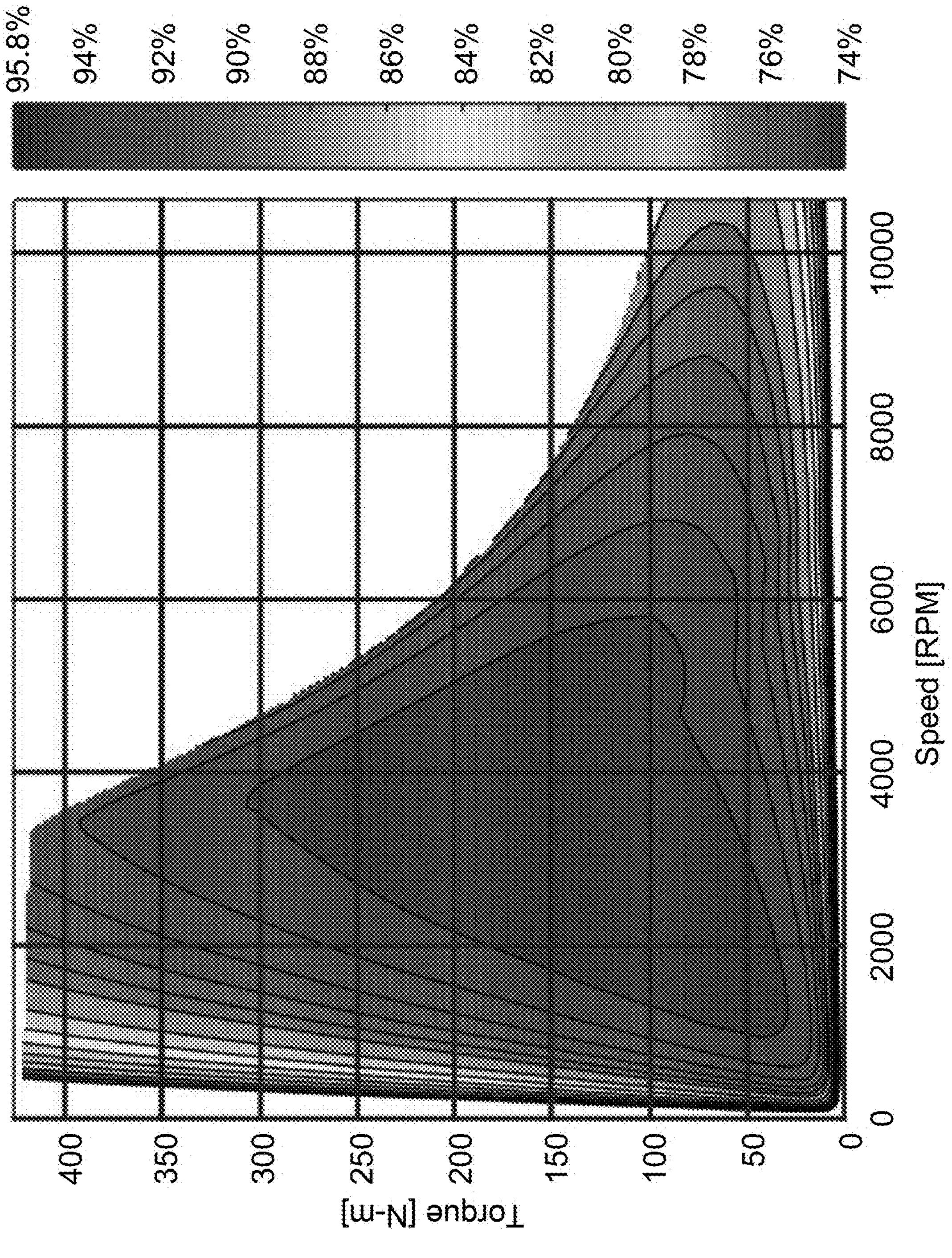
FIG. 6 shows a motor efficiency map according to aspects of the disclosure.

Sixth, the electric motor assembly can be dynamically configurable (i.e., it can be adapted in real-time to be better suited to meet a particular torque demand). The electric motor in a conventional electric motor assembly is typically chosen to meet the maximum torque and power needs of a device (e.g., an EV) implementing the electric motor assembly. However, conventional electric motors operate at varying efficiencies depending on output torque and RPM. This is shown in FIG. 6, which depicts a motor efficiency map. In the motor efficiency map, motor efficiency is graphed as a function of output torque (measured in N·m) and speed (angular velocity, measured in RPM). The efficiency of a conventional electric motor assembly implementing a single electric motor will therefore vary significantly depending on the torque and RPM demand placed on the electric motor. Conventional electric motor assemblies do not have a means of configuring the electric motor assembly in real-time to more efficiently provide the torque/power need. Accordingly, EV's implementing conventional electric motor assemblies will run less than peak efficiency at many operating points which results in decreased range for a given battery capacity.

Conversely, in an electric motor assembly in which a plurality of smaller motors replace a single, larger motor, the most efficient operating regime of the electric motor assembly (in terms of output torque and RPM) can be adjusted by selectively activating or deactivating one or more motors (effectively changing the "size" and motor efficiency map of the electric motor assembly). For example, the most efficient operating regime of the electric motor assembly can be tailored to include a torque requested from the electric motor assembly at a given operating RPM. In aspects, this can be performed by comparing motor efficiency maps corresponding to various unique subsets of the plurality of smaller motors and selecting a subset of the motors for simultaneous activation. The motor efficiency map for the selected subset can include a high efficiency region that corresponds to a torque requested from the electric motor assembly at a particular RPM. Additionally, since smaller motors can produce higher RPM more efficiently, as noted above, the efficiency of the electric motor assembly at low loads and high RPM can be improved. Operation at low loads and high RPM is an inefficient operating domain for an electric motor assembly implementing a single, large motor.

Seventh, the electric motor assembly can provide for gear reduction as part of the mechanical integration of a plurality of electric motors. For example, an output gear (coupled to an output shaft configured to transmit a torque to an external component) of the electric motor assembly can have more teeth than adjacent gears driven by electric motors. This can cause gear reduction between the adjacent gears and the output gear, eliminating at least one stage of gear reduction on a driveline between the electric motor assembly and an axle. This can reduce the complexity and number of components along the driveline between the electric motor assembly and the axle.

Eighth, because a central electric motor can be at a lower gear ratio with an output gear relative to peripheral motors, the central electric motor need not be in field weakening at high vehicle speeds when the electric motor assembly is implemented in an EV. Instead, as compared to an electric motor of a conventional EV, the central electric motor can output a lower RPM to achieve the same axle RPMs as the conventional EV. Accordingly, losses, increased heat generation, and associated reductions in efficiency of a drive system related to field weakening can be avoided. Field weakening, reducing the magnetic field produced by magnets within a motor, is often implemented (e.g., for permanent magnet motors) when motor RPM is high, to suppress excessive voltage being generated by the high-speed rotation of the magnets. An example scenario in which field weakening may conventionally be needed is driving on a highway or another flat road at a high speed. In some of such scenarios, the load on the EV (resistance to movement) can be low and few or only one of the plurality of smaller motors (e.g., the central electric motor) may be needed to propel the EV. This and similar scenarios typically make up a large part of the EV's operating conditions. In some of these scenarios, only the central motor must be operated, and it can be operated at a lower RPM (avoiding field weakening) than peripheral motors, because of the lower gear ratio, to achieve the same output RPM for the electric motor assembly. Accordingly, the efficiency and range of an EV can be increased by implementing the electric motor assembly of the present disclosure according to aspects, particularly at some of the most common operating conditions of the EV (e.g., high speeds and low loads).

In aspects, an electric motor assembly can include at least: a housing including a plurality of cavities; a gear assembly, the gear assembly including: an output gear coupled to an output shaft, and adjacent gears coupled to the output gear; the electric motor assembly further including: a plurality of electric motors at least partially within the plurality of cavities, the plurality of electric motors including: a first electric motor coupled to the output gear, and adjacent electric motors coupled to the adjacent gears; the electric motor assembly further including: a controller to activate and deactivate one or a pair of motors of the plurality of electric motors.

In aspects, an electric drive system can include at least: an electric motor assembly, the electric motor assembly including: a gear assembly including an output gear and one or more gears coupled to the output gear, the output gear being coupled to an output shaft, and a plurality of electric motors, each of the plurality of electric motors coupled to a gear of the gear assembly; the electric drive system further including: a control system to activate and deactivate one or more motors of the plurality of electric motors; an energy storage system coupled to the electric motor assembly; and a torque demand system to communicate a torque need to the control system to activate or deactivate the one or more motors.

In aspects, a method can include at least: installing an electric motor assembly in an electric drive unit, the electric motor assembly including: a housing including a plurality of cavities; a gear assembly, the gear assembly including: an output gear coupled to an output shaft, and adjacent gears coupled to the output gear; the electric motor assembly further including: a plurality of electric motors at least partially within the plurality of cavities, the plurality of electric motors including: a first electric motor coupled to the output gear, and adjacent electric motors coupled to the adjacent gears; the electric motor assembly further including: a controller to activate and deactivate one or a pair of motors of the plurality of electric motors.

In aspects, a vehicle can include at least: an electric motor assembly, the electric motor assembly including: a housing including a plurality of cavities; a gear assembly, the gear assembly including: an output gear coupled to an output shaft, and adjacent gears coupled to the output gear; the electric motor assembly further including: a plurality of electric motors at least partially within the plurality of cavities, the plurality of electric motors including: a first electric motor coupled to the output gear, and adjacent electric motors coupled to the adjacent gears; the electric motor assembly further including: a controller to activate and deactivate one or a pair of motors of the plurality of electric motors.

In aspects, an electric motor assembly can include at least: a housing including a plurality of cavities; a gear assembly including: a sun gear, planetary gears rotatably fixed relative to the housing and coupled to the sun gear, a ring gear including gear teeth on both an inner and outer side, the planetary gears enmeshed with the gear teeth on the inner side of the ring gear, and outer adjacent gears enmeshed with the gear teeth on the outer side of the ring gear; the electric motor assembly further including: a plurality of electric motors at least partially within the plurality of cavities, the plurality of electric motors including: a first electric motor coupled to the sun gear, and outer adjacent electric motors coupled to the outer adjacent gears; the electric motor assembly further including: a controller to activate and deactivate one or more motors of the plurality of electric motors.

In aspects, a vehicle can include at least: an electric drive system including: an electric motor assembly including: a gear assembly including a ring gear and a plurality of adjacent gears coupled to the ring gear, the ring gear being coupled to a drive plate to transmit torque to an external component, the plurality of adjacent gears including inner adjacent gears coupled to the ring gear inside a perimeter of the ring gear and one or more outer adjacent gears coupled to the ring gear outside a perimeter of the ring gear, the electric motor assembly further including a plurality of electric motors, each of the plurality of electric motors coupled to a gear of the gear assembly; the electric drive system further including: a control system to activate and deactivate one or more motors of the plurality of electric motors; an energy storage system coupled to the electric motor assembly; and a torque demand system to communicate a torque need to the control system to activate or deactivate the one or more motors, wherein the control system is configured to activate and deactivate the one or more motors based on the torque need such that a number of simultaneously activated motors of the plurality of electric motors depends on the torque need.

In aspects, an electric motor assembly can include at least: a housing including a plurality of cavities; a gear assembly including: an output gear coupled to a rotatable output shaft configured to transfer a torque to an external component, and a plurality of adjacent gears coupled to the output gear and to a plurality of rotatable adjacent shafts; the electric motor assembly further including: a plurality of electric motors at least partially within the plurality of cavities, each of the plurality of electric motors coupled to an adjacent gear of the plurality of adjacent gears via a rotatable adjacent shaft of the plurality of rotatable adjacent shafts; a controller to activate and deactivate one or more motors of the plurality of electric motors; and a plurality of clutches to mechanically engage and disengage the plurality of electric motors from the plurality of adjacent gears, each of the plurality of clutches selectively securing an adjacent gear of the plurality of adjacent gears relative to a rotatable adjacent shaft of the plurality of rotatable adjacent shafts.

In aspects, a vehicle can include at least: an electric drive system including: an electric motor assembly including: a gear assembly including an output gear and one or more adjacent gears coupled to the output gear, the output gear being coupled to a rotatable output shaft and the one or more adjacent gears being coupled to one or more rotatable adjacent shafts, the electric motor assembly further including: a plurality of electric motors including: one or more adjacent electric motors, each of the one or more adjacent electric motors coupled to an adjacent gear of the one or more adjacent gears via a rotatable adjacent shaft of the one or more rotatable adjacent shafts, the electric motor assembly further including: one or more clutches to mechanically engage and disengage the one or more adjacent electric motors from the one or more adjacent gears, each of the one or more clutches selectively securing an adjacent gear of the one or more adjacent gears relative to a rotatable adjacent shaft of the one or more rotatable adjacent shafts; the electric drive system further including: a control system to activate and deactivate one or more motors of the plurality of electric motors and to operate the one or more clutches; an energy storage system coupled to the electric motor assembly; and a torque demand system to communicate a torque need to the control system to activate or deactivate the one or more motors, the control system being configured to: activate and deactivate the one or more motors based on the torque need such that a number of simultaneously activated motors of the plurality of electric motors depends on the torque need, and mechanically disengage, by operating a clutch of the one or more clutches, a deactivated adjacent electric motor from an adjacent gear in conjunction with the deactivated adjacent electric motor being deactivated.

In aspects, an electric engine can include at least: electric motor assemblies, each of the electric motor assemblies including: a rotatable sub-output shaft configured to transfer a torque to a component external to an electric motor assembly, a gear assembly including a sub-output gear and adjacent gears coupled to the sub-output gear, the sub-output gear being coupled to the rotatable sub-output shaft, the electric motor assemblies each further including electric motors, each of the electric motors being coupled to an adjacent gear of the adjacent gears, and a controller to activate and deactivate one or more of the electric motors; the electric engine further including receiving gears, each of the receiving gears being coupled to a rotatable sub-output shaft of an electric motor assembly of the electric motor assemblies; an output gear coupled to the receiving gears; and an output shaft coupled to the output gear.

In aspects, an electric engine can include at least: electric motor assemblies, each of the electric motor assemblies including: a rotatable sub-output shaft configured to transfer a torque to a component external to an electric motor assembly, a drive plate coupled to the rotatable sub-output shaft, a gear assembly including: a ring gear coupled to the drive plate; and adjacent gears coupled to the ring gear, the adjacent gears including inner adjacent gears coupled to the ring gear inside a perimeter of the ring gear and one or more outer adjacent gears coupled to the ring gear outside the perimeter of the ring gear, the electric motor assemblies each further including electric motors, each of the electric motors being coupled to an adjacent gear of the adjacent gears, and a controller to activate and deactivate one or more of the electric motors; the electric engine further including receiving gears, each of the receiving gears being coupled to a rotatable sub-output shaft of an electric motor assembly of the electric motor assemblies; an output gear coupled to the receiving gears; and an output shaft coupled to the output gear.

In aspects, a vehicle can include at least: an electric drive system including: an electric engine including: electric motor assemblies, each of the electric motor assemblies including: a rotatable sub-output shaft configured to transfer a torque to a component external to an electric motor assembly, a gear assembly including a sub-output gear and adjacent gears coupled to the sub-output gear, the sub-output gear being coupled to the rotatable sub-output shaft, the electric motor assemblies each further including electric motors, each of the electric motors being coupled to an adjacent gear of the adjacent gears; the electric engine further including receiving gears, each of the receiving gears being coupled to a rotatable sub-output shaft of an electric motor assembly of the electric motor assemblies; an output gear coupled to the receiving gears; and an output shaft coupled to the output gear; the electric drive system further including a control system to selectively activate and deactivate the electric motors of each of the electric motor assemblies, an energy storage system coupled to the electric motor assemblies, and a torque demand system to communicate a torque need to the control system, the control system being configured to cause a number of a total number of electric motors of all the electric motor assemblies to be simultaneously activated, the number of simultaneously activated electric motors depending on the torque need.

In aspects, an electric motor assembly can include at least: a support plate; a plate rotatably coupled to the support plate; a clutch to selectively secure the plate relative to the support plate; and a gear assembly coupled to the support plate, the gear assembly including: a sun gear coupled to a rotatable output shaft configured to transfer a torque to an external component, a ring gear, and adjacent gears coupled to the sun gear, the adjacent gears including: planetary gears coupled to the sun gear and rotatably fixed relative to the plate, the planetary gears being enmeshed with gear teeth disposed on an inner side of the ring gear; and one or more outer adjacent gears coupled to the ring gear on an outer side of the ring gear; the electric motor assembly further including electric motors coupled to the one or more outer adjacent gears and the sun gear; the electric motor assembly at least one of including or being coupled to a control system configured to: receive a torque need, and cause a number of the electric motors to be simultaneously activated based on the torque need, the number being a maximally efficient number of electric motors for producing the torque need.

In aspects, a method of controlling one or more electric engines including electric motors can include at least: receiving, by one or more computer processors, a torque need; at least one of receiving or determining, by the one or more computer processors, an output angular velocity of the one or more electric engines; retrieving, by the one or more computer processors, an efficiency value from each of a plurality of motor efficiency maps based on the torque need and the output angular velocity, each of the plurality of motor efficiency maps corresponding to a unique subset of the electric motors and linking individual torque and angular velocity values to respective efficiency values for the unique subset; identifying, by the one or more computer processors, a maximum efficiency value of the retrieved efficiency values, the maximum efficiency value corresponding to a maximally efficient subset of the electric motors for producing the torque need at the output angular velocity; and causing, by the one or more computer processors, the maximally efficient subset of the electric motors to be simultaneously activated.

In aspects, a method of generating motor efficiency maps for use in control of one or more electric engines can include at least: selecting a first unique subset of electric motors to be simultaneously activated to produce an output torque at an output angular velocity; recording a first efficiency of the first unique subset of electric motors in producing the output torque at the output angular velocity; varying the output torque and the output angular velocity to generate a first motor efficiency map corresponding to the first unique subset and including the first efficiency; selecting a second unique subset of electric motors to be simultaneously activated to produce the output torque at the output angular velocity; recording a second efficiency of the second unique subset of electric motors in producing the output torque at the output angular velocity; and varying the output torque and the output angular velocity to generate a second motor efficiency map corresponding to the second unique subset and including the second efficiency.

In aspects, a method of controlling one or more electric engines comprising electric motors can include at least: receiving, by one or more computer processors, a torque need; dividing, by the one or more computer processors, the torque need into one or more micro torque needs; at least one of receiving or determining, by the one or more computer processors, an output angular velocity of an electric motor of the electric motors; retrieving, by the one or more computer processors, an efficiency value from a motor efficiency map based a micro torque need of the one or more micro torque needs and the output angular velocity, the motor efficiency map corresponding to the electric motor of the electric motors; determining, by the one or more computer processors based on the efficiency value, a representation of an efficiency of a unique subset of the electric motors comprising the electric motor; determining, by the one or more computer processors based on the representation, whether the unique subset is a maximally efficient subset of the electric motors for producing the torque need; and in response to determining that the unique subset is the maximally efficient subset, causing, by the one or more computer processors, the unique subset of the electric motors to be simultaneously activated.

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of the disclosure. However, it will be apparent that the disclosure may be practiced without these specific details. In order to avoid obscuring aspects of the present disclosure, some configurations and process steps are not disclosed in detail.

The drawings showing aspects of the system and its components are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

FIG. 1 shows a vehicle 100 according to aspects of the disclosure. Vehicle 100 can be an EV (i.e., vehicle 100 can be propelled using at least one electric motor). While FIG. 1 shows vehicle 100 as an electric car, vehicle 100 can be any electric vehicle, such as a truck, a tank, an airplane, a boat, a 4-wheeler, a motorcycle, etc. As shown in FIG. 1, vehicle 100 can include a drive unit 102 to propel vehicle 100, such as first drive unit **102*a* and second drive unit 102*b*. In aspects, first and second drive units 102*a/b* can be electric axles (eAxles). In aspects in which vehicle 100 is a car, first drive unit 102*a* can be disposed toward the front of vehicle 100 and second drive unit 102*b* can be disposed toward the rear of the vehicle 100. In aspects, vehicle 100 can also alternatively include a single drive unit 102 disposed toward either the front or rear of vehicle 100, or additional drive units 102. In other aspects, vehicle 100 can include any number of drive units 102 to propel vehicle 100**.

Vehicle 100 can further include energy storage system 104 to supply power to drive units 102. Accordingly, energy storage system 104 can be coupled to drive units 102. In aspects, energy storage system 104 can include a battery or collection of batteries. In aspects, the battery or collection of batteries can be rechargeable electric vehicle batter(ies).

Figure 2A:
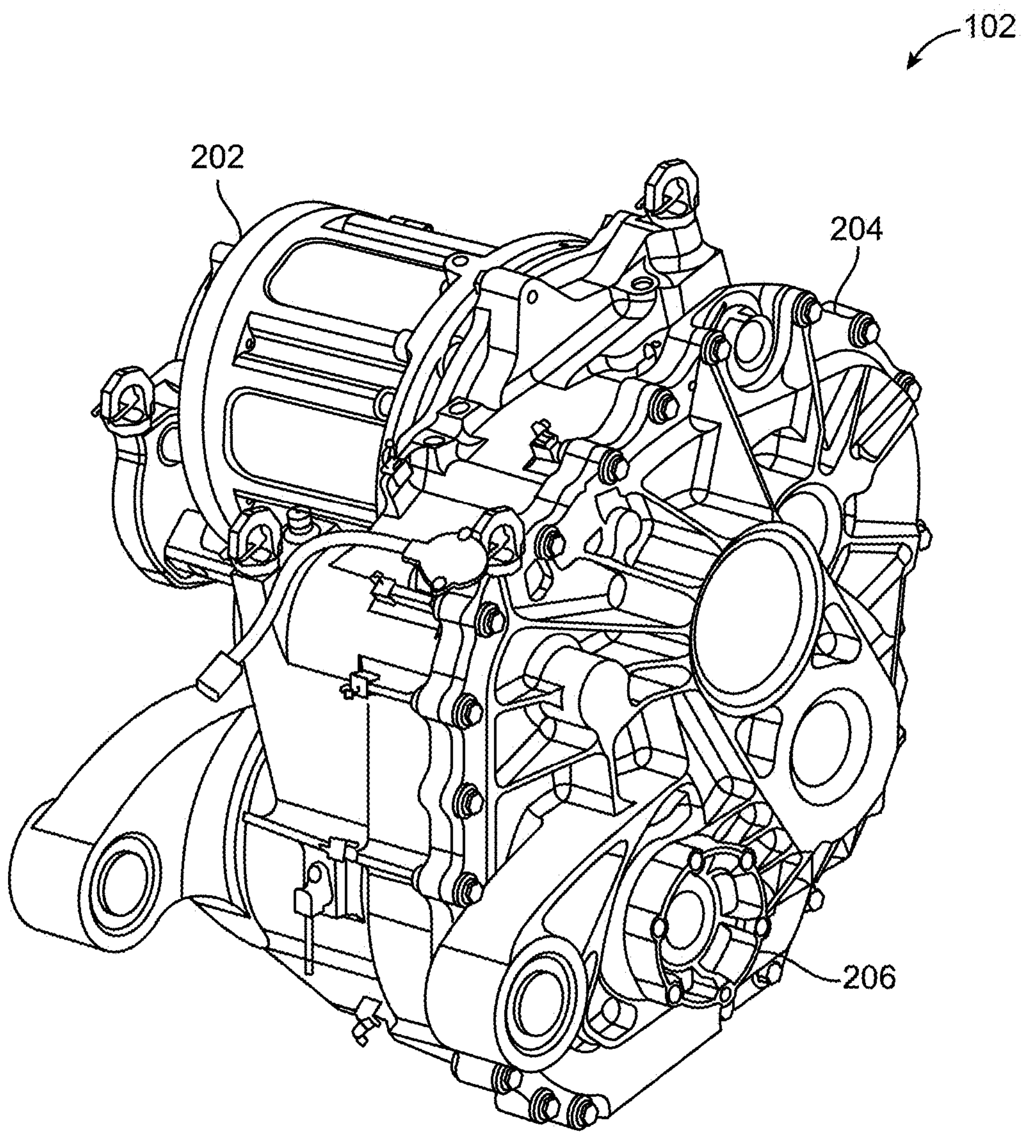
FIG. 2A shows a perspective view of an electric drive unit according to aspects of the disclosure.

FIG. 2A shows a drive unit 102 according to aspects of the disclosure. Drive unit 102 can be an electric drive unit (i.e., drive unit 102 can include an electric motor used to provide a torque for a device). More specifically, drive unit 102 can be an eAxle. As shown in FIG. 2A, drive unit 102 can include a motor assembly 202, an example of which is described in more detail with respect to FIGS. 3A-3B and 8A-8B. Drive unit 102 can further include a housing 204 to house the components of drive unit 102. Drive unit 102 can further include a shaft 206 to output a torque generated using motor assembly 202. While not shown in FIG. 2A, drive unit 102 can include at least one inverter to control the operation of motor assembly 202 by manipulating electric currents provided to motor assembly 202. For example, the inverter can convert a current from direct current (DC) to alternating current (AC) and adjust the amplitude of the alternating current to control the output torque of motor assembly 202.

Figure 2B:
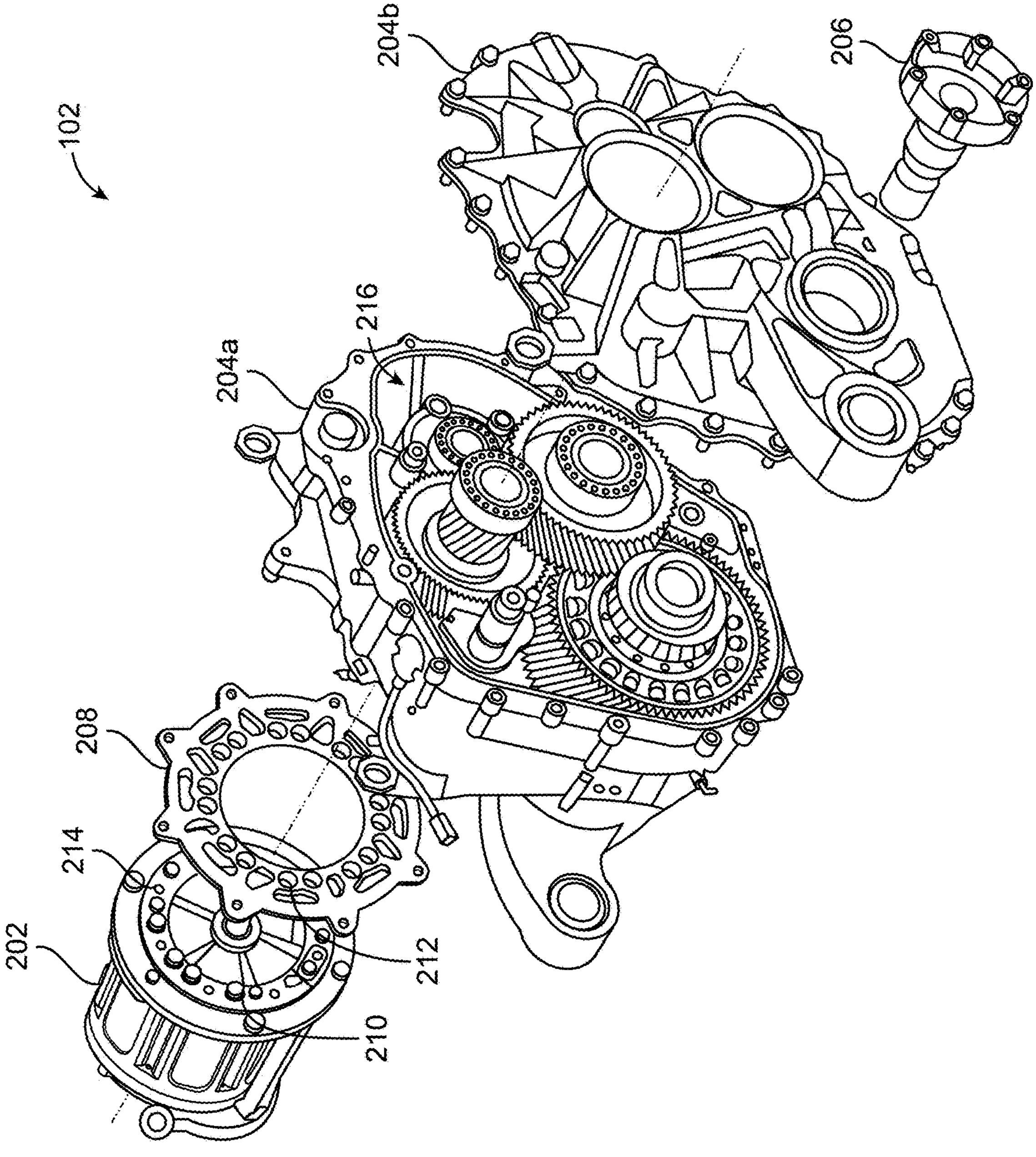
FIG. 2B shows an exploded perspective view of the electric drive unit shown in FIG. 2A according to aspects of the disclosure.

FIG. 2B shows an exploded view of electric drive unit 102 according to aspects of the disclosure. As shown in FIG. 2B, motor assembly 202 can be attachable to and detachable from housing 204 (shown as a first housing **204*a* and a second housing 204*b* in FIG. 2B). Motor assembly 202 can be attached to housing 204 using attachment element 208. Attachment element 208 can be a fixture configured to attach to both motor assembly 202 and housing 204. Motor assembly 202 can include alignment elements 210 that can be received by alignment apertures 212 on attachment element 208. Further, motor assembly 202 can include affixment apertures 214 to receive bolts or screws used to secure attachment element 208 to motor assembly 202. Attachment element 208 can then be secured to housing 204** using similar means.

Drive unit 102 can further include a gear assembly 216 to receive and control a torque produced by motor assembly 202. Gear assembly 216 can transfer a torque from motor assembly 202 to shaft 206, altering gear ratios within gear assembly 216 to control the torque and rotational frequency supplied to shaft 206. In aspects, gear assembly 216 can be a two-speed gear assembly. In other aspects, gear assembly 216 can be a single speed gear assembly.

While FIGS. 2A-2B show motor assembly 202 in a drive unit 102 for use in an EV, motor assembly 202 can be used in any device requiring the production of a torque. Further, motor assembly 202 can be interchangeable with a conventional motor assembly (i.e., a conventional motor assembly can be attached to drive unit 102 in place of motor assembly 202). However, unlike conventional motor assemblies, motor assembly 202 can include multiple motors, as discussed with respect to FIGS. 3A-3B.

Figure 3A:
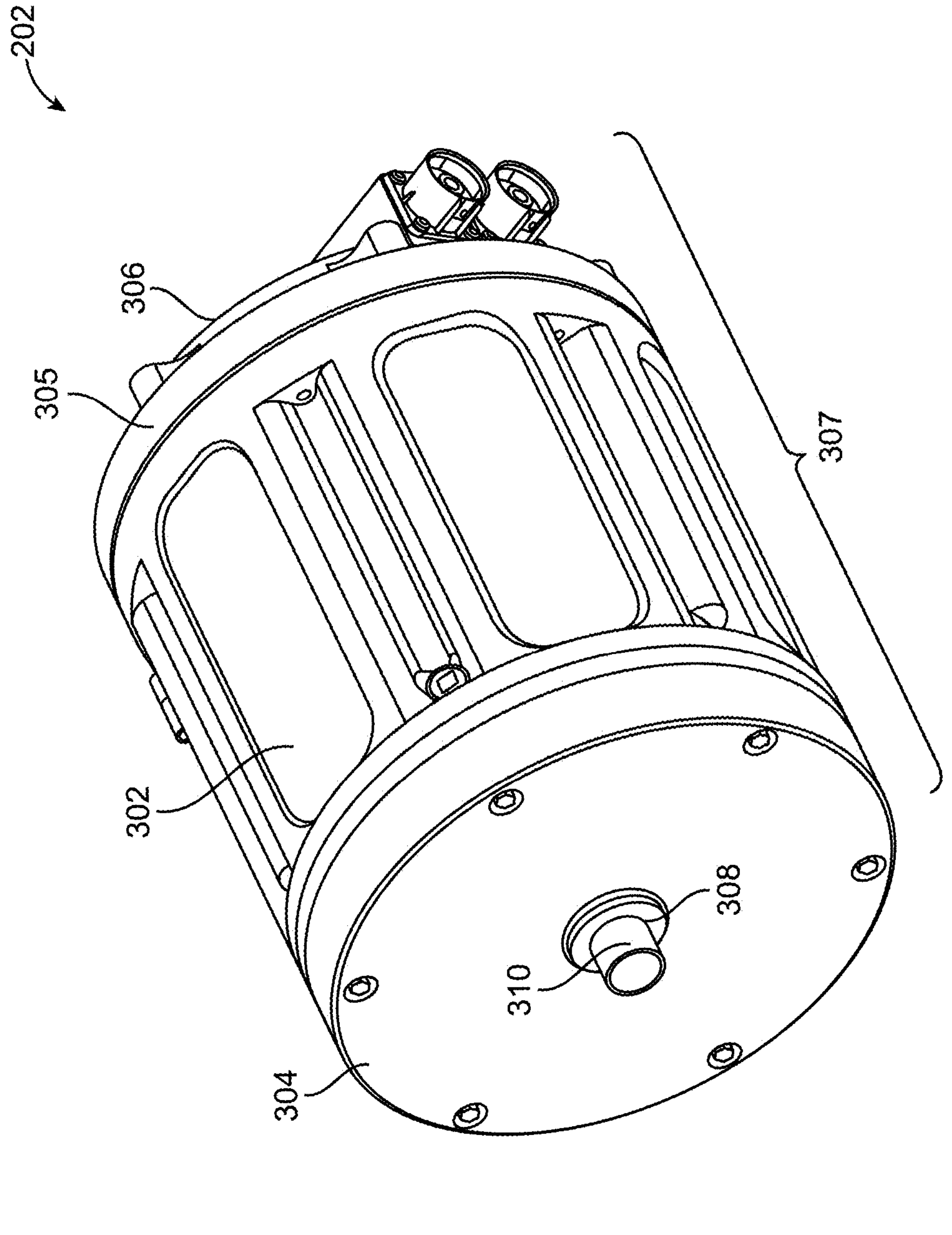
FIG. 3A shows a perspective view of an electric motor assembly according to aspects of the disclosure.

FIG. 3A shows a motor assembly 202 according to aspects of the disclosure. As shown in FIG. 3A, motor assembly 202 can include a main housing 302, a first end cap 304, a layer 305, and a second end cap 306 to house motors within motor assembly. Main housing 302, first end cap 304, layer 305, and second end cap 306 can collectively form a housing 307. First end cap 304 can include an aperture 308 allowing an output shaft 310 to pass therethrough. Output shaft 310 can transfer a torque to external gear assemblies, such as gear assembly 216 shown in FIG. 2B.

Figure 3B:
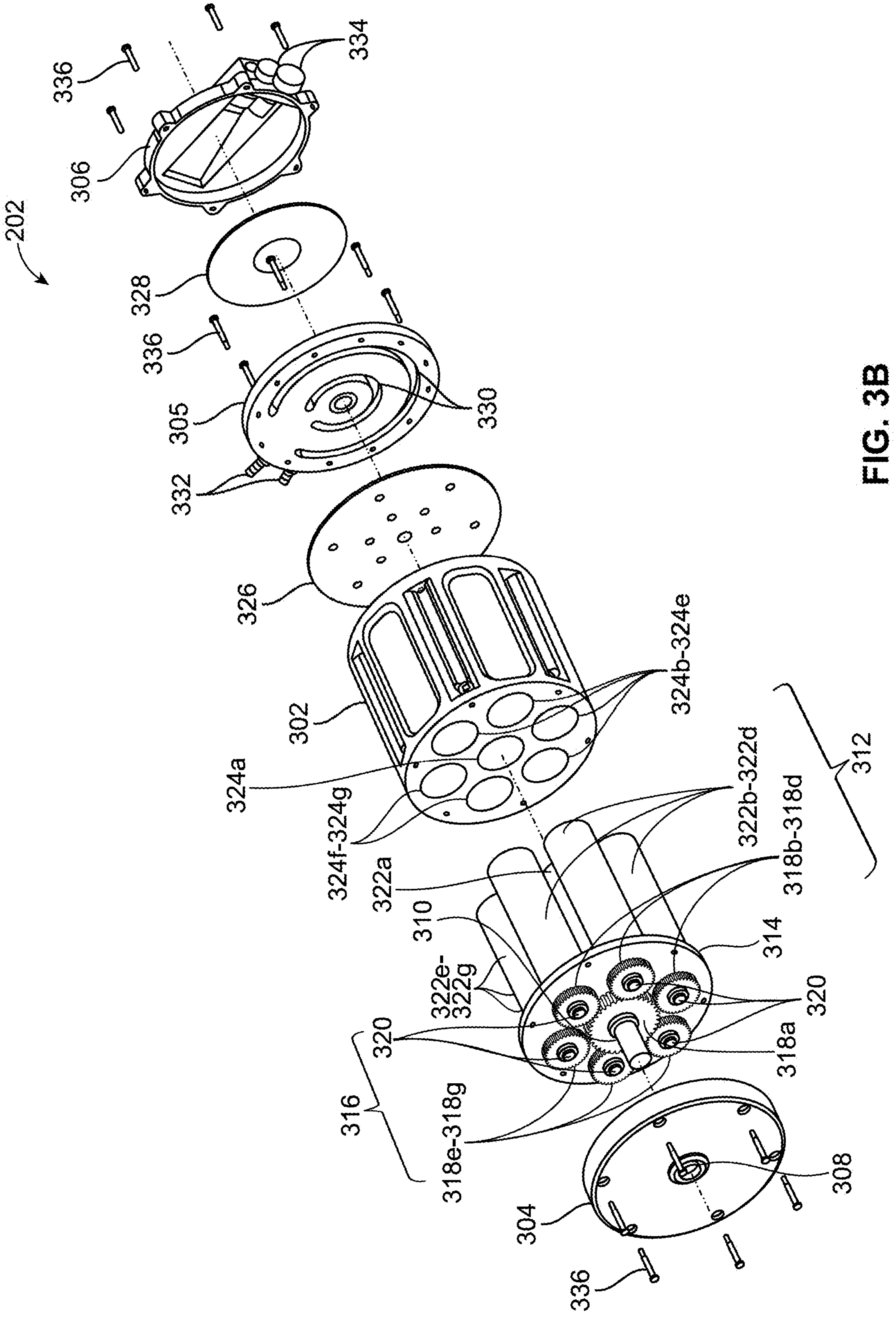
FIG. 3B shows an exploded perspective view of the electric motor assembly shown in FIG. 3A according to aspects of the disclosure.

FIG. 3B shows an exploded view of motor assembly 202 according to aspects of the disclosure. As shown in FIG. 3B, motor assembly 202 can include a drive assembly 312 to generate a torque. Drive assembly 312 can include a support plate 314 to which components of drive assembly 312 can be attached. For example, a gear assembly 316 can be attached to support plate 314.

Gear assembly 316 can include gears 318. FIG. 3B shows seven gears **318*a*-318*g*. In aspects, gear 318*a* of gear assembly 316 can be an output gear coupled to output shaft 310. Gears 318*b*-318*g* can be adjacent gears coupled to gear 318*a* (gears 318*b*-318*g* are sequentially labeled in a clockwise direction starting with gear 318*b* at the top of gear assembly 316). That gears 318*b*-318*g* are adjacent can mean that gears 318*b*-318*g* are in a common gear assembly with gear 318*a*. Further, that gears 318*b*-318*g* are adjacent can include cases in which gears 318*b*-318*g* are both directly or indirectly coupled to gear 318*a*. In aspects, gears 318*b*-318*g* can be directly coupled to gear 318*a*, for example, by each of gears 318*b*-318*g* being in contact and enmeshed with gear 318*a*. In other aspects, at least one of gears 318*b*-318*g* can be indirectly coupled to gear 318*a*, for example, by being coupled to gear 318*a* without being in contact or enmeshed with gear 318*a*. In this sense, that gears are "coupled" to gear 318*a* can mean that rotation of one of gears 318*b*-318*g* contributes to rotation of gear 318*a*, either directly or via another gear. To avoid mechanical breakdown, if one of gears 318*b*-318*g* is directly coupled to gear 318*a*, it cannot be directly coupled to another of gears 318*b*-318*g* that is in turn directly coupled to gear 318*a* (e.g., gear 318*b* cannot be directly coupled to gear 318*c* in FIG. 3**B).

In aspects, gear 318*a* can be a central gear (i.e., arranged between at least two of gears 318*b*-318*g*). In such aspects, at least two of gears 318*b*-318*g* can be peripheral gears arranged around gear 318*a*.

While FIG. 3B shows six gears 318*b*-318*g* coupled to gear 318*a*, this is exemplary and gear assembly 316 can include fewer or additional adjacent gears, such as 1, . . . , n adjacent gears, where n is a positive integer. Further, the number of adjacent gears can be an even number. Particularly, the adjacent gears can be pairs of gears, each gear of a pair of gears arranged on opposite sides of gear 318*a*, for example, like gear 318*b* and gear 318*e* in FIG. 3B. The reference to gears 318*b*-318*g* in this disclosure should be understood to include aspects in which there are fewer or more than six adjacent gears.

Gears 318 can form any suitable gear ratios for providing the output torques required of motor assembly 202. In aspects, gears 318*b*-318*g* can each form the same gear ratio with gear 318*a*. For example, in aspects, gears 318*b*-318*g* can each form a gear ratio of approximately 1:1 with gear 318*a*. In other aspects, gears 318*b*-318*g* can form varying gear ratios with gear 318*a*. In aspects, at least one of gears 318*b*-318*g* or any adjacent gears 318 described herein can form a gear ratio of greater than 1 with gear 318*a* (i.e., an adjacent gear has fewer teeth than gear 318*a* and makes more than 1 full turn for every full turn of gear 318*a*) to provide for gear reduction between adjacent gears 318 and gear 318*a*. In aspects, each of adjacent gears 318 directly coupled to gear 318*a* can form a gear ratio of greater than 1 with gear 318*a*. In aspects, all adjacent gears 318 can form a gear ratio of greater than 1 with gear 318*a*.

Drive assembly 312 can further include motors 322, such as motors 322*a*-322*g*, to rotate gears 318*a*-318*g*. FIG. 3B shows seven motors 322*a*-322*g* corresponding to gears 318*a*-318*g*. In aspects, motors 322 can be permanent magnet motors. In aspects, motors 322 can be induction motors. In aspects, motor 322*a* can be a permanent magnet motor while motors 322*b*-322*g* can be induction motors. In aspects, motors 322 can be AC electric motors. For example, in aspects, motors 322 can be three-phase induction AC electric motors. In other aspects, motors 322 can be three-phase synchronous AC electric motors. In aspects, motors 322 can be direct current (DC) electric motors.

In aspects, motor 322*a* can be coupled to gear 318*a* via output shaft 310. In aspects, output shaft 310 can be a shaft of motor 322*a*. In other aspects, output shaft 310 can be driven by motor 322*a* via one or more intervening components (e.g., gears). In the particular context of a motor 322 "driving" a shaft of motor assembly 202, a shaft "driven by" a motor 322 means the motor 322 is the motor with the fewest intervening components between itself and the shaft, as compared to other motors 322. Motors 322*b*-322*g* can be adjacent motors coupled to gears 318*b*-318*g* via shafts 320 (motors 322*b*-322*g* are sequentially labeled in a clockwise direction starting with motor 322*b* corresponding to gear 318*b*). In aspects, shafts 320 can be shafts of motors 322*b*-322*g*. In other aspects, each of shafts 320 can be driven by one of motors 322*b*-322*g* via one or more intervening components (e.g., gears). That motors 322*b*-322*g* are adjacent can mean that motors 322*b*-322*g* are coupled via shafts 320 to gears that are in a common gear assembly with gear 318*a*. In aspects, motor 322*a* can be a central motor (i.e., arranged between at least two of motors 322*b*-322*g*). In such aspects, at least two of motors 322*b*-322*g* can be peripheral motors arranged around motor 322*a*. Motors 322*b*-322*g* can turn each of gears 318*b*-318*g* in a direction that contributes to the turning of gear 318*a* in a particular direction. For example, in aspects in which gears 318*b*-318*g* are each directly coupled to gear 318*a*, motors 322*b*-322*g* can turn gears 318*b*-318*g* in one direction (e.g., clockwise) while motor 322*a* can turn gear 318*a* in the opposite direction (e.g., counterclockwise).

While FIG. 3B shows six motors 322*b*-322*g* coupled to six gears 318*b*-318*g* that are in turn coupled to gear 318*a*, this is exemplary and drive assembly 312 can include fewer or additional adjacent motors, such as 1, . . . , n adjacent motors, where n is a positive integer. Further, the number of adjacent motors can be an even number. Particularly, the adjacent motors can be pairs of motors, each motor of a pair of motors arranged on opposite sides of motor 322*a*, for example, like motor 322*d* and motor 322*g*. The inclusion of multiple motors 322*b*-322*g* can increase operational redundancy of motor assembly 202. For example, upon failure of a portion of motors 322, operability of motor assembly 202 can be maintained. The reference to motors 322*b*-322*g* in this disclosure should be understood to include aspects in which there are fewer or more than six adjacent motors. In aspects, a motor 322 can be coupled to each of gears 318, as shown in FIG. 3B. In other aspects, drive assembly 312 can include a larger number of gears 318 than motors 322.

Motors 322 can be conventional electric motors. For example, motors 322 can each include a stator and a rotor contained within a housing. Additionally, in aspects, the housing of a motor can include at least one coolant channel for a non-direct or direct contact cooling fluid, e.g., a dielectric oil, to flow. Each motor 322 including a cooling system can increase the continuous power rating of motor assembly 202. Additionally or alternatively, housing 307 can include a cooling system for all of motors 322, as described below.

While the principles of the present disclosure are discussed with regard to motors 322 that can be used in an electric vehicle, the principles of the present disclosure can be apply to motors 322 having any specifications. For example, the principles of the present disclosure can apply to motors 322 having any continuous power rating, peak power rating, continuous torque rating, and peak torque rating.

In aspects, motors 322 can be substantially similar. For example, in aspects, motors 322 can have substantially the same continuous power rating, peak power rating, continuous torque rating, and peak torque rating. In other aspects, the specifications of motors 322 can vary among motors 322. For example, in such aspects, motors 322*b*-322*g* can have substantially the same continuous power rating, peak power rating, continuous torque rating, and peak torque rating while motor 322*a* can have a different power rating, peak power rating, continuous torque rating, and/or peak torque rating. In aspects, it may be advantageous to separately configure motor 322*a* to have different specifications from motors 322*b*-322*g*, as motor 322*a* can operate alone at low torque needs. Additionally, in such aspects, at least two of motors 322*b*-322*g* can have different continuous power ratings, peak power ratings, continuous torque ratings, and/or peak torque ratings while motor 322*a* can have a different or the same power rating, peak power rating, continuous torque rating, and/or peak torque rating as at least one of motors 322*b*-322*g*. In aspects in which the specifications of motors 322 can vary among motors 322, the gear ratios of each of gears 318*b*-318*g* with gear 318*a* can be selected based on the specifications of each of motors 322 to optimize the torque and RPM output of motor assembly 202. Further, in such aspects, one or more motors 322 can be activated or deactivated based on a torque need and individual specifications of motors 322 (i.e., to optimize the efficiency of motor assembly 202 at a given torque and RPM output). For example, motors 322 having various peak torque ratings can provide a means of more precisely tailoring the motor efficiency map of an activated combination of motors of motor assembly 202, based on which motors 322 are included in the combination. This can provide increased precision in selecting a maximally efficient subset of motors 322 to simultaneously activate in producing a requested output torque at a given RPM. Motor assembly 202 including motors 322 of various peak torque ratings can allow the peak torque rating of motor assembly 202 to be increased or decreased in more flexible increments by simultaneously activating various combinations of the motors 322. For example, for 7 motors 322 each having a peak torque rating of 15 N·m, the peak torque rating of motor assembly 202 can be increased or decreased in increments of 15 N·m. However, if motor assembly 202 includes a mixture of motors 322 with peak torque ratings of 10 N·m, 15 N·m, and 20 N·m, the peak torque rating of motor assembly 202 can be increased or decreased by increments of 5 N·m (after 10 N·m) since various subsets of the motors 322 can sum to 10 N·m, 15 N·m, 20 N·m, 25 N·m (10 N·m+15 N·m), 30 N·m (2×15 N·m), 35 N·m (20 N·m+15 N·m), 40 N·m (2×20 N·m), 45 N·m (20 N·m+15 N·m+10 N·m), etc.

As shown in FIG. 3B, main housing 302 can include cavities 324, such as cavities 324*a*-324*g*, to receive motors 322*a*-322*g*. FIG. 3B shows seven cavities 324*a*-324*g* corresponding to motors 322*a*-322*g*. Cavity 324*a* can receive motor 322*a* coupled to gear 318*a*. Cavities 324*b*-324*g* can be adjacent cavities that receive motors 322*b*-322*g* (cavities 324*b*-324*g* are sequentially labeled in a clockwise direction starting with cavity 324*b* corresponding to motor 322*b*). That cavities 324*b*-324*g* are adjacent can mean that cavities 324*b*-324*g* receive motors that are coupled via shafts 320 to gears that are in a common gear assembly with gear 318*a*. In aspects, cavity 324*a* can be a central cavity (i.e., arranged between at least two of cavities 324*b*-324*g*). In such aspects, at least two of cavities 324*b*-324*g* can be peripheral cavities arranged around cavity 324*a*.

While FIG. 3B shows six cavities 324*b*-324*g* receiving six motors 322*b*-322*g*, this is exemplary and main housing 302 can include fewer or additional adjacent cavities, such as 1, . . . , n adjacent cavities, where n is a positive integer. Further, the number of adjacent cavities can be an even number. Particularly, the adjacent cavities can be pairs of cavities, each cavity of a pair of cavities arranged on opposite sides of cavity 324*a*, for example, like cavity 324*b* and cavity 324*e*. The reference to cavities 324*b*-324*g* in this disclosure should be understood to include aspects in which there are fewer or more than six adjacent cavities. In aspects, main housing 302 can include a cavity 324 for each motor 322 (i.e., the same number of cavities 324 as motors 322 within motor assembly 202). In other aspects, main housing 302 can include a larger number of cavities 324 than the number of motors 322 included in motor assembly 202. In aspects, cavities 324 can be substantially the same size. In other aspects, cavities 324 can be sized differently, for example, to accommodate different sized motors 322.

A motor 322 inserted into a cavity 324 can be at least partially within the cavity 324. For example, only a part or none of the motor 322 can be visible when the motor is inserted into the cavity 324. Accordingly, motors 322*a*-322*g* can be at least partially within cavities 324*a*-324*g* when motor assembly 202 is assembled. In aspects, main housing 302 including cavities 324 can form a unitary structure for receiving motors 322. While FIG. 3B shows main housing 302 having a circular cross section, the cross section main housing 302 can be ovular or polygonal, such as rectangular, hexagonal, octagonal, etc., without interfering with the function of motor assembly 202.

As shown in FIG. 3B, motor assembly 202 can further include a first printed circuit board (PCB) 326. First PCB 326 can include controllers for driving motors 322, as described in more detail below. For example, first PCB 326 can include at least one inverter for controlling motors 322. In aspects, first PCB 326 can include an inverter connected to each of motors 322. First PCB 326 can be positioned between main housing 302 and layer 305 such that it abuts motors 322. Controllers on first PCB 326 can connect to terminals on motors 322. In aspects, motor assembly 202 can include a second PCB 328 including additional components, such as circuitry for receiving and supplying power to motors 322 from connectors 334, described below. In aspects, second PCB 328 can be positioned between layer 305 and second end cap 306. In other aspects, first PCB 326 and second PCB 328 can be combined and can be positioned between main housing 302 and layer 305.

As shown in FIG. 3B, layer 305 can include channels 330. Channels 330 can be cooling channels configured to circulate a cooling fluid. In aspects, the cooling fluid can be a dielectric fluid, for example, a dielectric oil. The cooling fluid can enter and exit channels 330 through nozzles 332. The cooling fluid can contact first PCB 326 and/or second PCB 328 and motors 322 to cool components disposed on first PCB 326 and/or second PCB 328 and components disposed within motors 322. First PCB 326 and/or second PCB 328 being positioned between layer 305/channels 330 and motors 322 can secure the benefit of a single cooling feature (e.g., channels 330 for transporting cooling fluid) being used to cool various electronic components within motor assembly 202.

Additionally, the inclusion of multiple motors 322 within motor assembly 202 can improve the efficiency of motor assembly 202's cooling features. For example, as compared to a single large motor, multiple smaller motors 322 can provide greater access (for cooling) to components within the multiple smaller motors 322 that generate heat (e.g., the rotors and stators), since the components of a smaller motor can be nearer to exterior surfaces of a housing of the smaller motor. Therefore, a cooling fluid (e.g., dielectric oil) can flow nearer to heat-generating components and better absorb and transfer heat out of motor assembly 202.

As shown in FIG. 3B, second end cap 306 can include connectors 334. Connectors 334 can communicatively couple motor assembly 202 to various components or systems within vehicle 100, for example, energy storage system 104 and/or a torque demand system as described below.

First end cap 304 can be detachable from support plate 314 and/or main housing 302. Support plate 314 can be detachable from main housing 302. First PCB 326, layer 305, second PCB 328, and second end cap 306 can be detachable from main housing 302 and one another. Each of these components can be detached by removing fasteners 336, as shown in FIG. 3B. Accordingly, motor assembly 202 can be easily disassembled to gain access to drive assembly 312 for the configuration and/or repair of drive assembly 312. For example, motors 322 can each be detachable from its corresponding gear 318 and from support plate 314. Individual motors 322 can be easily removed and serviced or replaced. Further, individual gears 318 can be easily removed and serviced or replaced.

The size and weight of each of motors 322 can allow a single technician to handle and repair motor assembly 202.

For example, in aspects, one of motors 322 can be removed and inspected by a single technician, as it can weigh about 8-12 kg. In comparison, an electric motor with a peak power rating of about 400 kW for use in an EV can weigh 50 kg or more. A technician can open motor assembly 202, remove a gear 318 from a motor 322, detach the motor 322 from support plate 314, and repair or replace the motor 322. Alternatively, the technician can remove or add motors 322 to configure motor assembly 202 to operate in a particular environment (e.g., a flat region requiring less torque and fewer motors 322 within motor assembly 202).

In aspects, motor assembly 202 according to any aspect disclosed herein need not include main housing 302, first end cap 304, layer 305, and/or second end cap 306. In such aspects, motors 322, gear assembly 316, and shafts 320 and output shaft 310 can be attached to any component to secure them in place and implement the concepts discussed herein for increasing efficiency by selectively activating/deactivating motors 322 based on a torque need.

Figure 4:
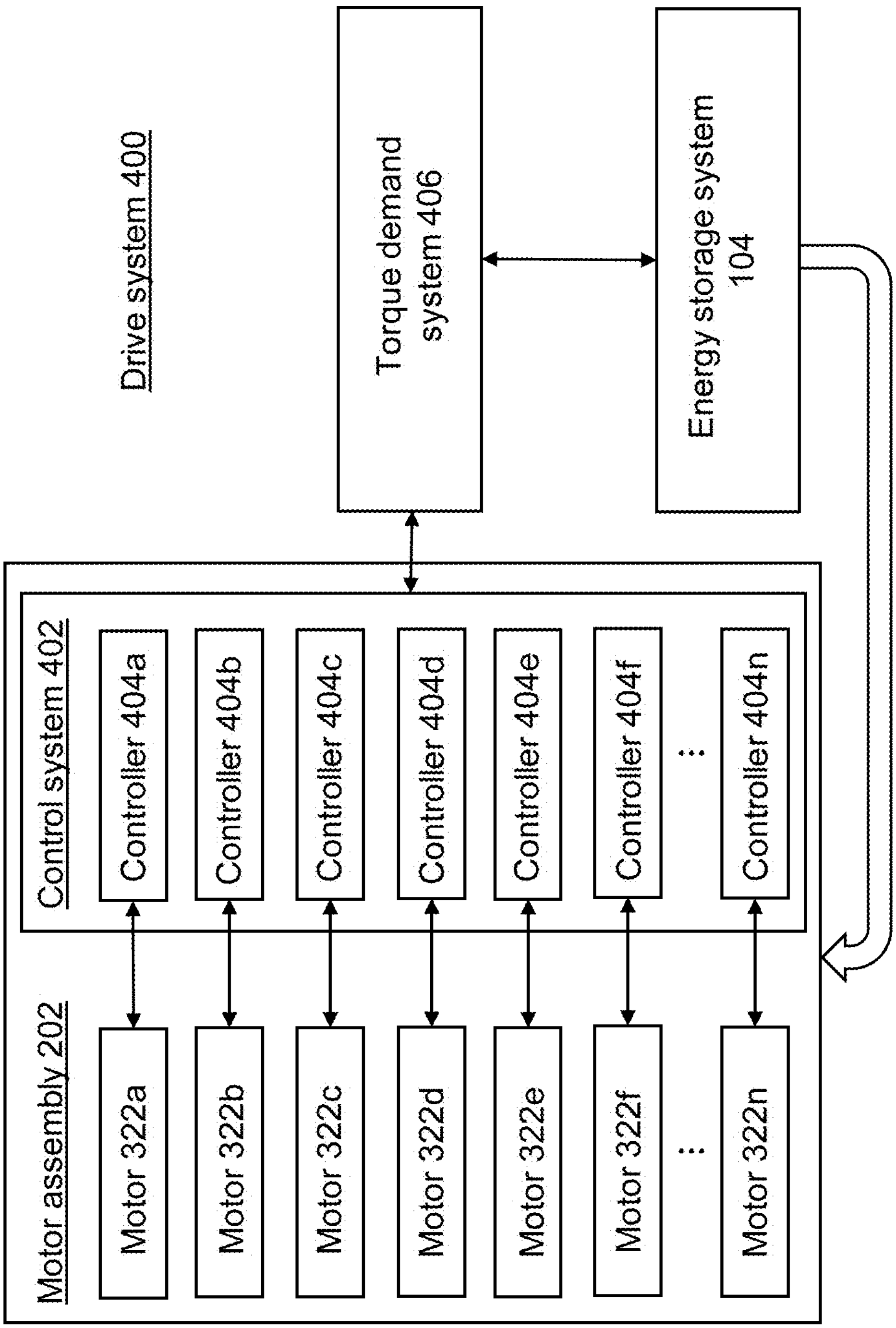
FIG. 4 shows a diagram of a drive system according to aspects of the disclosure.

FIG. 4 shows a diagram of a drive system 400 according to aspects of the disclosure. Drive system 400 can include energy storage system 104, motor assembly 202, a control system 402, and a torque demand system 406. Torque demand system 406 can be integrated within a device implementing motor assembly 202, such as vehicle 100. Torque demand system 406 can determine a torque need to be requested from motor assembly 202. The torque need can be based on a speed a user of an EV is desiring to produce at a given resistance (i.e., a particular RPM output can result from a particular torque output applied to a given resistance, the user causing the particular torque output by desiring "more," "less," or "the same" speed while the EV is under certain operating conditions, and operating the accelerator accordingly). In aspects, what the user considers to be a request for "more," "less," or "the same" speed can be translated into a request for more, less, or the same torque by torque demand system 406, since a particular speed of an EV can be the result of a particular torque applied by motor(s) to a given resistance (the resistance being determined at least in part by the operating conditions). Therefore, in an EV, the torque need can be based on a user operation of the EV and an environment in which the EV is operating. For example, when the EV is operating on a hill, a user may apply more force to an accelerator of the EV to maintain the constant speed of the EV while traveling up the hill. Torque demand system 406 can determine, based on the user's action, that an increased torque must be requested from motor assembly 202. In aspects, torque demand system 406 can monitor the status of factor(s) determining the torque need (e.g., accelerator engagement level) continuously, since, for example, a user can be continuously requesting either more, less, or the same speed via operation (or lack thereof) of an accelerator. In a self-driving system, torque demand system 406 can determine the torque need based on monitoring features of the environment (e.g., forces acting on the vehicle, speed limit signs, the radius of a turn in the road, position calculated by a GPS along with data, for example, speed limit data, associated with the position, etc.).

Torque demand system 406 can communicate the torque need to control system 402, which can request motor assembly 202 produce the torque need as an output torque. Torque demand system 406 can communicate the torque need to control system 402 at any interval, including continuously, to communicate changes in the torque need. Energy storage system 104 can provide power to motor assembly 202 to meet the torque need communicated to control system 402 by torque demand system 406. The torque need need not be communicated to control system 402 in any particular form (e.g., units). Rather, it need only be interpretable by control system 402 as or into a form that corresponds, for example, to a torque index of a motor efficiency map used in controlling motor assembly 202.

In aspects, torque demand system 406 can include a pedal position sensor. The pedal position sensor can be a contact type (e.g., including a potentiometer) or contactless type (e.g., including a magnetic Hall effect or inductive sensor). The pedal position sensor can measure an extent to which the accelerator is engaged by a user (e.g., 0% to 100%), which can correspond (either linearly or by another relation) to a requested fraction of the torque available at the system level (e.g., across all drive units 102). For example, if torque demand system 406 detects that a user engages the accelerator at 100%, torque demand system 406 can determine that 100% of the torque available from drive unit(s) 102 is requested. This fraction can correspond a system level "torque need." However, this system level torque need can be converted by torque demand system 406 into the torque need requested from a specific motor assembly 202 (or a specific engine 1300, discussed with respect to FIG. 13). In aspects, the torque need requested from the specific motor assembly 202 (or engine 1300) can be a number (e.g., 200 N·m).

In aspects, the torque need requested from a specific motor assembly 202 (or engine 1300) can be based on an all-wheel drive setting (on/off). In determining the torque need requested from a specific motor assembly 202 (or engine 1300), torque demand system 406 can determine an all-wheel drive setting of an EV (e.g., vehicle 100) implementing the motor assembly 202 (or engine 1300). For example, in an EV including two or more drive units 102, a user may engage all-wheel drive (or it may be engaged automatically) such that all drive units 102 remain in operation. Under such conditions, torque demand system 406 can determine that the system level torque need must be divided into individual torque needs requested from each of the drive units 102. In aspects, torque demand system 406 can determine how to divide the system level torque need (e.g., 75% percent to first drive unit 102*a* and 25% to second drive unit 102*b*), for example, based on driving conditions and/or for best efficiency. Individual torque needs requested from individual motor assemblies 202 (or engines 1300) can then be calculated by torque demand system 406/control systems 402 (or 1602) and used as described herein to determine maximally efficient subsets of electric motors to be simultaneously activated. As noted above, vehicle 100 need not include multiple drive units 102. In aspects, an all-wheel drive setting and division of the system level torque need between drive units 102 need not be considered.

In aspects, torque demand system 406 can favor activation of a single drive unit 102 (e.g., comprising a single motor assembly 202/engine 1300) because it can be more efficient for a system level torque need that does not require more than one motor assembly 202 (or engine 1300) to produce. Accordingly, in aspects, torque demand system 406 can determine the all-wheel drive setting (on/off), and if off, request that the system level torque be produced by a single drive unit (e.g., a motor assembly 202/engine 1300 of first or second drive unit 102*a*, 102*b*).

In aspects, torque demand system 406 can include one or more computer processors and/or sensors within the device implementing motor assembly 202. For example, torque demand system 406 can include one or more microprocessors (MPUs), microcontrollers (MCUs), and/or systems-on-chip (SoCs). Additionally, torque demand system 406 can include one or more sensors, for example, an accelerator pedal position sensor, one or more accelerometers and/or force sensors, one or more image sensors, a GPS, etc. The one or more computer processors can be configured to receive outputs of the one or more sensors, calculate a torque need based on the outputs, and communicate the torque need to control system 402. The one or more computer processors can be communicatively coupled to memory of the torque demand system 406 and can be configured to perform the above operations, for example, by implementing software instructions stored on the memory. The memory of torque demand system 406 can include dynamic random access memory (DRAM), low-power dynamic random access memory (LPDRAM), NOR flash memory, NAND flash memory, embedded MultiMediaCard (eMMC), universal flash storage (UFS), and/or non-volatile memory express (NVMe) memory.

In aspects, control system 402 can be bodily integrated with motor assembly 202, for example, by being integrated into first PCB 326 and/or second PCB 328. In other aspects, control system 402 can be distinct from but communicatively coupled to motor assembly 202, or can be partially bodily integrated with motor assembly 202 and partially distinct from but communicatively coupled to motor assembly 202. If motor assembly 202 includes no main housing 302, layer 305, and/or second end cap 306, components of control system 402 being bodily integrated with motor assembly 202 means that the components are in wired connection with motors 322. Control system 402 can include one or more computer processors (e.g., one or more MPUs, MCUs, and/or SoCs) configured to receive the torque need from torque demand system 406 and instruct motor assembly 202 to produce the torque need as an output torque, for example, via one or more motor controllers, as described herein.

Based on the torque need, control system 402 can selectively activate or deactivate one or more motors 322 within motor assembly 202. For example, control system 402 can activate one or motors 322 if the torque need increases, and deactivate one or more motors 322 if the torque need decreases. As shown in FIG. 4, motor assembly can include any number of motors up to motor 322*n*. In aspects, control system 402 can selectively activate, deactivate, and control motors 322 individually. In aspects, control system 402 can selectively activate, deactivate, and control motors 322 in pairs. For example, based on torque demand system 406 determining that motor assembly 202 is required to output a decreased torque, control system 402 can deactivate pairs of motors that are arranged on opposite sides of motor 322*a*, such as motors 322*b* and 322*e* shown in FIG. 3B. Activating or deactivating motors in opposing pairs can maintain mechanical balance within motor assembly 202 during operation.

In aspects, activated pairs of motors 322 can be rotated among motors 322 based on motor usage (e.g., total input or output power). For example, in aspects, control system 402 can be configured to track usage of each of motors 322 such that a pairs of motors 322 can deactivated and another pair of motors 322 can be activated based on motor usage. This method can be utilized even if motors 322 are not activated or deactivated in pairs. In this way, control system 402 can maintain approximate equivalency of usage among motors 322. Accordingly, the lifetime of motors 322 can be extended and the frequency of servicing motor assembly 202 to address failure of over-utilized motors can be reduced.

In aspects, control system 402 can activate or deactivate one or more motors 322 to reach a maximally efficient number of motors 322 for outputting the torque need. For example, the maximally efficient number of motors 322 can be a number of motors that causes the torque need to fall in a region of a motor efficiency map, corresponding to the number of motors, that includes a maximum operating efficiency for motor assembly 202. The determination of operating efficiency for specific torque and RPM outputs of an electric motor is discussed below in more detail with respect to FIG. 6, which shows a motor efficiency map.

In aspects, the maximally efficient number of motors 322 can be calculated by control system 402 by comparing motor efficiency maps corresponding to various unique subsets of motors 322, as described below with respect to FIG. 18.

In aspects, calculating the maximally efficient number of motors 322 can take into account activation of pairs of motors 322, such that activating the maximally efficient number of motors 322 does not cause mechanical imbalance by activating an unpaired motor 322. Accordingly, the maximally efficient number of motors 322 to be simultaneously activated need not be granular to increments of a single motor 322 (though in aspects it can be if only motor 322*a* is to be activated).

With reference to FIG. 3B, control system 402 can drive each of motors 322*a*-322*g* in a direction that contributes to the turning of gear 318*a* in a particular direction. For example, in aspects in which gears 318*b*-318*g* are each directly coupled to gear 318*a*, control system 402 can drive each of motors 322*b*-322*g* in an opposite direction to motor 322*a*. For example, control system 402 can drive motors 322*b*-322*g* clockwise while driving motor 322*a* counter-clockwise, or vice-versa.

Control system 402 can communicate with motors 322 via controllers 404, such as controllers 404*a*-404*n*. In aspects, controllers 404 can be 3-phase motor controllers. In aspects, controllers 404 can each include an inverter. In aspects, controllers 404 can be variable-frequency drive (VFD) controllers. In aspects, controllers 404 can control motors 322 via field-oriented control (FOC). In aspects, controllers 404 can control motors 322 via direct torque control (DTC) or V/Hz control. In aspects (e.g., if motors 322 are DC motors), controllers 404 can be pulse-width modulation (PWM) controllers and/or H-bridge controllers. Regardless of the type of motor or controller used, controllers 404 can be configured to control the output torque(s) of one or more motors 322, for example, by varying the magnitude of a current (e.g., armature current for a DC motor) within the one or more motors 322. In aspects, controllers 404 can be bodily integrated with motors 322. In other aspects, controllers 404 can be distinct from but communicatively coupled to motors 322, for example, by being integrated within first PCB 326 and/or second PCB 328. As shown in FIG. 4, control system 402 can include a controller 404 per motor 322. Controllers 404 can activate, deactivate, and control individual motors of motors 322 based on the torque need.

Figure 5:
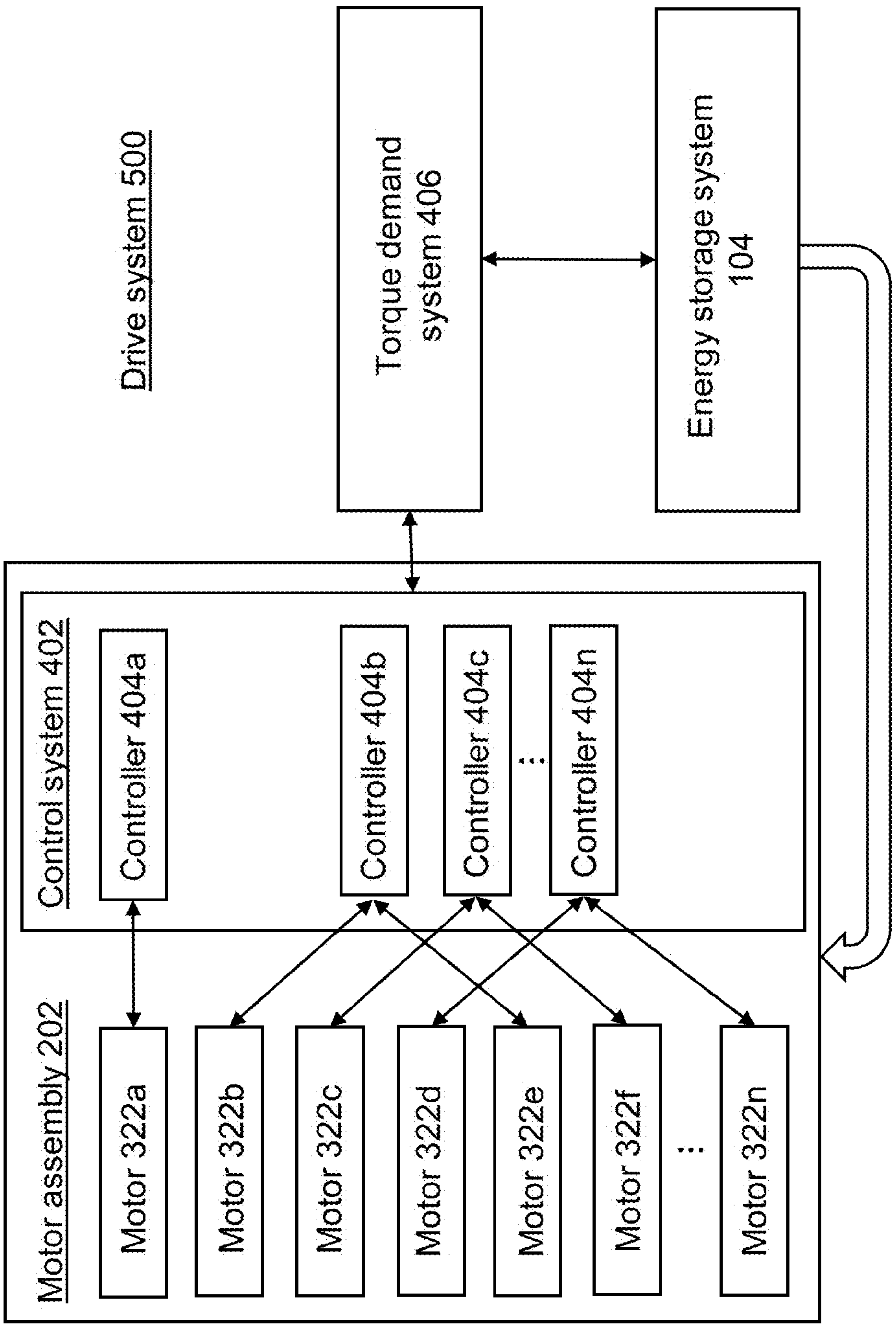
FIG. 5 shows a diagram of a drive system according to aspects of the disclosure.

FIG. 5 shows a diagram of a drive system 500 according to aspects of the disclosure. Drive system 500 can be substantially the same as drive system 400. However, drive system 500 can include a single controller 404 per pair of motors within motors 322. Like drive system 400, drive system 500 can include a single controller 404*a* controlling motor 322*a*. However, drive system 500 can include a single controller 404*b* controlling both of motors 322*b* and 322*e*. Drive system 500 can likewise include a single controller 404*c* controlling both of motors 322*c* and 322*f*. Drive system 500 can include any number of controllers 404 up to controller 404*n*, and, as noted above, motor assembly 202 can include any number of pairs of motors, with the final pair of motors being represented by 322*d* and 322*n*. Each of the pairs of motors can be controlled by a controller 404. In aspects, the pairs of motors controlled by controllers 404 can be two motors arranged on opposite sides of motor 322*a*, like motors 322*b* and 322*e* shown in FIG. 3B. In other aspects, the pairs of motors controlled by controllers 404 can be two motors arranged in any other configuration, such as side by side, like motors 322*b* and 322*c* shown in FIG. 3B.

The configuration of FIG. 5 can be advantageous when motors 322*b*-322*n* are controlled in pairs. For example, the configuration of FIG. 5 can reduce the number of components required while maintaining the functionality of activating or deactivating motors 322*b*-322*n* in pairs based on the torque need.

FIG. 6 shows a graph of motor efficiency as a function of output torque and RPM for an electric motor. Motor efficiency is defined as the percentage of electrical input power that is converted to mechanical output power.

The electric motor of FIG. 6 has a continuous power rating of about 150 kW. While the scale and shape of FIG. 6 depends on the specifications of the electric motor (e.g., continuous power rating, peak power rating, etc.), FIG. 6 illustrates the relationship between torque (N·m), speed (RPM), and efficiency for electric motors. For example, FIG. 6 shows that at 8,000 RPM, the electric motor operates at an efficiency of about 90% when providing 50 N·m of torque. However, the electric motor operates at an efficiency of about 82% when providing 12 N·m of torque at the same RPM. Using an inverter with an efficiency of 92% at low loads to operate the electric motor therefore yields an overall efficiency of about 75% at 12 N·m of torque and 8,000 RPM. In aspects, this torque and RPM represents the approximate requirements of propelling an EV at 60 MPH on a flat road (e.g., a highway).

However, as noted above, motor assembly 202 can provide a means for dynamically adjusting the motor efficiency map corresponding to motor assembly 202. This is accomplished by activating unique subsets of electric motors 322 within motor assembly 202. As used herein, a unique subset of electric motors need not consist of electric motors that are entirely different from those of another unique subset. A subset is "unique" as long as it is not identical to another subset. Therefore, a subset can be unique from another subset by including a different number of motors, motors of different specifications, and/or motors in different positions within electric motor assembl(ies) 202. Accordingly, the term "unique subset" or "maximally efficient" subset as used herein can refer generally to a unique number of motors, for example, three instead of five, to a unique combination of motors of different specifications, and/or to a unique combination of motors of different positions. If a motor efficiency map used to select a unique subset of motors for simultaneous activation corresponds to a unique subset (e.g., five motors) but does not correspond to a single, specific selection of motors that make up the unique subset, control system 402 can use additional logic to select specific motors 322 for activation/deactivation. For example, control system 402 might determine that activation of five motors 322 is most efficient using a motor efficiency map corresponding to five simultaneously activated motors (e.g., motor 322*a* and four adjacent motors 322), and then select five specific motors 322 (e.g., motor 322*a* and four specific adjacent motors 322) based on usage data, mechanical balancing, etc. Additionally, the use of the term "subset" does not necessarily imply fewer than the total number of motors in an engine. For example, motors 322*a*-*g* are a subset of motors 322 shown in FIG. 3B.

In aspects, each unique subset of motors 322 can correspond to a motor efficiency map, with an efficiency for a particular torque and RPM.

In aspects, when a torque need is requested from motor assembly 202, this torque need and the current output RPM can be used to retrieve an efficiency value from each of a plurality of motor efficiency maps, with each of the maps corresponding to a unique subset of motors 322. For whichever motor efficiency map yields the highest efficiency value, a corresponding unique subset can be selected to produce the torque need at the current output RPM. In aspects, this process can occur dynamically to update the unique subset as needed in real-time to produce the torque need at the current output RPM in the most efficient way possible (taking into account any limitations within motor assembly 202, such as only activating motors 322 in balanced pairs).

In an EV, for example, the torque need and current output RPM vary throughout operation of the vehicle. For example, a user may decide to accelerate the EV, increasing the requested torque need, which motor assembly 202 can then be used to generate. Under the influence of the increased output torque, given constant load, the output RPM can rise as motor assembly 202 overcomes the inertia of the EV to accelerate the EV. In other cases, changes in load can lead to changes in RPM while output torque remains constant. For example, a user can begin traveling down a hill, and RPM can increase since load is reduced. Conversely, output torque can change while RPM remains constant. For example, the user can apply more pressure to the EV's accelerator to maintain constant speed while travelling up a hill, increasing the requested torque need and output torque to account for the increase in load caused by the hill.

In any case, in aspects, these changes can be accounted for by referencing motor efficiency maps corresponding to unique subsets of motors 322 (and/or by other methods discussed herein) and activating a different unique subset whenever changes in the torque need and/or output RPM cause the different unique subset to produce the torque need and output RPM more efficiently. Accordingly, the efficiency of motor assembly 202 can be improved when providing the torque need. As a result, the range of an EV implementing motor assembly 202 can be increased.

As an example, providing 12 N·m of output torque at 8,000 RPM, motor assembly 202 can operate at an efficiency of about 92% when operating with a single motor (e.g., motor 322*a*). Using an inverter with an efficiency of 98% at medium loads to operate motor 322*a* yields an overall efficiency of about 90%. The activation of more motors 322 in producing 12 N·m at 8,000 RPM would reduce the efficiency of motor assembly 202, since motor assembly 202 is operating against a relatively low load (e.g., highway conditions) to produce 8,000 RPM with 12 N·m of output torque, and this is an efficient operating regime for a small motor. Therefore, control system 402 chooses to continue operating only motor 322*a* to maintain the higher efficiency. This higher efficiency is not only compared to motor assembly 202 with more motors 322 activated; it also represents an increased efficiency as compared to a single, large electric motor having similar specifications as motor assembly 202 with all motors 322 activated, such single, large electric motors being conventionally provided in electric engines.

In the first case above, an electric motor operating at about 75% overall efficiency would require a battery to provide 13.3 kW of power (not including the 12V parasitic loss and battery loss). Therefore, an 80 kWh battery could provide about 6 hours of operation. At 60 MPH, this corresponds to about 360 miles of range. Motor assembly 202 operating with only motor 322*a* activated, yielding an overall efficiency of 90%, would require a battery to provide 11.1 kW of power (not including the 12V parasitic loss and battery loss). Therefore, an 80 kWh battery could provide about 7.2 hours of operation. At 60 MPH, this corresponds to about 435 miles of range, a 20% improvement. Alternatively, a 20% smaller battery would be needed to travel the same range.

While the example of all but motor 322*a* of motor assembly 202 being deactivated is provided, it should be understood that similar increases in efficiency can be achieved by activating whatever number of motors 322 corresponds to a maximally efficient configuration for a given torque need and RPM output.

Figure 7:
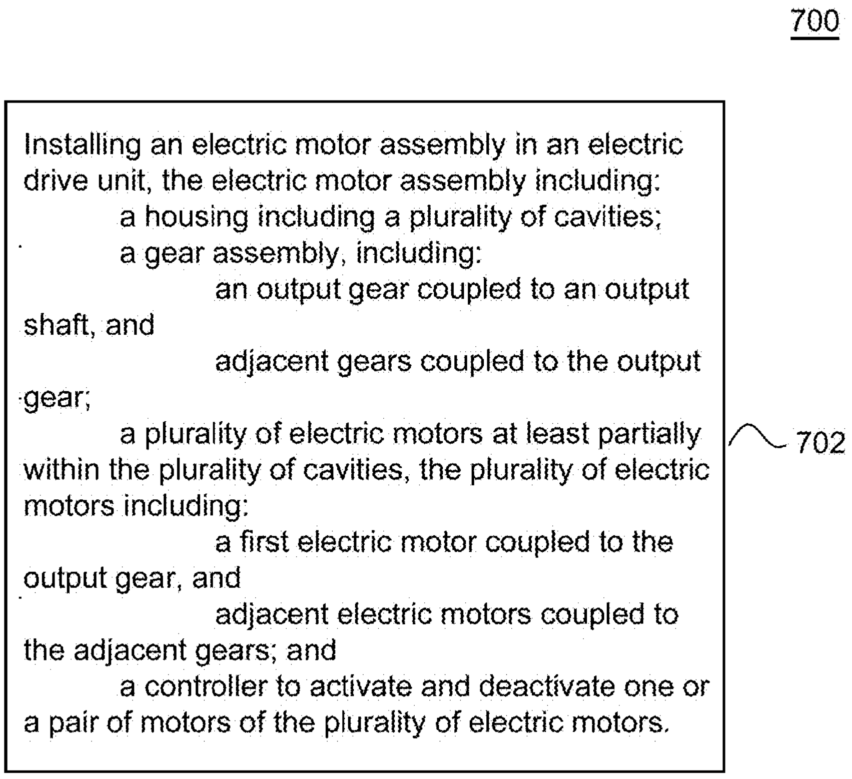
FIG. 7 shows a diagram of a method according to aspects of the disclosure.

FIG. 7 shows a diagram of a method 700 according to aspects of the disclosure. In aspects, the electric drive unit of method 700 can be first or second drive unit 102*a* or 102*b*. The method 700 can include step 702.

Step 702 can include installing an electric motor assembly in an electric drive unit, the electric motor assembly including: a housing including a plurality of cavities; a gear assembly, the gear assembly including: an output gear coupled to an output shaft, and adjacent gears coupled to the output gear; the electric motor assembly further including: a plurality of electric motors at least partially within the plurality of cavities, the plurality of electric motors including: a first electric motor coupled to the output gear, and adjacent electric motors coupled to the adjacent gears; the electric motor assembly further including: a controller to activate and deactivate one or a pair of motors of the plurality of electric motors. In aspects, the housing can be main housing 302. In aspects, the plurality of cavities can be cavities 324*a*-324*g*. In aspects, the gear assembly can be gear assembly 316. In aspects, the adjacent gears can be gears 318*b*-318*g*. In aspects, the output gear can be gear 318*a*. The adjacent gears can be either directly or indirectly coupled to gear 318*a*, as described with respect to FIG. 3B. In aspects, the plurality of electric motors can be motors 322. In aspects, the adjacent electric motors can be motors 322*b*-322*g*. In aspects, the first electric motor can be motor 322*a*. In aspects, the controller can be any one of controllers 404.

In aspects, the electric drive unit of step 702 can be installed on a vehicle. In aspects, the vehicle can be an electric vehicle. In aspects, the vehicle can be vehicle 100.

In aspects, the plurality of cavities of method 700 can include peripheral cavities arranged around a central cavity. In aspects, the peripheral cavities can be cavities 324*b*-324*g* and the central cavity can be cavity 324*a*. In aspects, the adjacent electric motors of method 700 can be an even number of electric motors. In aspects, the electric motor assembly of method 700 can further include a cooling feature configured to simultaneously cool at least one motor of the plurality of electric motors and a printed circuit board (PCB) connected to the at least one motor. In aspects, the cooling feature can be one or more of cooling channels 330 and the PCB can be first PCB 326 and/or second PCB 328. In aspects, method 700 can further include selecting a number of electric motors to be included in the plurality of cavities based on a use environment.

Figure 3C:
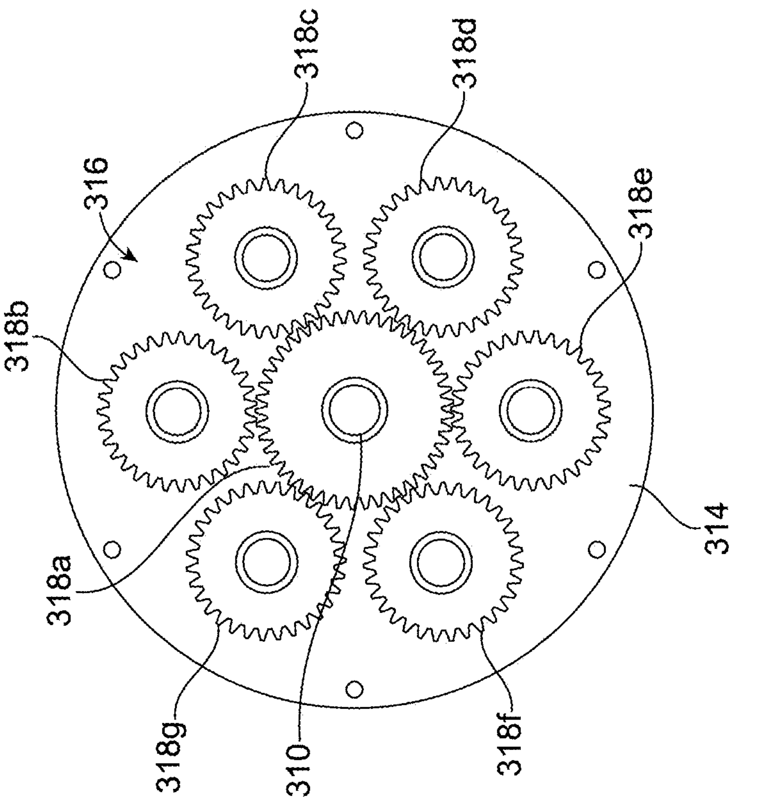
FIG. 3C shows a gear assembly according to aspects of the disclosure.
Figure 8A:
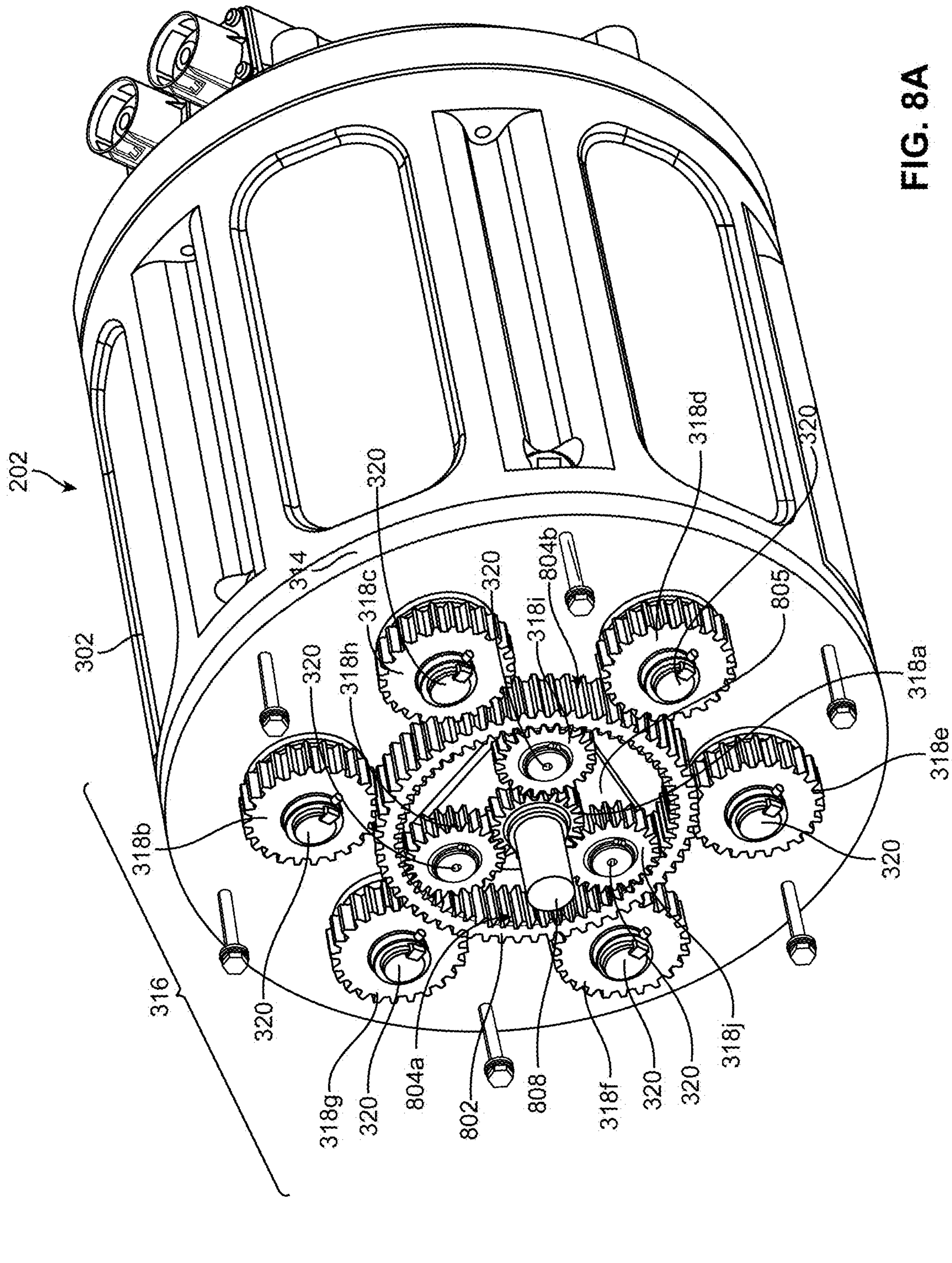
FIG. 8A shows a perspective view of an electric motor assembly according to aspects of the disclosure.
Figure 8B:
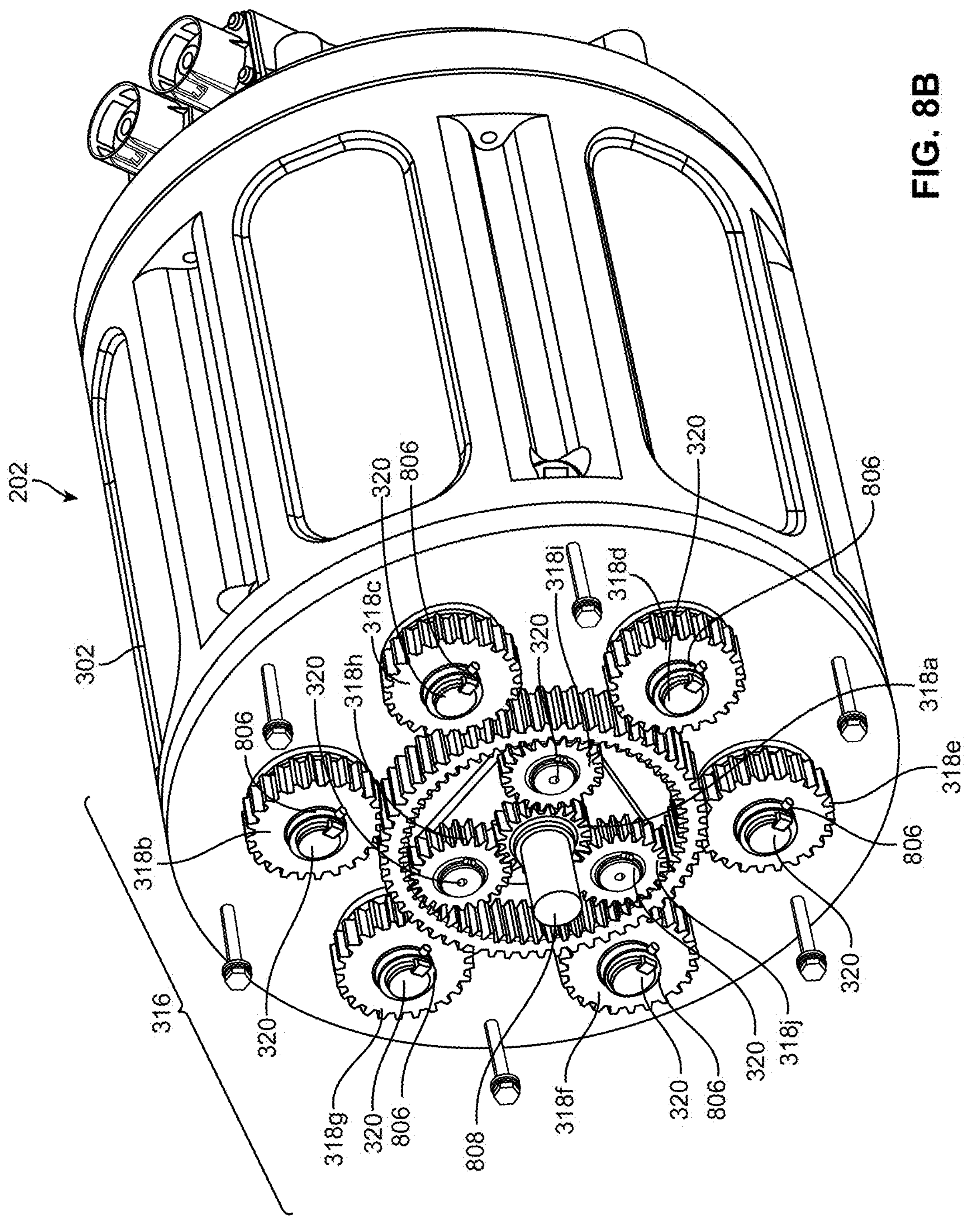
FIG. 8B shows a perspective view of an electric motor assembly according to aspects of the disclosure.

In aspects, the electric motor assembly installed in the electric drive unit of method 700 can be motor assembly 202 described with respect to FIGS. 3A-3C or motor assembly 202 described with respect to FIGS. 8A-8B.

FIG. 8A shows an electric motor assembly 202 according to aspects of the disclosure. As shown in FIG. 8A, in aspects, motor assembly 202 can include additional gears in gear assembly 316 to increase the amount of torque motor assembly 202 can provide. For example, as shown in FIGS. 8A, motor assembly 202 can include a gear assembly 316 configured to provide more space for additional adjacent motors 322 to be coupled to an output gear. In aspects, additional gears of gear assembly 316 shown in FIG. 8A can include gears 318 h-318*j* and ring gear 802. In aspects, the "output gear" can be ring gear 802 rather than gear 318*a*. That is, ring gear 802 can be coupled to a rotatable output shaft (e.g., via a drive plate such as drive plate 1202 shown in FIG. 12) to transmit a torque to an external component (e.g., an axle). In aspects, gear 318*a* can be coupled to a shaft 808 that can spin without engaging an external component and/or that can be anchored in a bearing. In aspects, shaft 808 can be the shaft of motor 322*a*. In other aspects, shaft 808 can be driven by motor 322*a* via one or more intervening components (e.g., gears).

In aspects, ring gear 802 can include gear teeth on both an inner side 804*a* and outer side 804*b*.

In aspects according to FIG. 8A, gear 318*a* can be a sun gear. In aspects, gears 318*h*-318*j* can be planetary gears. In aspects, gears 318 h-318*j* can be rotatably fixed relative to main housing 302. That is, in aspects, gears 318 h-318*j* can rotate around the center axis of their associated shafts 320, but do not translate relative to main housing 302 (or housing 307) such that they move around shaft 808. In aspects, shafts 320 supporting gears 318 h-318*j* can be fixed to a plate 805. In aspects, plate 805 can be secured to support plate 314 (e.g., via screws or bolts). In aspects, gears 318 h-318*j* can be coupled to their associated shafts 320 via needle bearings which allow them to rotate on their associated shafts 320. In aspects, associated shafts 320 supporting gears 318 h-318*j* can be rotatably coupled relative to plate 805, support plate 314, and/or main housing 302 such that the shafts 320 rotate while gears 318 h-318*j* are secured relative to their associated shafts 320.

In aspects, gears 318 h-318*j* do not have any associated motors 322. Instead, they free spin to transmit a torque from gear 318*a*, which is coupled to motor 322*a*, to ring gear 802.

In aspects, gears 318 h-318*j* can be coupled, via their associated shafts 320, to additional motors 322 positioned at least partially within additional cavities 324 of main housing 302.

In aspects, gears 318*a* and 318 *h*-318*j* can be inner adjacent gears. Gears 318*a* and 318 *h*-318*j* can be "inner" adjacent gears in that they can be interior to inner side 804*a* of ring gear 802. Inner side 804*a* can face toward gear 318*a* and shaft 808. Ring gear 802 can be coupled to gears 318 h-318*j*. For example, in aspects, gears 318 h-318*j* can contact and be enmeshed with inner side 804*a*. In aspects, gears 318 h-318*j* can be directly coupled to gear 318*a* and/or ring gear 802. While FIG. 8A shows three gears 318 h-318*j*, in aspects, gear assembly 316 can include any number of gears 318 h-318*j* (e.g., planetary gears), for example, two, four, five, or six.

In aspects, gears 318*b*-318*g* can be outer adjacent gears coupled to ring gear 802. Gears 318*b*-318*g* can be "outer" adjacent gears in that they can be exterior to outer side 804*b* of ring gear 802. Outer side 804*b* can face away from gear 318*a* and shaft 808. In aspects, gears 318*b*-318*g* can contact and be enmeshed with outer side 804*b*. Collectively, gears

318*a*-318*j* can be referred to as adjacent gears, since they are in a common gear assembly 316 with ring gear 802 (the output gear in aspects).

With respect to the aspects according to FIG. 8A-8B, motor(s) 322 coupled to gears 318*a* (and 318 h-318*j*, if any), can be referred to as "inner" adjacent motors 322, and motors 322 coupled to gears 318*b*-318*g* can be referred to as "outer" adjacent motors 322. In aspects, inner adjacent motors 322 can include shafts 320 that lie along axes positioned inside the perimeter of ring gear 802. In aspects, outer adjacent motors 322 can include shafts 320 that lie along axes positioned outside the perimeter of ring gear 802. Collectively, motors 322 coupled to gears 318*a*-318*j* can be referred to as adjacent motors, as noted herein, since they are coupled to gears that are in a common gear assembly 316 with ring gear 802. In aspects, motor 322*a* can still be a central motor and gear 318*a* can still be a central gear.

In aspects, the outer adjacent motors 322 can be an even number of motors 322. For example, motor assembly 202 can include two, four, six, eight, 10, 12, or 14, etc., outer adjacent motors 322.

Because of ring gear 802's increased diameter relative to gear 318*a* of FIG. 3B, a greater number of outer adjacent motors 322 can be included in motor assembly 202, since there is space for additional motors 322 and outer adjacent gears that are enmeshed with ring gear 802. Accordingly, in aspects, motor assembly 202 includes more than six outer adjacent motors 322.

Additionally, the configuration shown in FIG. 8A allows for multiple gear ratios between inner adjacent gears 318*a*, 318 *h*-318*j* and ring gear 802 and between outer adjacent gears 318*b*-318*g* and ring gear 802. For example, in aspects, an inner adjacent gear (e.g., gear 318*a*) can form a first gear ratio with ring gear 802, while an outer adjacent gear can form a second gear ratio with ring gear 802. This can provide multiple layers of configurability for motor assembly 202. Any gear ratio can be selected to ensure that motors 322 will be driven at various speeds to maximize performance and efficiency, achieve gear reduction, avoid field weakening, etc. In aspects, all outer adjacent gears 318*b*-318*g* can form the same gear ratio with ring gear 802.

In aspects, the first gear ratio can be lower than the second gear ratio. For example, gear 318*a* (e.g., a sun gear) can form a gear ratio of 4:1 with ring gear 802 (gear 318*a* turns four times for each single turn of ring gear 802), while one or more outer adjacent gears 318*b*-318*g* can form a gear ratio of 8:1 with ring gear 802 (the outer adjacent gear turns eight times for each single turn of ring gear 802). These are example gear ratios and any values for the first and second gear ratios can be selected. In this example, motor 322*a* coupled to gear 318*a* will run at half the speed of outer adjacent motors 322 coupled to the one or more outer adjacent gears 318*b*-318*g*. The first gear ratio being lower than the second gear ratio can avoid or reduce field weakening of motor 322*a*, since motor 322*a* will run at a reduced speed compared to outer adjacent motors 322. Avoiding or reducing field weakening in motor 322*a* (and motor assembly 202) can benefit efficiency since field weakening can induce increased losses, heat generation, and associated reductions in efficiency.

In aspects, motor assembly 202 can include additional ring gears coupled to additional gears, and shafts positioned outside the additional ring gears, coupled to additional motors. For example, in aspects, motor assembly 202 can include an additional ring gear coupled to gears 318*b*-318*g* on the additional ring gear's inner side and additional gears coupled to the outer side of the additional ring gear. In this way, the continuous and peak output torque of motor assembly 202 can be increased.

Motors 322 of the motor assembly 202 shown in FIG. 8A can be selectively controlled as described with respect to FIGS. 3A-3B and FIGS. 4-5.

In aspects of motor assembly 202 shown in FIGS. 3A-3C and 8A, deactivated motors 322 can be free-spun due to the engagement of their associated gears 318 with one another (either directly or indirectly). For example, if motor 322*b* is deactivated while motor 322*a* remains activated, motor 322*b*'s shaft 320 can remain statically coupled to gear 318*b*, which can be rotated by its coupling to gear 318*a*. This can rotate motor 322*b*'s shaft 320. Because motors 322 can include permanent magnets in their rotors, this can produce substantial back electric and magnetic fields (back EMF)—which can cause motor assembly 202 to require field weakening to produce high RPMs—and can cause mechanical degradation of internal motor components caused by continual spinning. Additionally the torque required to turn deactivated motors 322 can cause losses.

FIG. 8B shows an electric motor assembly 202 according to aspects of the disclosure. As shown in FIG. 8B, in aspects, motor assembly 202 can include clutches 806 to mechanically engage and disengage motors 322 from adjacent gears 318*b*-318*g* (and 318*h*-318*j* if motor assembly 202 includes motors 322 associated with gears 318 h-318*j*). In aspects, each of clutches 806 can selectively secure an adjacent gear 318 relative to a shaft 320. When the clutch 806 is engaged, the adjacent gear 318 is secured relative to shaft 320. When the clutch 806 is disengaged, the adjacent gear 318 can rotate freely relative to shaft 320. This can allow an adjacent gear 318 to spin on shaft 320, which can be useful when an associated motor 322 is deactivated according to the methods disclosed herein. By mechanically disengaging deactivated motors 322 from gear assembly 316, back EMF produced by rotation of shaft 320 of the deactivated motor 322 due to its coupling to other driven gears of gear assembly 316 can be avoided. Accordingly, individual motors 322 can be selectively mechanically disengaged from gear assembly 316 to reduce back EMF and increase the efficiency of a drive system implementing motor assembly 202.

Clutches 806 can include a variety of types of clutches, including but not limited to hydraulic/pneumatic clutches, electromagnetic clutches, and sprag clutches. In aspects, hydraulic/pneumatic clutches can include hydraulically or pneumatically operated clutch packs, as described with respect to FIGS. 9A-9B. In aspects, clutches 806 can each include a hydraulically or pneumatically operated clutch pack. In aspects, clutches 806 can include electromagnetic clutches. In aspects, clutches 806 can include sprag clutches.

While shown on aspects of motor assembly 202 including gears 318 h-318*j* and ring gear 802, clutches 806 can be implemented with gears 318*b*-318*g* shown in FIGS. 3B-3C. Further, while FIG. 8B shows clutches 806 implemented with all gears 318*b*-318*g*, in aspects, clutches 806 can be implemented with only a subset of gears 318*b*-318*g*.

Figure 16:
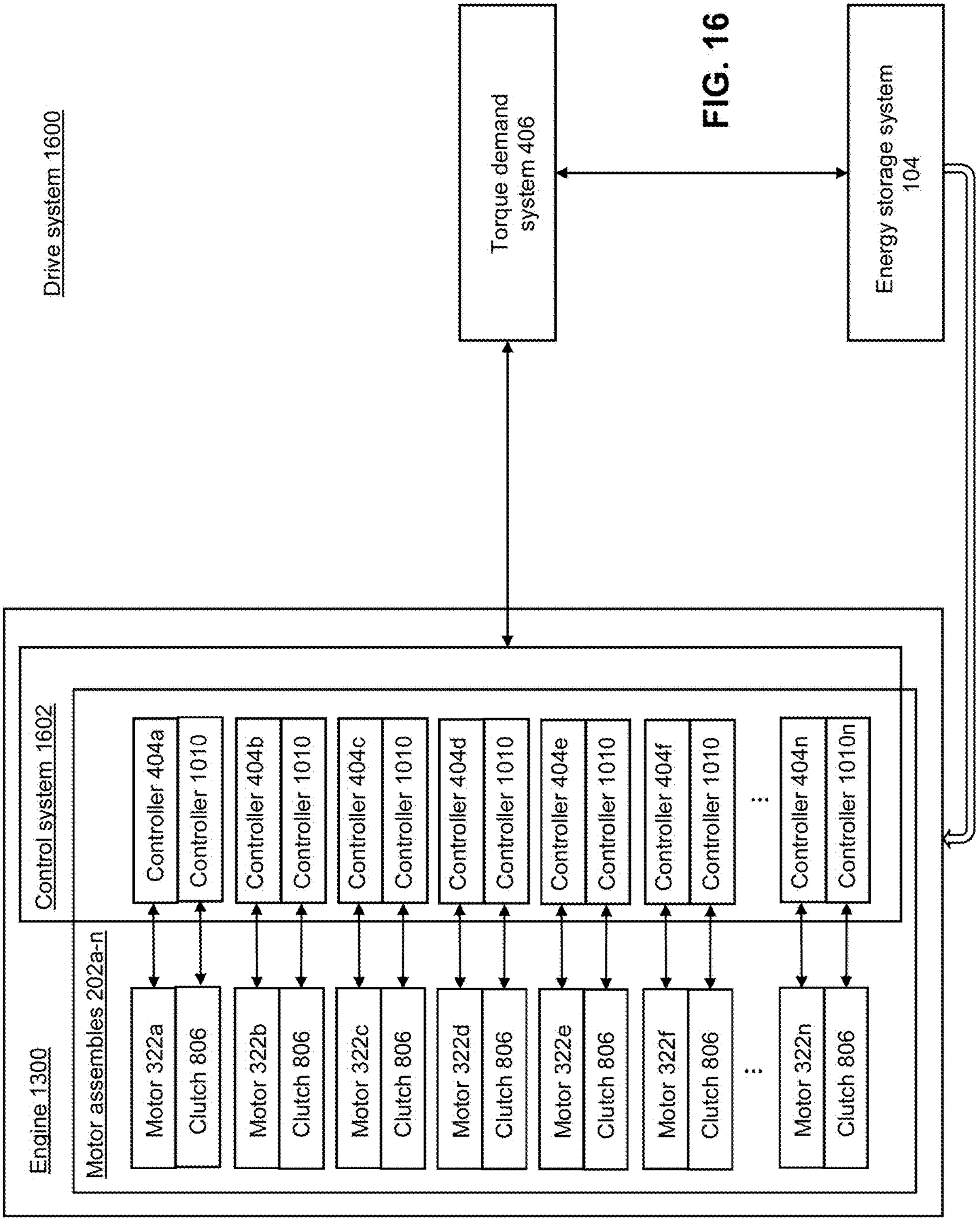
FIG. 16 shows a diagram of a drive system according to aspects of the disclosure.
Figure 17:
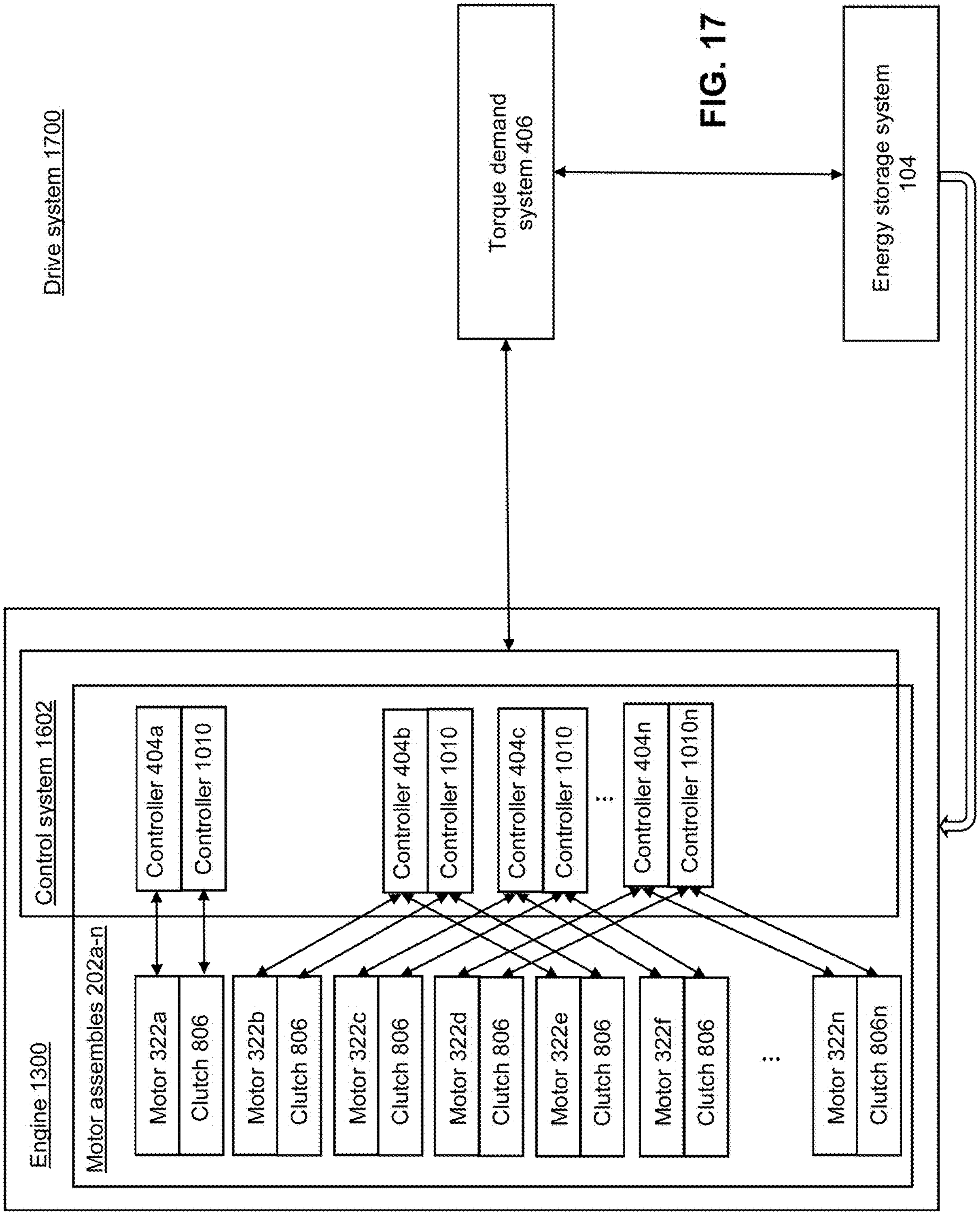
FIG. 17 shows a diagram of a drive system according to aspects of the disclosure.

Additionally, in aspects, a clutch 806 can be implemented with gear 318*a* to allow gear 318*a* to selectively free spin on shaft 808, or shaft 310 in the aspects shown in FIGS. 3B-C. This optional clutch 806 is shown in FIGS. 16-17 associated with motor 322*a*. In aspects in which gear 318*a* is the output gear rather than ring gear 802 and shaft 808 is the output shaft (discussed below), and in aspects according to FIGS. 3B-C, this can provide for efficient mechanical disengagement of adjacent motors 322*b*-*g* from gear 318*a* while motor assembly 202 is providing an output torque. For example, the clutch 806 can prevent adjacent motors 322*b-g* from free-spinning when only motor 322*a* is activated, since shaft 808/output shaft 310 shown in FIGS. 3B-C can spin independently of gear 318*a* to transmit a torque to an external component without driving gear 318*a*, which is coupled to gears 318*b*-318*g* coupled to motors 322*b-g*. In some aspects in which gear 318*a* is the output gear rather than ring gear 802, motor assembly 202 can include a clutch 806 only for gear 318*a*. However, in general, a clutch 806 can be implemented with any gear 318 that is paired with a motor 322.

In aspects, plate 805 can be rotatably coupled to support plate 314 to allow gears 318 h-318*j* to process around gear 318*a* when motor 322*a* is activated. Gears 318 h-318*j* can be rotatably fixed relative to plate 805. That is, gears 318 h-318*j* can rotate around the center axis of their associated shafts 320, but do not translate relative to plate 805. Accordingly, plate 805 rotating can cause gears 318 h-318*j* to process around gear 318*a*. In aspects, a clutch 806 can be implemented with plate 805 to selectively secure plate 805 relative to support plate 314 (this optional clutch 806 is shown in FIGS. 16-17 associated with motor 322*a*). In this way, when gear 318*a* is driven by motor 322*a*, gears 318 h-318*j* can either selectively process around gear 318*a* by the rotation of plate 805 (clutch disengaged) or translate a torque to ring gear 802 while plate 805 is fixed relative to support plate 314 (clutch engaged). In aspects, a clutch pack as described with respect to FIGS. 9A-9B can be implemented to selectively secure plate 805 relative to support plate 314.

In aspects in which gear 318*a* is the output gear and shaft 808 is the output shaft (discussed below), including a clutch 806 for plate 805 can provide for clutching motor 322*a* with respect to remaining motors 322 in motor assembly 202 so that motor 322*a* can operate without free-spinning motors 322*b-g* if motors 322*b-g* are deactivated (see FIG. 8A). This can provide for efficient mechanical disengagement of adjacent motors 322*b-g* from gear 318*a* while motor assembly 202 is providing an output torque. For example, the clutch 806 selectively securing plate 805 to support plate 314 can prevent adjacent motors 322*b-g* from free-spinning when only motor 322*a* is activated, since gear 318*a* can spin without rotating ring gear 802, which is coupled to gears 318*b*-318*g* coupled to motors 322*b-g*. Instead, plate 805 can rotate and allow gears 318 h-318*i* to process around rotating gear 318*a* so that no or minimal torque is transferred to ring gear 802. In some aspects in which gear 318*a* is the output gear rather than ring gear 802, motor assembly 202 can include only a clutch 806 selectively securing plate 805 to support plate 314.

In aspects, motor assembly 202 shown in FIGS. 8A-8B can include no clutches 806.

In aspects, rather than implementing clutches 806 with gears 318, motors 322 coupled to gears 318 can be induction motors. This can eliminate problems otherwise caused by back EMF produced by spinning permanent magnets within motors 322.

Figure 9A:
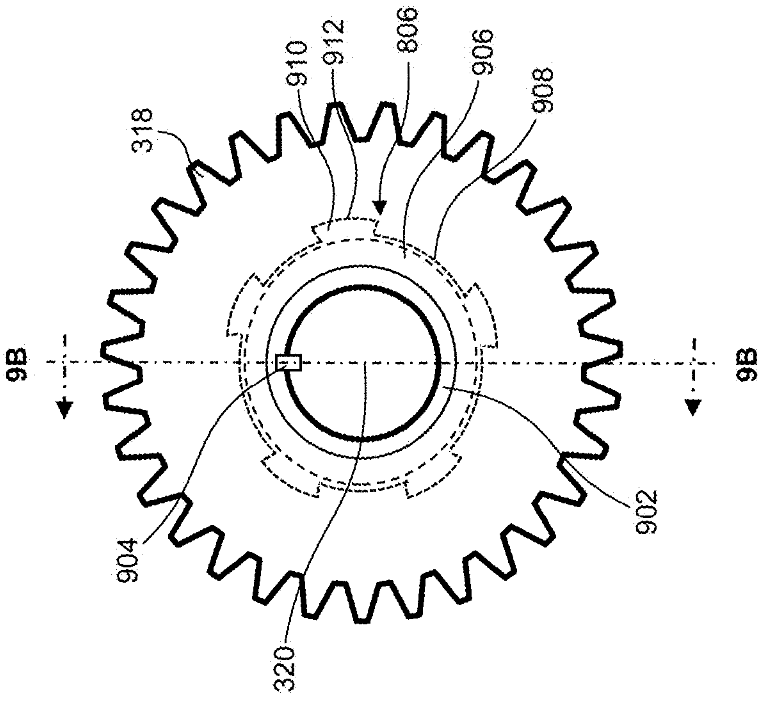
FIG. 9A shows a gear and clutch according to aspects of the disclosure.
Figure 9B:
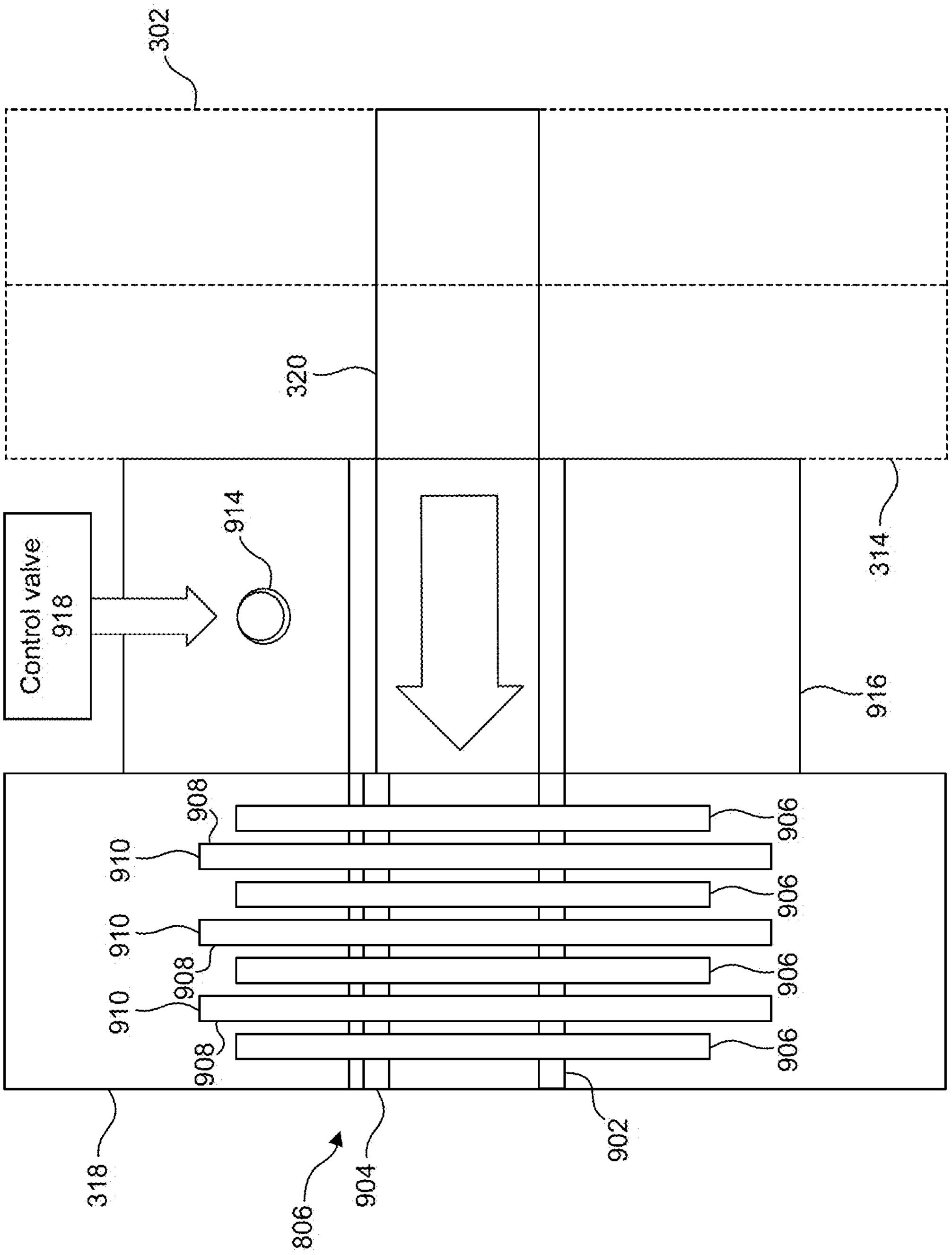
FIG. 9B shows a section view of the gear and clutch shown in FIG. 9A, taken along the line 9B-9B, according to aspects of the disclosure.

FIGS. 9A-9B show an example clutch 806 for use with a gear 318 according to aspects of the disclosure. Clutch 806 shown in FIGS. 9A-9B can include a hydraulically or pneumatically operated clutch pack. Clutch 806 shown in FIGS. 9A-9B is exemplary and is not intended to limit clutches 806 described herein to any particular type of clutch. As shown in FIG. 9A, a clutch 806 can include a hub 902 secured relative to shaft 320 via key 904, which is situated in a keyway formed by shaft 320 and hub 902. Clutch 806 can also include a drive disk 906 coupled to hub 902. Drive disk 906 can be secured relative to hub 902 (e.g., via gear teeth) and can rotate with shaft 320 and hub 902. Clutch 806 can also include a friction disk 908 coupled to gear 318. Friction disk 908 can be secured relative to gear 318 via protrusions 910, which fit into slots 912 of gear 318 or another component statically coupled to gear 318. Clutch 806 can be actuated such that drive disk 906 and friction disk 908 are selectively pressed against one another, causing static friction between drive disk 906 and friction disk 908 to secure gear 318 relative to shaft 320 via friction disk 908, drive disk 906, and hub 902.

As shown in FIG. 9B, clutch 806 can include a plurality of drive disks 906 and a plurality of friction disks 908. Drive disks 906 and friction disks 908 can form a clutch pack. The clutch pack can be operated via an inlet 914 which can receive a gas or liquid. In aspects, the gas can be pressurized air and/or other gases, and the liquid can be pressurized water or oil.

Inlet 914 can be positioned on a support 916, which can be a hollow cylinder or block through which shaft 320 runs. Support 916 can be statically coupled to main housing 302, in some cases via support plate 314, such that support 916 does not rotate relative to main housing 302. A control valve 918 can control the release of a pressurized gas or liquid into inlet 914. A pressurized gas or liquid released into inlet 914 can force drive disks 906 and friction disks 908 to contract along the axis of shaft 320, causing them to lock together to transmit a torque between shaft 320 and gear 318.

Figure 10:
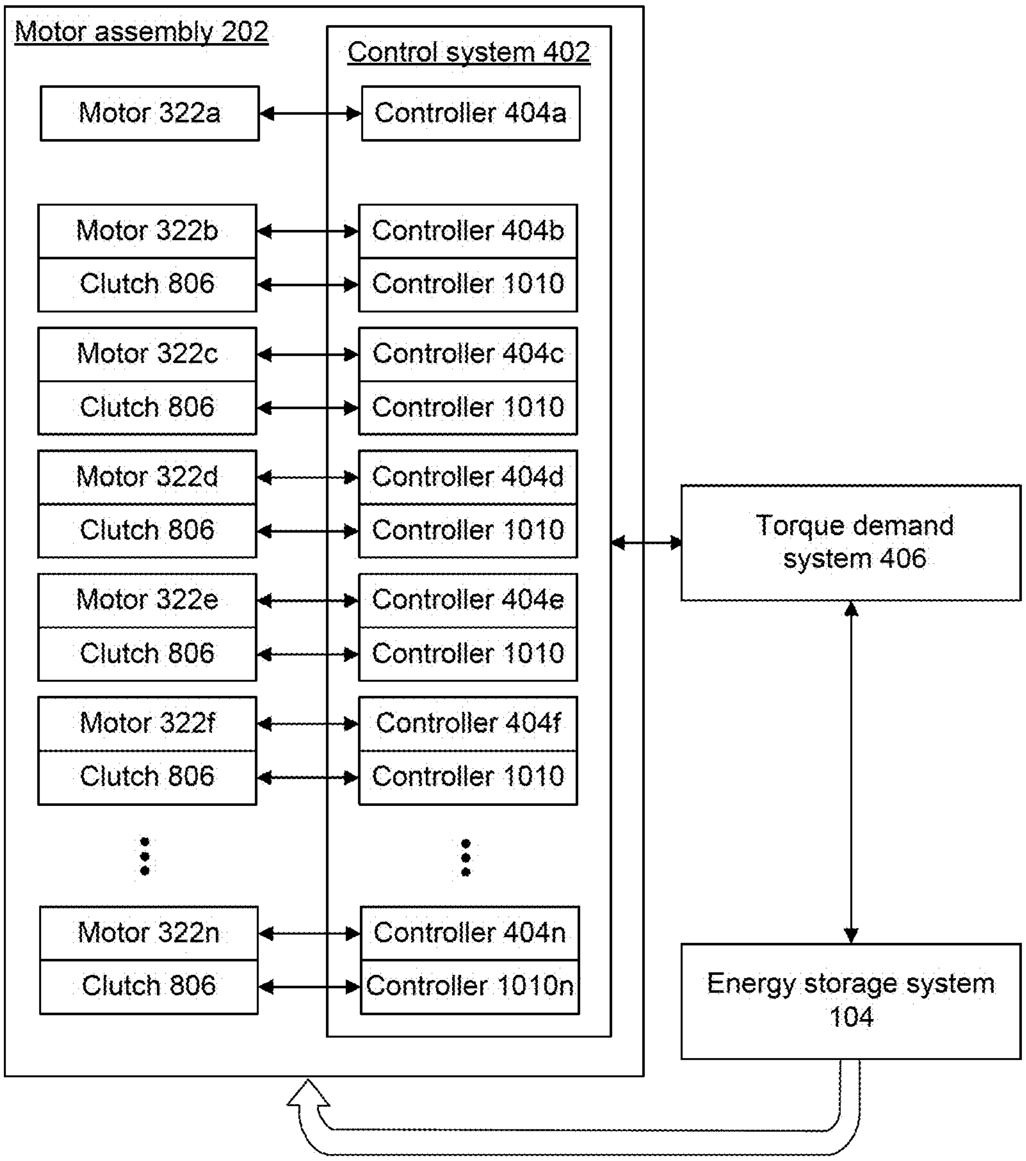
FIG. 10 shows a diagram of a drive system according to aspects of the disclosure.

FIG. 10 shows a drive system 1000 according to aspects of the disclosure. Drive system 1000 can include energy storage system 104, control system 402, and torque demand system 406 as described with respect to FIGS. 4-5. Drive system 1000 can include motor assembly 202 as described with respect to FIGS. 3A-3C or FIGS. 8A-9B. In aspects according to FIG. 10, control system 402 can additionally include controllers 1010 to control respective clutches 806. In aspects, controllers 1010 can include electrically operated control valves. In aspects, controllers 1010 can include control valves 918 of each clutch 806, which can be electrically operated. The control valves 918 can receive signals from one or more computer processors of control system 402 instructing the control valves 918 to open or close, or otherwise regulate the pressure of a fluid passing through control valves 918.

In aspects, control system 402 can be configured to: activate and deactivate one or more motors 322 based on a torque need received from torque demand system 406 such that a number of simultaneously activated motors 322 depends on the torque need; and mechanically engage or disengage, by operating a clutch 806, an activated or deactivated adjacent motor 322 to or from an adjacent gear 318 in response to the activated or deactivated adjacent motor 322 having been activated or deactivated, respectively. In aspects, alternatively or additionally, control system 402 can be configured to: mechanically engage and disengage one or more adjacent electric motors 322 to and from one or more adjacent gears 318 based on a torque need received from torque demand system 406 such that a number of simultaneously mechanically engaged motors 322 depends on the torque need; and activate or deactivate a mechanically engaged or disengaged adjacent motor 322 in response to the mechanically engaged or disengaged adjacent motor 322 having been mechanically engaged or disengaged, respectively. In aspects, alternatively or additionally, control system 402 can be configured to send signals to an adjacent motor 322 and its associated clutch 806 simultaneously to both activate or deactivate the adjacent motor 322 and mechanically engage or disengage the adjacent motor 322 from an adjacent gear 318, respectively.

In aspects, control system 402 can be configured to mechanically disengage an adjacent motor 322 from an adjacent gear 318 based on a torque need, deactivate the adjacent motor 322, reactivate the adjacent motor 322 based on a change in the torque need, and then mechanically reengage the adjacent motor 322 to the adjacent gear 318. In aspects, control system 402 can be configured to deactivate an adjacent motor 322 based on a torque need, mechanically disengage the adjacent motor 322 from an adjacent gear 318, reactivate the adjacent motor 322 based on a change in the torque need, and then mechanically reengage the adjacent motor 322 to the adjacent gear 318.

Accordingly, control system 402 may be configured to mechanically engage or disengage an adjacent electric motor 322 to or from an adjacent gear 318 in conjunction with the adjacent electric motor 322 being activated or deactivated, respectively, using a variety of methods. Using any of the above methods, adjacent motors 322 can be both electrically and mechanically disengaged when they are not required to meet a torque need, and/or when their operation decreases the efficiency of motor assembly 202 in producing an output torque at a given RPM. Mechanical disengagement reduces or avoids inefficiencies caused by back EMF produced by spinning deactivated motors 322. Additionally, mechanical degradation of internal motor components can be reduced or avoided.

In aspects, control system 402 can be configured to seamlessly reintegrate a previously deactivated and mechanically disengaged adjacent motor 322 with gear assembly 316. For example, control system 402 can be configured to activate the adjacent motor 322 and control, via a controller 404, the rotational velocity of its shaft 320 to match the rotational velocity of the adjacent gear 318 coupled to its shaft 320 and rotating within gear assembly 316 (but disengaged by the previous operation of an associated clutch 806). Then, once the rotational velocity of shaft 320 matches the rotational velocity of the adjacent gear 318, within certain tolerances (e.g., ±10%, 5%, 2%, or 1%), control system 402 can be configured to engage the associated clutch 806 to secure the adjacent gear 318 relative to shaft 320.

Control system 402 can be configured as described herein using any known method of computer programming. For example, control system 402 can include one or more computer processors (e.g., one or more MPUs, MCUs, and/or SoCs) and memory having software instructions stored thereon. The memory can include a non-transitory computer-readable medium. The one or more computer processors can be communicatively coupled to the memory and can be configured to perform operations specified in the software instructions, for example: receiving a torque need from torque demand system 406, calculating a required and/or maximally efficient number of motors 322 to meet the torque need as described herein, selecting motors 322 to activate/deactivate and mechanically engage/disengage, and sending instructions via controllers 404/1010 to the selected motors 322 and their associated clutches 806 to perform activation/deactivation and mechanical engagement/disengagement. The memory of control system 402 can include dynamic random access memory (DRAM), low-power dynamic random access memory (LPDRAM), NOR flash memory, NAND flash memory, embedded MultiMediaCard (eMMC), universal flash storage (UFS), and/or non-volatile memory express (NVMe) memory.

Figure 11:
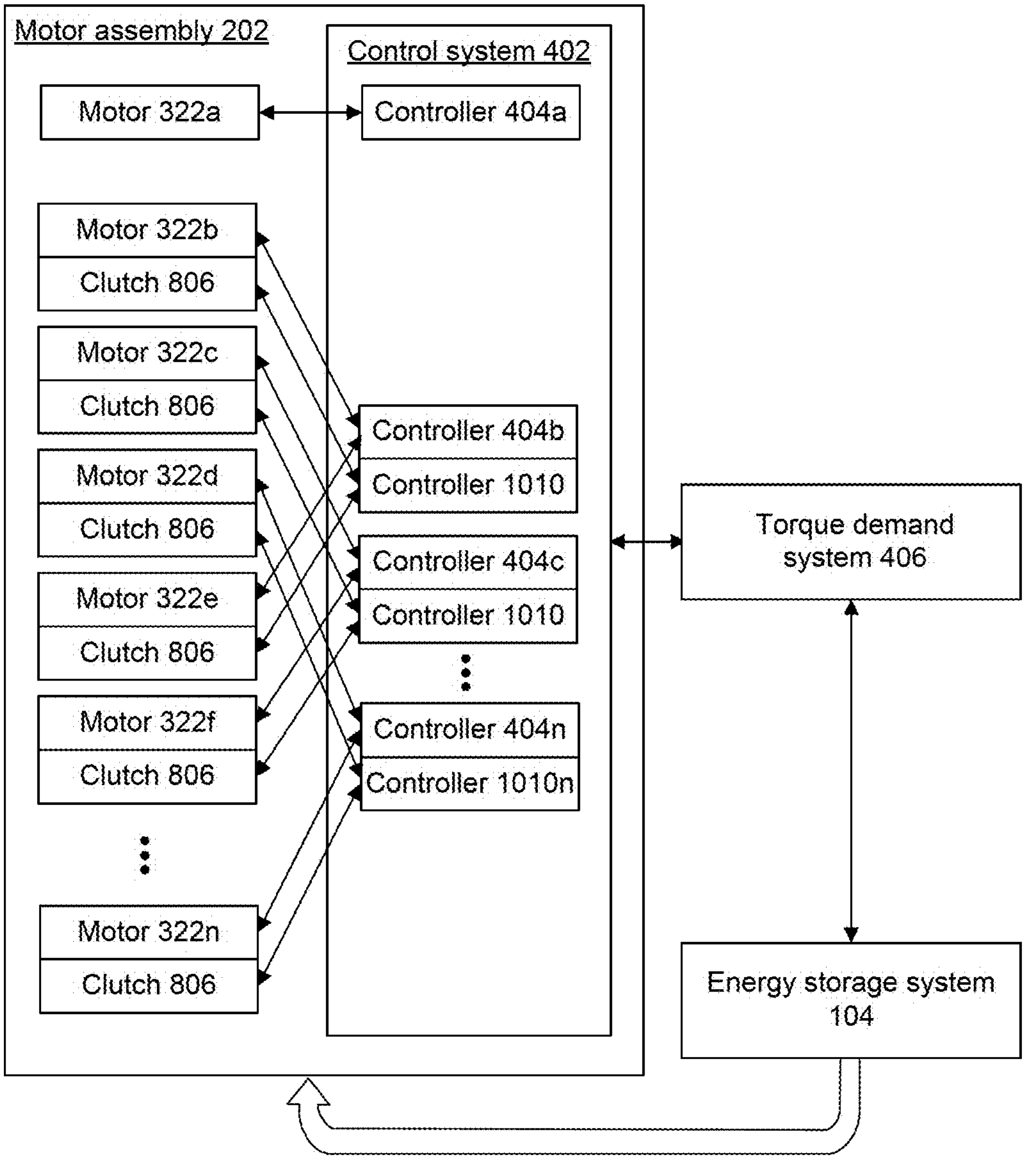
FIG. 11 shows a diagram of a drive system according to aspects of the disclosure.

FIG. 11 shows a drive system 1100 according to aspects of the disclosure. FIG. 11 shows single controllers 404 and 1010 being used for multiple motors 322 and clutches 806, analogous to FIG. 5. As shown in FIG. 11, in aspects, a single controller 404 can be used to control two adjacent motors 322 (for example, a pair of opposing motors 322 within a motor assembly 202), and a single controller 1010 can be used to control two clutches 806. This can be advantageous for activating/deactivating and mechanically engaging/disengaging adjacent motors 322 and associated clutches 806 in pairs to maintain mechanical balance within gear assembly 316, as discussed herein.

The configurations of drive systems 1000 and 1100 shown in FIGS. 10-11 are not intended to limit the specific number of adjacent motors 322 that a single controller 404 controls, or the number of clutches 806 that a single controller 1010 controls. For example, a single controller 404 can control any number 1, . . . , n of adjacent motors 322 intended to be operated together (i.e., driven at the same speed and deactivated/activated simultaneously) and a single controller 1010 can control any number 1, . . . , n of clutches 806 intended to be operated together (i.e., engaged/disengaged simultaneously), where n is a positive integer. Additionally, in aspects, a hybrid of the drive systems 1000 and 1100 of FIGS. 10-11 is contemplated, in which a single controller 404 is used to control two adjacent motors 322, but two separate controllers 1010 are used to control clutches 806 associated with the same two adjacent motors 322.

In aspects, motor assembly 202 described with respect to FIGS. 3A-3C or FIGS. 8B-11 can implement a novel resolver configuration. A resolver is a device that measures the angular position and angular speed of a motor 322's shaft 320. The data produced by the resolver is used in the control of the motor 322, since a motor controller can implement data on current operating metrics to accurately adjust torque and/or RPM. Typically, each motor 322 requires a separate resolver.

The novel resolver configuration can include a single resolver used for multiple motors 322. In aspects of motor assembly 202 not including clutches 806, this can be accomplished, for example, by using a single resolver for multiple adjacent motors 322*b*-322*g* that are in sync (i.e., their associated shafts 320 rotate at the same speed and are simultaneously at the same angular displacement with respect to an initial angular position). However, in the aspects of motor assembly 202 including clutches 806, mechanically disengaged motors 322 can fall out of sync with other mechanically engaged motors 322.

However, in aspects, motor assembly 202 including clutches 806 can still include a single resolver per multiple motors 322. For example, motor assembly 202 can include a single resolver for a pair of adjacent motors 322. In aspects, motor assembly 202 can include a single resolver for any number of adjacent motors 322.

In aspects, the use of a single resolver per multiple motors 322 can be achieved by control system 402 performing a resolverless calculation that considers feedback produced by permanent magnets within motors 322. When a deactivated adjacent motor 322 is mechanically disengaged from an adjacent gear 318 as described herein, its shaft 320 will continue to rotate at a substantially reduced rate and/or for a short time due to angular momentum of the shaft 320/adjacent gear 318 and friction between the shaft 320 and the adjacent gear 318. As the shaft 320 rotates, the permanent magnets of the adjacent motor 322's rotor will produce back EMF. In aspects, control system 402 can receive this back EMF and calculate, based on data and/or the waveform related to the back EMF, how much the shaft 320 has rotated since going out of sync with another adjacent motor 322 that is coupled to a resolver. Control system 402 can use the results of this calculation, in association with data from the resolver coupled to the other adjacent motor 322, to obtain shaft angular position and angular speed data necessary to control both adjacent motors 322. In aspects, control system 402 can do this for any number of adjacent motors 322, using a single resolver coupled to one of the adjacent motors 322.

Figure 12:
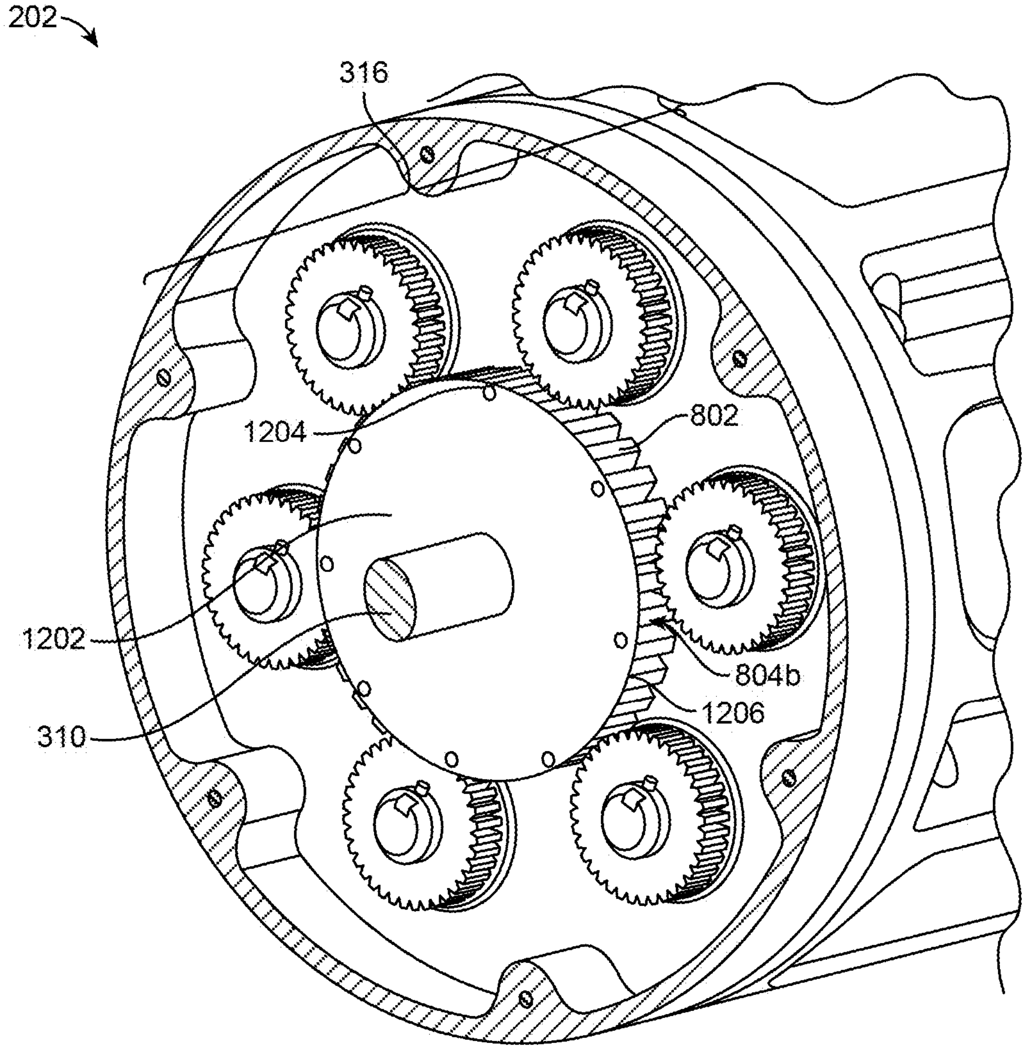
FIG. 12 shows a perspective view of a portion of an electric motor assembly according to aspects of the disclosure.

FIG. 12 shows an electric motor assembly 202 according to aspects of the disclosure. As shown in FIG. 12, in aspects, motor assembly 202 can include a drive plate 1202. In aspects, ring gear 802 can be coupled to a rotatable output shaft (e.g., output shaft 310) via drive plate 1202 to transmit a torque to an external component (e.g., an axle). In the view shown in FIG. 12, shaft 808 can be hidden underneath drive plate 1202. Shaft 808 can be distinct from an unattached to output shaft 310.

Output of a torque through ring gear 802 and drive plate 1202 (i.e., not directly via shaft 808 driven by or of motor 322*a*) can provide internal gear reduction within motor assembly 202. In aspects, one or more gears 318 of gear assembly 316 that are coupled to motors 322 can form a gear ratio of greater than 1 with ring gear 802 (the one or more gears 318 have fewer teeth than ring gear 802 and make more than 1 full turn for every full turn of ring gear 802). In aspects, all gears 318 of gear assembly 316 that are coupled to motors 322 can form a gear ratio of greater than 1 with ring gear 802. Having gears 318 that are coupled to motors 322 and form a gear ratio of greater than 1 with ring gear 802 can provide gear reduction within motor assembly 202. This can reduce the need for further gear reductions, and thus additional components, to be performed/included outside of motor assembly 202 within a drivetrain of a vehicle.

In aspects, drive plate 1202 can be removably coupled to ring gear 802. For example, drive plate 1202 can be removably coupled to ring gear 802 by fasteners 1204 (e.g., screws or bolts) inserted through drive plate 1202 and into an outward-facing rim 1206 of ring gear 802. Drive plate 1202 being removably coupled to ring gear 802 can increase the ease of manufacturing ring gear 802, as gear teeth can be formed on both its inner side 804*a* and outer side 804*b* without interference from other components.

In aspects, drive plate 1202 can be integrally formed with ring gear 802.

Drive plate 1202 can be statically coupled to output shaft 310 such that rotation of drive plate 1202 rotates output shaft 310.

In aspects, motor assembly 202 need not include drive plate 1202 and output shaft 310. In such aspects, shaft 808 shown in FIGS. 8A-8B can be the "output shaft" and gear 318*a* can be the "output gear." Such a configuration can reduce weight and costs associated with adding drive plate 1202. Ring gear 802 can be used to increase space within motor assembly 202 for the attachment of additional motors 322 and adjacent gears 318.

Figure 13A:
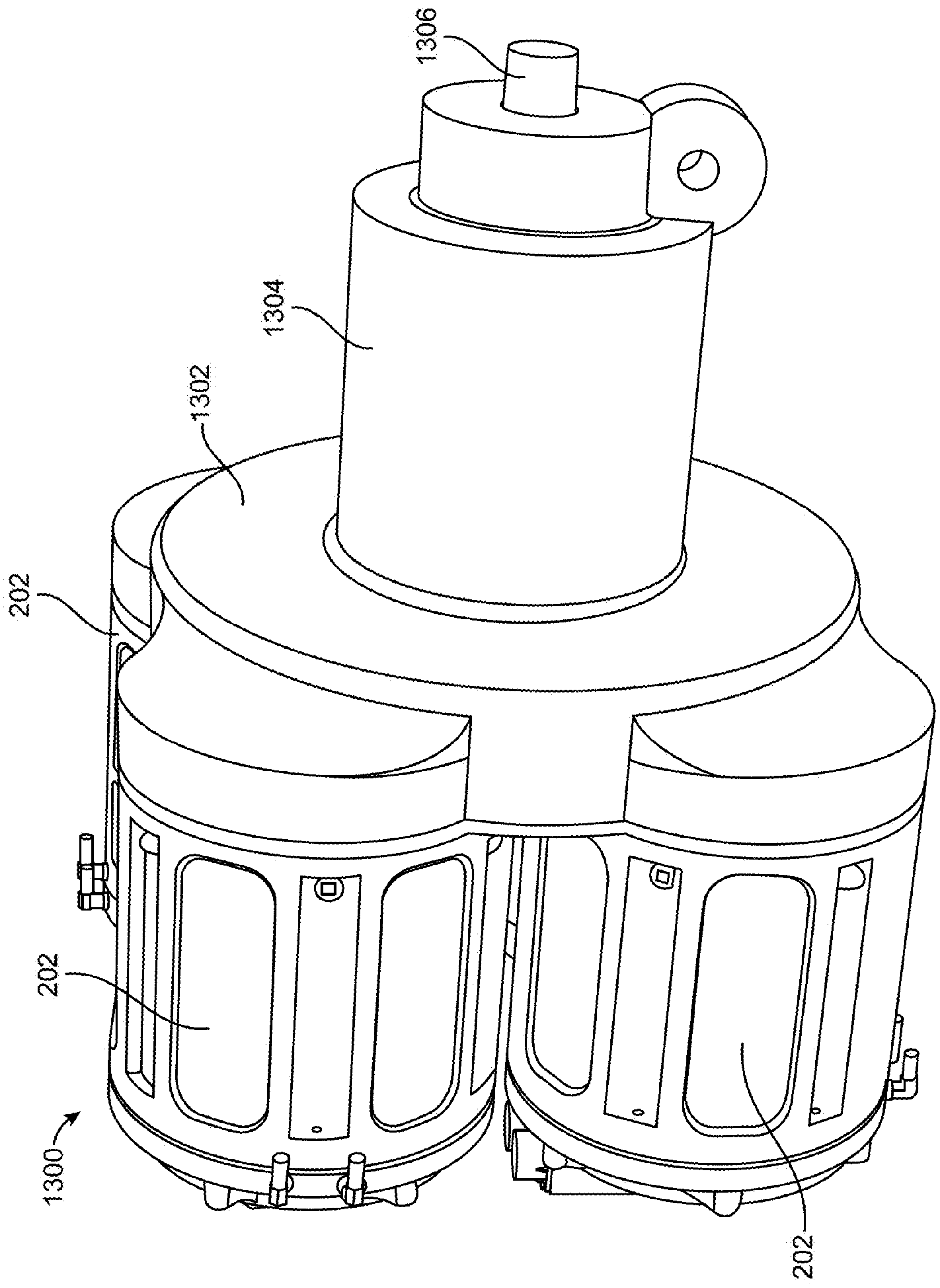
FIGS. 13A-13B show perspective views of an electric engine according to aspects of the disclosure.
Figure 13B:
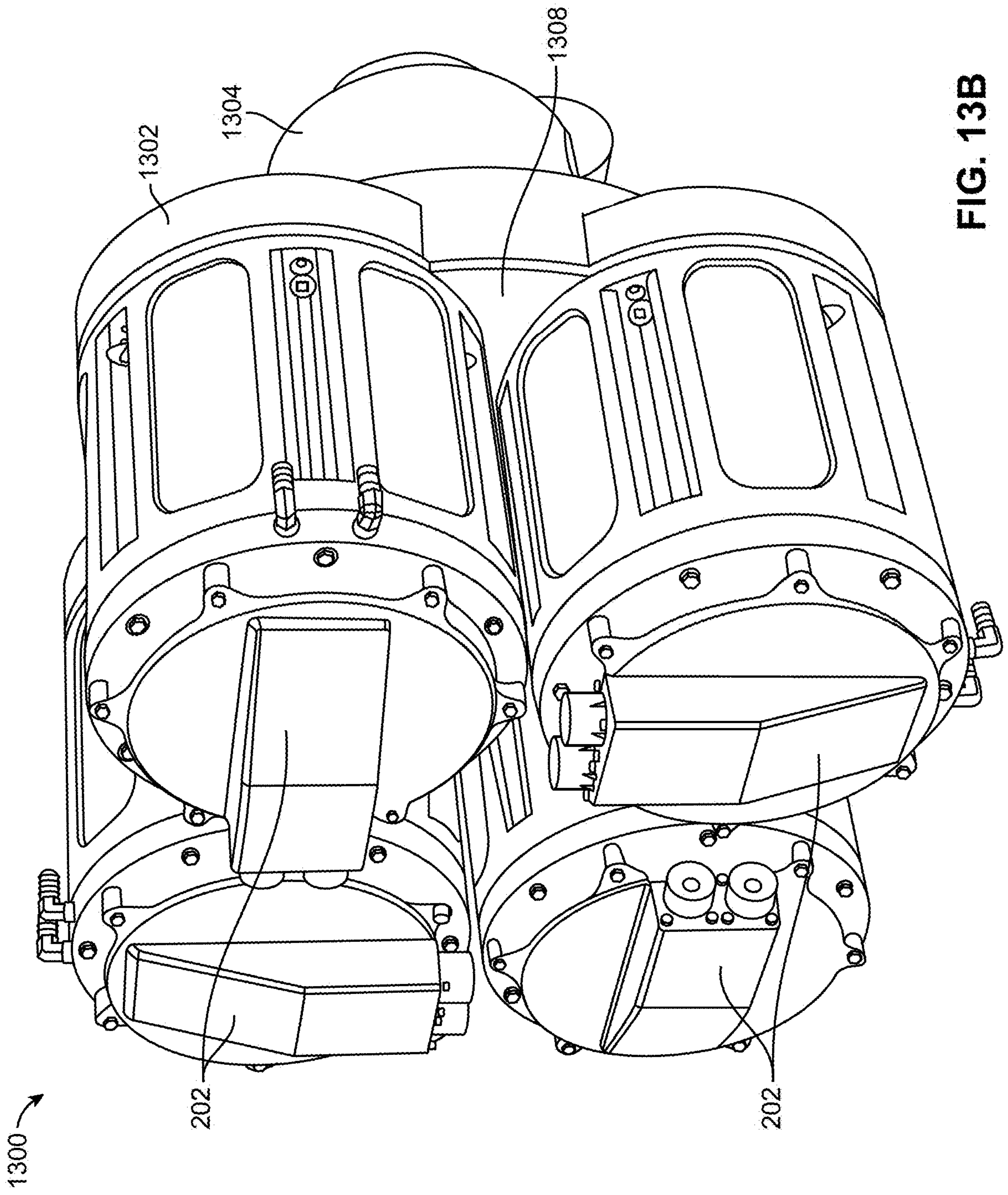

FIGS. 13A-13B show an electric engine 1300 according to aspects of the disclosure. Engine 1300 shown in FIGS. 13A-13B includes multiple motor assemblies 202. However, the term "electric engine" should not be construed to require multiple electric motor assemblies. In aspects, an electric engine can include a single motor assembly 202. Engine 1300 can be installed in a drive unit 102 as described for motor assembly 202.

In aspects, engine 1300 can include motor assemblies 202 according to the aspects shown in FIGS. 3B-3C. In aspects, engine 1300 can include motor assemblies 202 according to the aspects shown in FIGS. 8A-8B and 12. In aspects, a total number of motor assemblies 202 included in engine 1300 can be an even number. In aspects, engine 1300 can include pairs of motor assemblies 202 spaced around a perimeter. Each motor assembly 202 can couple to a common gear assembly that drives an output shaft 1306 of engine 1300.

In aspects, engine 1300 can include a first housing 1302 and a second housing 1304. First housing 1302 can at least partially house the gear assembly, and second housing 1304 can at least partially house the output shaft 1306. In aspects, first housing 1302 and/or second housing 1304 can be used to mount engine 1300 within a vehicle. In aspects, first housing 1302 and second housing 1304 can be integrally formed and can be a single housing.

As shown in FIG. 13B, in aspects, engine 1300 can include a bearing plate 1308 to which motor assemblies 202 can be attached (e.g., using bolts, screws, etc.). The output shafts 310 of motor assemblies 202 can be supported in fixed locations using bearing plate 1308. In aspects, other components (e.g., suspended rods, etc.) having or supporting apertures to receive output shafts 310 can be used to secure motor assemblies 202 in place, rather than bearing plate 1308.

Figure 14:
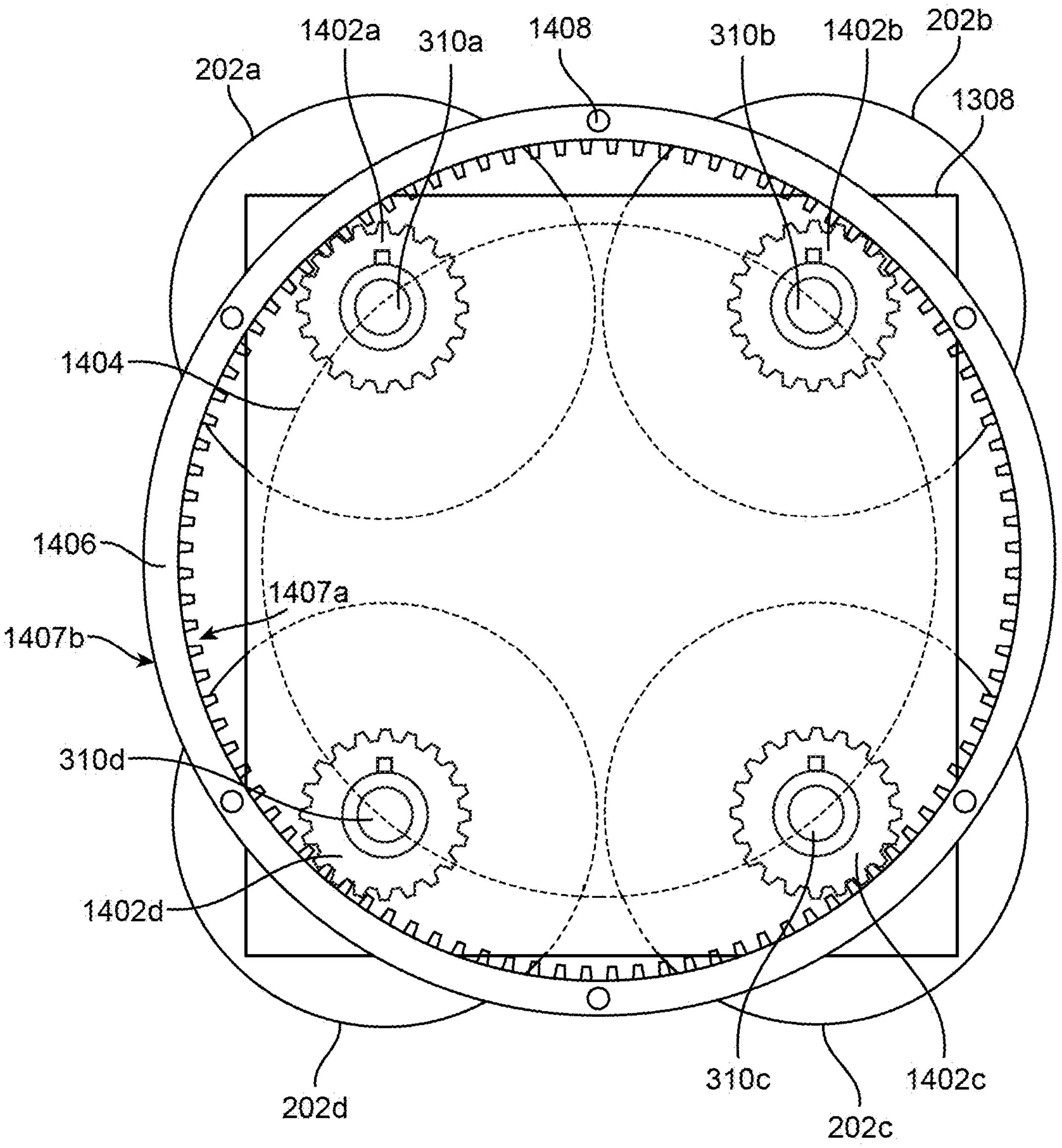
FIG. 14 shows a front view of the electric engine of FIGS. 13A-13B according to aspects of the disclosure.

FIG. 14 shows engine 1300 with first and second housings 1302, 1304 removed.

Engine 1300 can include receiving gears 1402. Each of receiving gears 1402 can be coupled to an output shaft 310 of a motor assembly 202. For example, the output shaft 310*a* of motor assembly 202*a* can be coupled to receiving gear 1402*a*, etc. The receiving gears 1402 can be coupled to output shafts 310, for example, using a key and keyway. Accordingly, an output shaft 310 of a motor assembly 202 can have at least two gears coupled to it when the motor assembly 202 is implemented in engine 1300: 1) gear 318*a* or ring gear 802, depending on the configuration of the motor assembly 202, to sum contributions from multiple motors 322 within the motor assembly 202, and 2) a receiving gear 1402 used to couple the output shaft 310 to an output gear 1406 of engine 1300.

Electric motor assemblies 202 can attach to one side of bearing plate 1308. Bearing plate 1308 can include apertures allowing output shafts 310 to pass through bearing plate 1308 and be coupled to receiving gears 1402 on the opposite side of bearing plate 1308. In the context of engine 1300, output shafts 310 of motor assemblies 202 can be referred to as "sub-output shafts" to distinguish them from output shaft 1306 of engine 1300.

Engine 1300 can include an output gear 1406. Each of motor assemblies 202 can connect to output gear 1406 via a receiving gear 1402. For example, motor assembly 202*a* can connect to output gear 1406 via receiving gear 1402*a*, etc. In the context of engine 1300, output gears of motor assemblies 202 (e.g., gear 318*a* or ring gear 802) can be referred to as "sub-output gears" to distinguish them from output gear 1406 of engine 1300.

In aspects, output gear 1406 can be a ring gear. In some of such aspects, output gear 1406 can include gear teeth on an inner side 1407*a* of output gear 1406, and receiving gears 1402 can be coupled to output gear 1406 inside a perimeter of output gear 1406. However, alternative aspects are contemplated. For example, output gear 1406 can be a ring gear having gear teeth on both an inner side 1407*a* and an outer side 1407*b*. In such aspects, a subset of motor assemblies 202 of engine 1300 can be coupled to output gear 1406 inside a perimeter of output gear 1406, and another subset of the motor assemblies 202 of engine 1300 can be coupled to output gear 1406 outside the perimeter of output gear 1406. In aspects, the two subsets can be made up of the same number of motor assemblies 202. In aspects, a motor assembly 202 can be coupled to output gear 1406 outside the perimeter of output gear 1406 between two motor assemblies 202 that are coupled to output gear 1406 inside the perimeter of output gear 1406 (e.g., filling the empty space between motor assemblies 202*a* and 202*b* in FIG. 14 outside the perimeter of output gear 1406), or vice-versa.

In aspects, output gear 1406 need not be a ring gear. In aspects, output gear 1406 can be a spur or helical gear, and receiving gears 1402 can be coupled to output gear 1406 outside a perimeter of output gear 1406. In aspects, output gear 1406 can be a ring gear including gear teeth on outer side 1407*b* of output gear 1406, and receiving gears 1402 can be coupled to output gear 1406 outside a perimeter of output gear 1406.

In aspects, as shown in FIG. 14, output shafts 310 of motor assemblies 202 in engine 1300 can define a ring 1404. In aspects, a projection of the ring 1404 along the output shafts 310 (extending infinitely into the page in the view of FIG. 14) encompasses no full motor assembly 202. The ring 1404 need not be perfectly circular, for example, if different receiving gears 1402 form different gear ratios with output gear 1406. In aspects, the ring 1404 can be circular, for example, when each of receiving gears 1402 forms the same gear ratio with output gear 1406.

In aspects, motor assemblies 202 can be substantially evenly spaced around output gear 1406. That is, an arc length between points of connection of adjacent receiving gears 1402 and output gear 1406 can be substantially constant around the circumference of output gear 1406. In aspects, motor assemblies 202 can be unevenly spaced around output gear 1406.

As shown in FIG. 14, output gear 1406 can include affixment apertures 1408 to receive fasteners. In aspects, affixment apertures 1408 can be spaced around the perimeter of output gear 1406.

Figure 15:
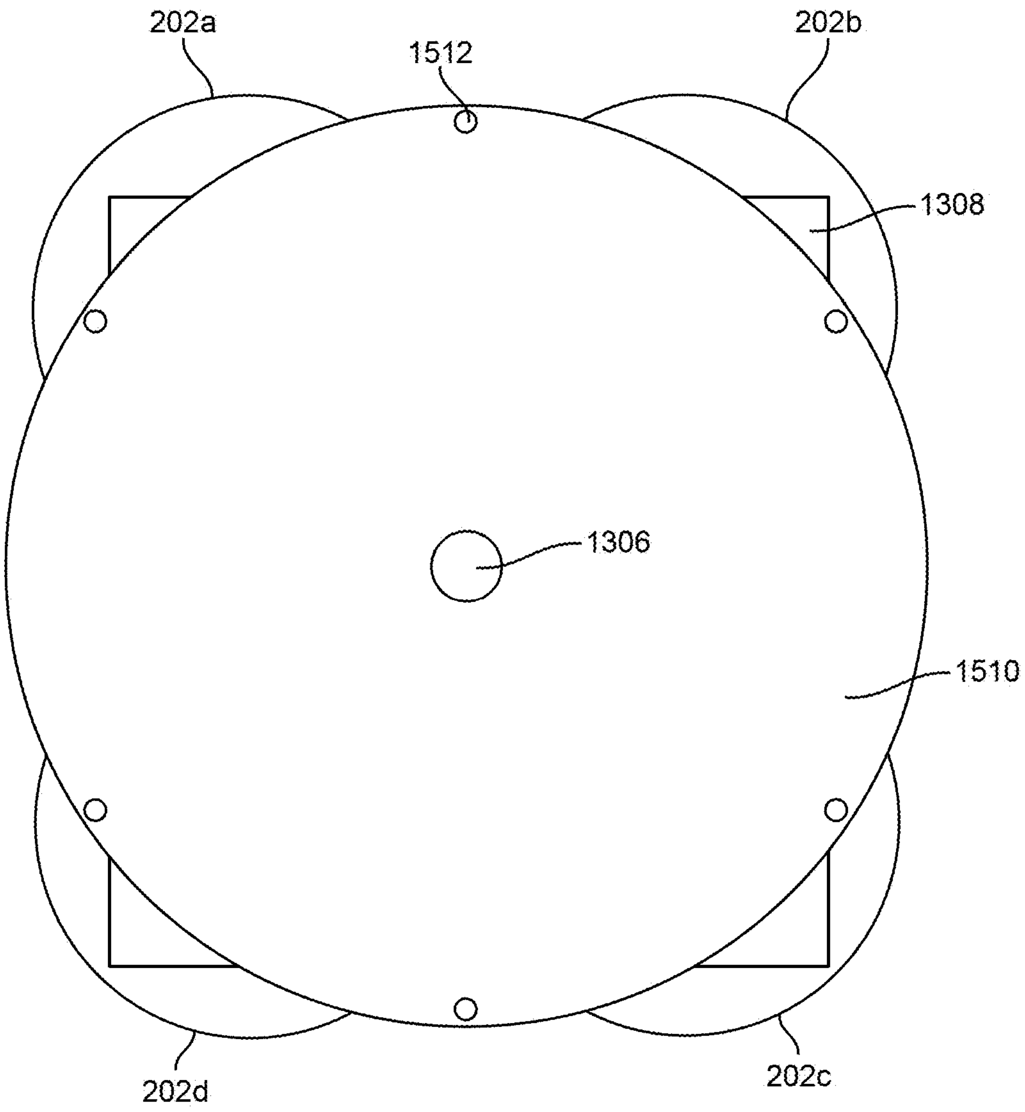
FIG. 15 shows a front view of the electric engine of FIGS. 13A-13B according to aspects of the disclosure.

FIG. 15 shows engine 1300 with components to transfer a torque from output gear 1406 to output shaft 1306. As shown in FIG. 15, engine 1300 can include a drive plate 1510, analogous to drive plate 1202 shown in FIG. 12. Drive plate 1510 can be coupled to output gear 1406 via fasteners 1512 (e.g., bolts, screws, etc.) inserted into affixment apertures 1408. Drive plate 1510 can be statically coupled to output shaft 1306 such that rotation of drive plate 1510 rotates output shaft 1306.

Accordingly, activation of any single motor assembly 202 (meaning the activation of one or more motors 322 of the motor assembly) can rotate a receiving gear 1402, which rotates output gear 1406. The rotation is transmitted through drive plate 1510 to output shaft 1306, which outputs a torque to an external component (e.g., an axle). The activation of multiple motor assemblies 202 within engine 1300 can increase the torque that can be output to the external component. At an even more granular level, a number of motors 322 of all electric motor assemblies 202 in engine 1300 can be selected for simultaneous activation, depending on a torque need.

While FIGS. 13-15 show engine 1300 with four motor assemblies 202, in aspects, engine 1300 can include any number 1, . . . , n of motor assemblies 202, where n is a positive integer. For example, engine 1300 can include two, six, eight, 10, 12, 14, 16, 18, or 20 motor assemblies 202. In aspects, a total number of motor assemblies 202 in engine 1300 can be an odd number.

FIG. 16 shows a diagram of a drive system 1600 according to aspects of the disclosure. Drive system 1600 can include energy storage system 104 and torque demand system 406 as described with respect to FIGS. 4-5 and 10-11. Drive system 1600 can include engine 1300 as described with respect to FIGS. 13-15. Drive system can include a control system 1602 to selectively activate and deactivate motors 322 of each of the motor assemblies 202 included in engine 1300.

Control system 1602 can include components of control systems 402 described herein. For example, control system 1602 can include controllers 404*a*-404*n* for controlling motors 322*a*-322*n* of a given motor assembly 202. Additionally, if the given motor assembly 202 includes clutches 806, control system 1602 can include controllers 1010 for controlling the clutches 806. Control system 1602 can include one or more of these types of controllers, depending on the configuration(s) of motor assemblies 202 included in engine 1300, for all motor assemblies 202*a-n* within engine 1300.

In aspects, a clutch 806 associated with a motor 322*a* can selectively secure gear 318*a* to shaft 808 (or shaft 310 in aspects shown in FIGS. 3B-C) or plate 805 to support plate 314 and can operate according to any of the methods described herein for a clutch 806 operating with an adjacent motor 322 (e.g., methods for mechanical disengagement, mechanical engagement, and seamless reintegration of adjacent motors 322).

In aspects, a motor 322*a* can be the first motor 322 to be activated when a motor assembly 202 transitions from a state of all its motors 322 being deactivated.

In aspects, engine 1300 need not include clutches 806/controllers 1010 associated with motors 322*a*.

In aspects, control system 1602 can be configured to cause a number of a total number of motors 322 of all motor assemblies 202 of engine 1300 to be simultaneously activated. In aspects, the number of simultaneously activated motors 322 can depend on a torque need received from torque demand system 406. Control system 1602 causing the number of the total number of motors 322 to be simultaneously activated can include activating one or more motors 322, deactivating one or more motors 322, both activating one or more motors 322 and deactivating one or more motors 322 (i.e., shifting activation of a subset of motors 322 to another subset of motors 322), and/or doing nothing (i.e., leaving the same number of motors 322 activated). These actions can be performed (or no action can be performed), as determined by control system 1602, in response to the torque need received from torque demand system 406. For example, if the torque need increases, control system 1602 can activate one or more motors 322 to cause a greater number of motors 322 to be simultaneously activated. If the torque need decreases, control system 1602 can deactivate one or more motors 322 to cause a smaller number of motors 322 to be simultaneously activated. If the torque need and output RPM remain the same (or at least do not change enough to justify activation/deactivation of additional motors), control system 1602 can neither activate nor deactivate one or more motors 322. In aspects, control system 1602 can cause a maximally efficient number of motors 322 to be simultaneously activated, given the torque need. That is, control system 1602 can select a number of motors 322 to be simultaneously activated that corresponds to a maximum possible operating efficiency for engine 1300 for the torque need and output RPM. To accomplish this, in aspects, control system 1602 can analyze motor efficiency maps corresponding to different unique subsets of the motors 322 and select the unique subset whose motor efficiency map includes the highest efficiency value at the torque need and RPM, as discussed herein for motor assembly 202 and with respect to FIGS. 6 and 18-19.

In aspects, the number of simultaneously activated motors 322 can be evenly divided among motor assemblies 202 of engine 1300. For example, engine 1300 can include four motor assemblies 202 each including seven motors 322. In such a case, control system 1602 can determine that the maximally efficient number of motors 322 to be simultaneously activated is 12 motors 322, and can cause three motors 322 to be activated in each motor assembly 202. In aspects, in response to the torque need increasing, control system 1602 can progressively activate motors 322 while maintaining the even division of activated motors 322 among motor assemblies 202 of engine 1300. For example, in response to the torque need increasing, control system 1602 can activate four motors 322 (e.g., each motor 322*a* of four motor assemblies 202), then eight more motors 322 (e.g., four pairs of adjacent motors 322 of the four motor assemblies 202), and so on. In aspects, this process in reverse can be used for motor deactivation in response to the torque need decreasing.

In aspects, the number of simultaneously activated motors 322 can be unevenly divided among motor assemblies 202 of engine 1300. For example, in the case of engine 1300 including four motor assemblies 202 each including seven motors 322, control system 1602 can determine that the maximally efficient number of motors 322 to be simultaneously activated is 12 motors 322, and can cause three motors 322 to be activated in two of motor assemblies 202 and six motors 322 to be activated in another motor assembly 202. In another example, control system 1602 can determine that the maximally efficient number of motors 322 to be simultaneously activated is a single motor 322, and can cause the single motor 322 to be activated in one motor assembly 202. In aspects, in response to the torque need increasing, control system 1602 can progressively activate motors 322 within a first motor assembly 202 until all motors 322 within the motor assembly 202 are activated. Then, if the torque need continues to increase, control system 1602 can begin to activate motors 322 of a second motor assembly 202, and so on. In aspects, this process in reverse can be used for motor deactivation in response to the torque need decreasing.

In aspects, even though the number of simultaneously activated motors 322 is unevenly divided among motor assemblies 202 of engine 1300, the number of simultaneously activated motors 322 can be evenly divided among motor assemblies 202 within a subset of motor assemblies 202 of engine 1300. For example, control system 1602 can determine that the maximally efficient number of motors 322 to be simultaneously activated is 14 motors 322, and can cause seven motors 322 to be activated in two motor assemblies 202 and no motors 322 to be activated in the remaining two motor assemblies 202. In aspects, the subset is an even number of motor assemblies 202. In aspects, the subset is a pair of motor assemblies.

In aspects, engine 1300 can include multiple pairs of motor assemblies 202. In aspects, within each pair, simultaneously activated motors 322 (if any) can be evenly distributed. For example, control system 1602 can determine that the maximally efficient number of motors 322 to be simultaneously activated is 16 motors 322, and can cause seven motors 322 to be activated in two motor assemblies 202 and one motor 322 to be activated in each of the remaining two motor assemblies 202. In aspects, in response to the torque need increasing, control system 1602 can progressively activate motors 322 within a first pair of motor assemblies 202 until all motors 322 within the first pair are activated. Then, if the torque need continues to increase, control system 1602 can begin to activate motors 322 of a second pair of motor assemblies 202, maintaining even distribution of activated motors 322 with each of the first and second pairs.

In aspects, a pair of motor assemblies 202 operated in this manner can include motor assemblies 202 arranged substantially opposite one another on ring 1404 (i.e., a line connecting output shafts 310 of such a pair of motor assemblies 202 substantially forms a diameter of ring 1404). Operating motor assemblies 202 in pairs can help maintain mechanical balance within motor assembly 202.

In aspects, control system 1602 can activate some motors 322 and deactivate other motors 322, independent of the torque need, to ensure approximately equal usage of motors 322.

FIG. 17 shows a drive system 1700 according to aspects of the disclosure. FIG. 17 shows single controllers 404 and 1010 being used for multiple motors 322 and clutches 806, analogous to FIGS. 5 and 11. As shown in FIG. 17, in aspects, a single controller 404 can be used to control two adjacent motors 322 (for example, a pair of opposing motors 322 within a motor assembly 202), and a single controller 1010 can be used to control two clutches 806. This can be advantageous for activating/deactivating and mechanically engaging/disengaging adjacent motors 322 and associated clutches 806 in pairs to maintain mechanical balance within gear assembly 316, as discussed herein. In general, in aspects, a single controller can be used to control multiple components (e.g., motors, clutches) that are operated in tandem within engine 1300.

In aspects, control system 1602 can activate and deactivate adjacent motors 322*b-n* in pairs within motor assemblies 202 for the reasons discussed herein with respect to FIG. 5. In such aspects, control system 1602 can take into account that to reach the maximally efficient number of simultaneously activated motors 322, motors 322 are activated/deactivated in pairs (with the exception of motors 322*a* of the motor assemblies 202). Accordingly, the maximally efficient number of motors 322 to be simultaneously activated need not be granular to increments of a single motor 322 (though in aspects it can be if only one or more of motors 322*a* are to be activated), but can take into account activation/deactivation of motors 322 in pairs. For example, in a system that activates/deactivates motors individually, the maximally efficient number may be 5 (e.g., 1 motor 322*a*+2 adjacent motors 322*b-n* of a first motor assembly 202, along with 1 motor 322*a* and 1 adjacent motor 322*b-n* of a second motor assembly 202). In contrast, in a system that activates/deactivates motors in pairs, the maximally efficient number may be either 3 (e.g., 1 motor 322*a*+2 adjacent motors 322*b-n* in a single motor assembly 202) or 6 (e.g., 1 motor 322*a*+2 adjacent motors 322*b-n* in both the first and second motor assemblies 202).

In general, in aspects, control system 1602 can take into account the increments by which motors 322 are simultaneously activated/deactivated in calculating the maximally efficient number of motors 322. The instance of activation/deactivation in pairs is discussed above. Additionally or alternatively, calculation of the maximally efficient number of electric motors can be performed within the parameter of the number of simultaneously activated motors 322 being evenly divided among motor assemblies 202 of engine 1300. Accordingly, in the example case of engine 1300 including four motor assemblies 202, the maximally efficient number of motors 322 can be in increments of 4, as a single motor from each of the motor assemblies 202 must be simultaneously activated/deactivated to maintain even distribution of activated motors 322 across motor assemblies 202. If motors 322 are activated/deactivated in pairs within motor assemblies 202, the maximally efficient number can be in increments of 8 (after the activation of motors 322*a* of the four motor assemblies 202). In general, when even distribution is maintained, the maximally efficient number of motors 322 can be in increments of n if motors 322 are activated/deactivated individually within motor assemblies 202, or 2*n* (after the activation of motors 322*a*) if motors 322 are activated/deactivated in pairs, where n is the number of motor assemblies 202 in engine 1300.

Alternatively or additionally, in aspects, calculation of the maximally efficient number of motors 322 can be performed within the parameter of simultaneously activated motors 322 being evenly divided among motor assemblies 202 of a subset of motor assemblies 202 of engine 1300. In such aspects, the maximally efficient number can be in increments of m if motors 322 are activated/deactivated individually within motor assemblies 202, or in increments of 2 m (after the activation of motors 322*a*) if motors 322 are activated/deactivated in pairs, where m is the number of motor assemblies 202 in the subset. In aspects, m is an even number. In aspects, m is 2.

Accordingly, control system 1602 can calculate the maximally efficient number of motors 322 taking into account the following parameters, such that the maximally efficient number of motors 322 is a number that can be activated in a given configuration of engine 1300/control system 1602:

1) Within individual motor assemblies 202:
   a. Motors 322 are activated individually, or
   b. Adjacent motors 322*b-n* are activated in pairs; and
2) Within engine 1300:
   a. The number of simultaneously activated motors 322 is evenly divided among motor assemblies 202 of engine 1300, and/or
   b. Simultaneously activated motors 322 are evenly divided among motor assemblies 202 within subset(s) (e.g., pair(s)) of motor assemblies 202, or
   c. The number of simultaneously activated motors 322 can be unevenly divided among motor assemblies 202 of any subset of motor assemblies 202.

In aspects, control system 1602 can take into account the above parameters by only considering unique subsets of motors 322 that adhere to the parameters.

In aspects, control system 1602 can control entire motor assemblies 202 at a time. In such aspects, control system 1602 can simultaneously activate all motors 322 of the motor assembly (or pair of motor assemblies) 202 in response to the torque need increasing, and simultaneously deactivate all motors 322 of the motor assembly (or pair of motor assemblies) 202 in response to the torque need decreasing. In aspects, the pair of motor assemblies 202 can include motor assemblies 202 arranged substantially opposite one another on ring 1404.

In aspects, control system 1602 can be bodily integrated with engine 1300. In other aspects, control system 1602 can be distinct from but communicatively coupled to engine 1300, or can be partially bodily integrated with engine 1300 and partially distinct from but communicatively coupled to engine 1300. Components of control system 1602 bodily integrated with engine 1300 can include those implemented on first and/or second PCBs 326, 328.

Control system 1602 can be configured as described herein using any known method of computer programming. For example, control system 1602 can include one or more computer processors (e.g., one or more MPUs, MCUs, and/or SoCs) and memory having software instructions stored thereon. The memory can include a non-transitory computer-readable medium. The one or more computer processors can be communicatively coupled to the memory and can be configured to perform operations specified in the software instructions, for example: receiving a torque need from torque demand system 406, calculating a required and/or maximally efficient number of motors 322 and/or motor assemblies 202 to meet the torque need as described herein, selecting motors 322 and/or motor assemblies 202 to activate/deactivate and mechanically engage/disengage, and sending instructions via controllers 404/1010 to motors 322 and clutches 806 to perform activation/deactivation and mechanical engagement/disengagement. The memory of control system 1602 can include dynamic random access memory (DRAM), low-power dynamic random access memory (LPDRAM), NOR flash memory, NAND flash memory, embedded MultiMediaCard (eMMC), universal flash storage (UFS), and/or non-volatile memory express (NVMe) memory.

Figure 18:
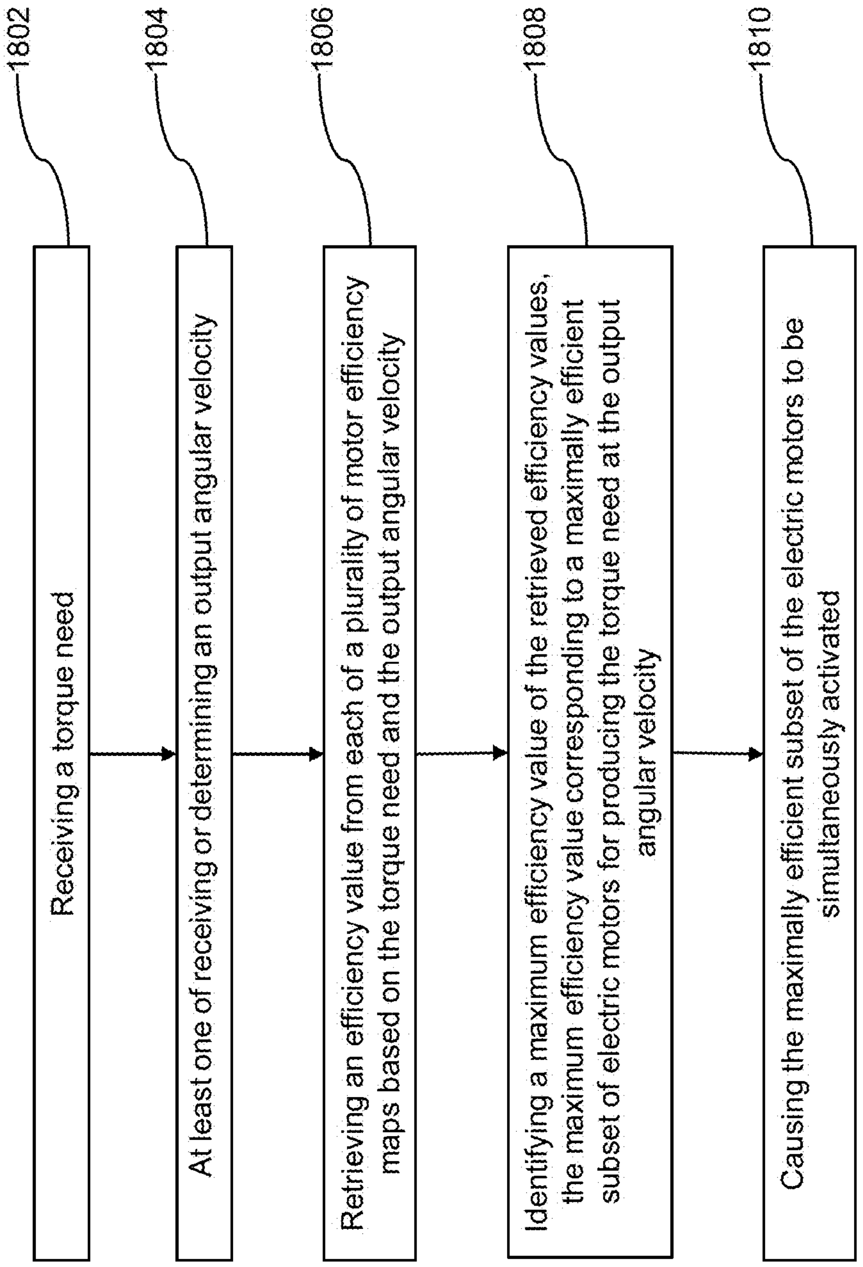
FIG. 18 shows a diagram of a method according to aspects of the disclosure.

FIG. 18 shows a diagram of a method 1800 of controlling an electric engine including electric motors (e.g., motors 322), according to aspects of the disclosure. In aspects, the electric engine can be electric engine 1300 described with respect to FIGS. 13-17. In aspects, the electric engine can include a single motor assembly 202 as described with respect to FIGS. 1-12. In aspects, the motor assembly 202 can be motor assembly 202 described with respect to FIGS. 3A-3C or motor assembly 202 described with respect to FIGS. 8A-8B.

Unless stated otherwise, the steps of method 1800 need not be performed in the order set forth herein. Additionally, unless specified otherwise, the steps of method 1800 need not be performed sequentially. The steps can be performed in a different order or simultaneously. As an example, step 1804 can be performed before step 1802.

Method 1800 can include steps 1802, 1804, 1806, 1808, and 1810. In aspects, one or more of these steps can be performed by one or more computer processors of a control system (e.g., control system 402 or 1602). Control system 402 and 1602 can be configured as described herein using any known method of computer programming. For example, control system 402 and 1602 can include one or more computer processors (e.g., one or more MPUs, MCUs, and/or SoCs) and memory having software instructions stored thereon. The memory can include a non-transitory computer-readable medium. The one or more computer processors can be communicatively coupled to the memory and can be configured to perform operations specified in the software instructions, for example: receiving a torque need and output angular velocity (steps 1802, 1804), retrieving efficiency values from motor efficiency maps (step 1806), identifying a maximum efficiency value (step 1808), and causing a maximally efficient subset of electric motors to be activated (step 1810). The memory of control system 402 and 1602 can include dynamic random access memory (DRAM), low-power dynamic random access memory (LPDRAM), NOR flash memory, NAND flash memory, embedded MultiMediaCard (eMMC), universal flash storage (UFS), and/or non-volatile memory express (NVMe) memory. In aspects, the one or more computer processors and memory of control system can be installed in an EV (e.g., vehicle 100).

Step 1802 can include receiving a torque need. In aspects, the torque need can be received from a torque demand system (e.g., torque demand system 406). In aspects, the electric engine can be installed in an EV (e.g., vehicle 100) and the torque need can be based on a user's operation of the EV.

Step 1804 can include at least one of determining or receiving an output angular velocity (e.g., an output RPM). In aspects, the output angular velocity can be a current output angular velocity of the electric engine. In aspects, the output angular velocity can be current the RPM (or other units of angular velocity) of the output shaft (e.g., output shaft 310, 808, or 1306) of the electric engine. In aspects, the output angular velocity can be determined using one or more resolvers of the electric motors. In aspects, the control system can receive resolver information and determine the angular velocity of individual motor(s). In aspects, the control system can then calculate the output velocity of the electric engine (e.g., the output shaft) using information on the gear ratio(s) the motor(s) form with the component of interest (e.g., the output shaft). In aspects, the output angular velocity can be determined using a sensor disposed at another component of the drivetrain (e.g., a wheel). In aspects, the control system can then calculate the output velocity of the electric engine (e.g., the output shaft) using information on the gear ratio(s) the component (e.g., the wheel) forms with the component of interest (e.g., the output shaft). In aspects, both methods can be used, which in aspects can be necessary since a motor may be declutched (e.g., using a clutch 806) and therefore not spinning (i.e., not providing angular velocity data). In aspects, resolver data can be used as a diagnostic for a clutch. For example, if a resolver is showing a motor shaft has a nonzero angular velocity, but the motor is supposed to be declutched, this could indicate its associated clutch has failed.

Step 1806 can include retrieving an efficiency value from each of a plurality of motor efficiency maps based on the torque need and the output angular velocity. In aspects, each of the plurality of motor efficiency maps can correspond to a unique subset of the electric motors of the electric engine. In aspects, each of the plurality of motor efficiency maps can link individual torque and angular velocity values to respective efficiency values for the unique subset. The motor efficiency maps can be the same or similar to that shown in FIG. 6, though they need not be graphically displayed. In aspects, each of the plurality of motor efficiency maps can include a lookup table stored as an indexed array, for example, in the memory of the control system. In such aspects, retrieving the efficiency value from each of the plurality of motor efficiency maps in step 1806 can include querying the lookup table of each of the motor efficiency maps (e.g., using computer software instructions). In aspects, the efficiency value can be an element of the indexed array (e.g., a 2D array) indexed under the torque need and the output angular velocity.

By "indexed under the torque need and output angular velocity," it is not meant that exact values for the torque need and output angular velocity necessarily be used as indices. Instead, the efficiency value can be indexed under the torque need and the output angular velocity in the sense that the efficiency value corresponds to indices that represent the torque need and output angular velocity. In aspects, the indices can represent the torque need and output angular velocity by being numerical values that are closest to the torque need and output angular velocity, respectively, when compared to other indices of the array. For example, a torque need of 15.6 N·m may match to an index of 16, and an output angular velocity of 5,225 RPM may match to an index of 5,200, for retrieving an efficiency value indexed at [16][5200]. In aspects, the indices can represent the torque need and the output angular velocity by being representations of numerical values that are closest to the torque need and output angular velocity, respectively, when compared to other indices of the array. For example, a torque need of 15.6 N·m may match to an index of 8, which can represent 16 N·m (the torque value divided by 2), and an output angular velocity of 5,225 RPM may match to an index of 52 (the RPM value divided by 100), for retrieving an efficiency value indexed at [8][52]. The X and Y axes of a motor efficiency map in the form of a lookup table can be broken into any bin size, with increments marked by any type of indices that represent torque and angular velocity values.

In aspects, each of the plurality of motor efficiency maps can include other forms than lookup tables. For example, in aspects, each of the plurality of motor efficiency maps can include a 2D function which takes the torque need and output angular velocity as independent variables and returns an efficiency value as the dependent variable. In aspects, the 2D function can be a multivariable best fit of data for output torque and output angular velocity as a function of efficiency gathered during testing or simulation of the electric engine or an equivalent electric engine.

In aspects, each of the unique subsets of the electric motors can include a pair of electric motors (e.g., motors 322) arranged on opposite sides of an electric motor assembly (e.g., an electric motor assembly 202) of the electric engine. That is, in aspects, one or more of the unique subsets of the electric motors considered in method 1800 can include one or more pairs of electric motors (e.g., motors 322) arranged on opposite sides of an electric motor assembly (e.g., an electric motor assembly 202). That way, selection of one or these unique subsets for simultaneous activation does not cause mechanical imbalance within the electric motor assembly.

Step 1808 can include identifying a maximum efficiency value of the retrieved efficiency values. The maximum efficiency value can correspond to a maximally efficient subset of electric motors (of those unique subsets considered) for producing the torque need at the output angular velocity.

In aspects, the maximally efficient subset of the electric motors can include a maximally efficient number of electric motors to be activated. In aspects, alternatively or additionally, the maximally efficient subset of the electric motors can include a position (e.g., differentiating central/adjacent motors) of electric motors to be activated. Accordingly, the number of motors, the selection of specific motors or types of motors (e.g., motors of varying specifications and/or positions within a motor assembly 202), or both can be considered in determining which subset of electric motors is the most efficient for producing the torque need at the output angular velocity. Each of the unique subsets considered need only have a corresponding motor efficiency map that can be used to retrieve an efficiency value based on the torque need and the output angular velocity. The generation of motor efficiency maps will be discussed with respect to FIG. 19.

Step 1810 can include causing the maximally efficient subset of the electric motors to be simultaneously activated. This can be done using any of the control methods described herein for motor assembly 202 and engine 1300.

In aspects, a method of controlling the electric engine can include dynamically repeating steps 1802, 1804, 1806, 1808, and 1810 at a frequency greater than or equal to 20 times per minute, for example, greater than or equal to 30 times per minute, greater than or equal to 40 times per minute, or greater than or equal to 60 times per minute, to account for changes in at least one of the torque need or output angular velocity. In such aspects, step 1810, causing the maximally efficient subset to be simultaneously activated, need not always include activating or deactivating electric motors of the electric engine. When it is determined that the current simultaneously activated unique subset of the electric motors is the maximally efficient subset, causing the maximally efficient subset to be simultaneously activated can include passively causing the maximally efficient subset to be simultaneously activated by not changing the number and/or selection of activated motors.

In some cases, the control system can select a unique subset of motors 322 that, though it is the maximally efficient subset, cannot continuously output the torque need without overheating. That is, the torque need exceeds the continuous output torque of the selected unique subset of motors 322. In many cases, this poses no issue, as the torque need often later decreases to a value under the continuous output torque. This sequence may occur in the EV context, for example, if a user accelerates rapidly for a short time but then lets off the accelerator.

In some cases, however, motors 322 of the maximally efficient subset could overheat if the torque need remained above the continuous output torque of the maximally efficient subset too long. In such cases, the control system can include control logic which manages such modes. For example, in aspects, a control system (e.g., control system 402 or 1602) can include temperature sensor(s) and/or can operate a timer for individual motors 322 and/or subsets of motors 322. In aspects, method 1800 can further include receiving data from these temperature sensor(s) and/or monitoring the timer(s) by one or more computer processors of the control system, which can determine whether a temperature and/or time exceeds a predetermined threshold. In aspects, in response to a temperature and/or time of operation of an electric motor 322 and/or subset of electric motors 322 exceeding the predetermined threshold, the control system can activate additional motors 322 to reduce or eliminate the amount the torque need exceeds the continuous output torque of simultaneously activated motors 322 within the motor assembly 202. In aspects, the control system can respond by deactivating an overheating motor 322 and/or motor 322 that has run too long and activating one or more alternative motors 322.

In aspects, each of the plurality of motor efficiency maps used in method 1800 can be generated by combining values from individual motor efficiency maps of motors 322 in a unique subset, taking into account any changes in torque/angular velocity caused by gear ratios that motors 322 form with an output gear/shaft. For example, if a unique subset includes 3 motors 322, including motor 322*a* and motors 322*b*, 322*e* (or another two adjacent motors 322), a point on a motor efficiency map corresponding to the unique subset can be generated as follows:

For the point (1000 RPM, 150 N*m) (with reference to the output shaft 310 of a motor assembly 202):

Motor 322*a* forms a ratio of 4:1 with ring gear 802 (in this case, the output gear coupled to output shaft 310) and each of motors 322*b*, 322*e* forms a ratio of 8:1 with ring gear 802. The torque provided by the output shaft 310 will be four times the torque generated by motor 322*a* and eight times the torque generated by each of motors 322*b*, 322*e*. If it is desired that each of the motors 322 generate an equal torque (T) when producing 150 N*m at the output shaft 310, then T can be found using the following equation:

$$150\text{N}\cdot\text{m}=4T+8T+8T=20T$$

Solving this equation yields:

T=7.5 N·m

The RPM of each motor 322 (X, Y, Z) at 1000 RPM can be determined using the gear ratios the motors 322 form with ring gear 802:

1000 RPM=(¼)X (The shaft of motor 322*a* revolves 4 times for every one revolution of output shaft 310.)

1000 RPM=(⅛)Y (The shaft of motor 322*b* revolves 8 times for every one revolution of output shaft 310.)

1000 RPM=(⅛)Z (The shaft of motor 322*e* revolves 8 times for every one revolution of output shaft 310.)

Solving these equations yields:

X=4000 RPM

Y=8000 RPM

Z=8000 RPM

In generating the point for the motor efficiency map corresponding to the unique subset, the efficiency maps of each of the motors 322 in this example can be referenced. For motor 322*a*, the efficiency value at point (4000 RPM, 7.5 N·m) can be referenced (e.g., 95%). For motor 322*b*, the efficiency value at point (8000 RPM, 7.5 N·m) can be referenced (e.g., 85%). For motor 322*e*, the efficiency value at (8000 RPM, 7.5 N·m) can be referenced (e.g., 85%). In aspects, the efficiency value for the point (1000 RPM, 150 N*m) of the motor efficiency map corresponding to the unique subset can be the mean of these values (≈88.3%). The above process can be conducted for multiple points across the operating range of the unique subset to generate the motor efficiency map corresponding to the unique subset. The above process can be conducted for other unique subsets using the same principles. Additionally, the above process is an example process that can be conducted using any unique subset of motors 322 (e.g., within one or more motor assemblies 202 or engines 1300) and any reference point for the output torque and angular velocity (as long as gear ratios between the motors 322 and the reference point are considered).

In aspects, computer software operating either within or externally to the EV can generate the plurality of motor efficiency maps corresponding to the unique subsets using the above process, and they can be stored in memory for the control system to access in determining the maximally efficient subset based on a torque need. In aspects, the control system (e.g., control system 402 or 1602) can generate the plurality of motor efficiency maps corresponding to the unique subsets using the above process, retrieving the motor efficiency maps corresponding to individual motors 322 from memory in doing so. The control system can then store the generated maps in memory for reference in determining the maximally efficient subset based on a torque need.

In aspects, it may be useful to distribute torque production unevenly between motors 322 of a unique subset. In aspects, multiple motor efficiency maps that correspond to a single unique subset can be generated. In such aspects, each of the multiple motor efficiency maps can correspond to a different operating configuration of the unique subset, the different operating configuration representing a different distribution of torque production among motors 322 of the unique subset. Accordingly, in aspects, the control system can compare motor efficiency maps that correspond to different distributions of torque production and select the unique subset and the operating configuration that most efficiently produces the torque need at the current output angular velocity.

In aspects, the control system need not generate full motor efficiency maps corresponding to unique subsets using the above processes. Instead, the control system can determine the efficiency value corresponding to a unique subset and/or operating configuration producing the torque need at the current operating angular velocity by performing calculations similar to those above. For example, a torque need of 150 N·m at an operating angular velocity of 1000 RPM can be found to correspond to about 88.3% efficiency by referencing motor efficiency maps corresponding to individual motors 322 as described above, and this efficiency value can be compared to other efficiency values calculated in similar ways for different unique subsets of motors 322. Accordingly, in aspects, the control system can determine and compare efficiency values corresponding to unique subsets of motors 322 without using full motor efficiency maps corresponding to the unique subsets.

The motor efficiency maps corresponding to individual motors 322 described herein can be in any of the forms described for motor efficiency maps corresponding to unique subsets of motors 322. In aspects, the control system can rely on equations representing motor efficiency maps for individual motors 322 instead of motor efficiency maps stored, for example, as lookup tables.

Figure 19:
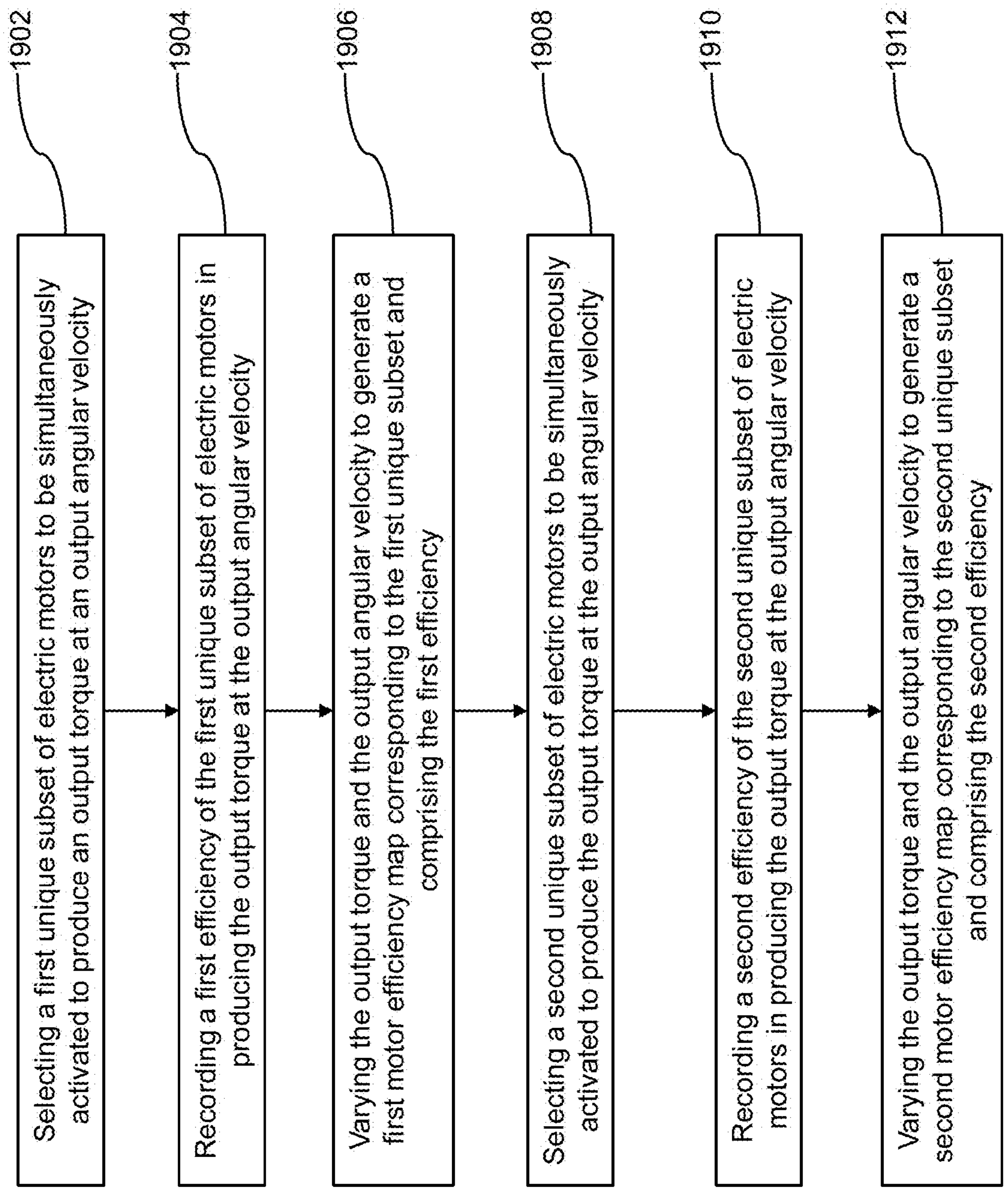
FIG. 19 shows a diagram of a method according to aspects of the disclosure.

FIG. 19 shows a diagram of a method 1900 of generating motor efficiency maps for use in control of an electric engine. In aspects, the electric engine can be electric engine 1300 described with respect to FIGS. 13-17. In aspects, the electric engine can include a single motor assembly 202 as described with respect to FIGS. 1-12. In aspects, the motor assembly 202 can be motor assembly 202 described with respect to FIGS. 3A-3C or motor assembly 202 described with respect to FIGS. 8A-8B.

Unless stated otherwise, the steps of method 1900 need not be performed in the order set forth herein. Additionally, unless specified otherwise, the steps of method 1900 need not be performed sequentially. The steps can be performed in a different order or simultaneously. As an example, steps 1908-1912 can be performed before steps 1902-1906. The use of “first” and “second” does not imply a particular temporal order or priority. As another example, step 1906 can be performed simultaneously with steps 1902 and 1904 (i.e., the “first efficiency” of step 1904 can be recorded in the process of varying the output torque and the output angular velocity to generate the first motor efficiency map in step 1906). The same is true for steps 1908-1912 and the “second efficiency.”

Method 1900 can include steps 1902, 1904, 1906, 1908, 1910, and 1912. In aspects, one or more of steps 1902, 1904, 1906, 1908, 1910, and 1912 can be automated, for example, using a motor efficiency test computer program.

Step 1902 can include selecting a first unique subset of electric motors (e.g., motors 322) to be simultaneously activated to produce an output torque at an output angular velocity (e.g., RPM). Step 1902 can include simultaneously activating the first unique subset of electric motors.

Step 1904 can include recording a first efficiency of the first unique subset of electric motors in producing the output torque at the output angular velocity.

Step 1906 can include varying the output torque and the output angular velocity to generate a first motor efficiency map. The first motor efficiency map can correspond to the first unique subset and can include the first efficiency, along with other efficiencies that are recorded as the output torque and the output angular velocity are adjusted to different values. The first motor efficiency map can link individual torque and angular velocity values to respective efficiency values for the first unique subset. The first motor efficiency map can be the same or similar to that shown in FIG. 6, though it need not be graphically displayed.

Step 1908 can include selecting a second unique subset of electric motors (e.g., motors 322) to be simultaneously activated to produce the output torque at the output angular velocity (e.g., RPM). Step 1908 can include simultaneously activating the second unique subset of electric motors.

Step 1910 can include recording a second efficiency of the second unique subset of electric motors in producing the output torque at the output angular velocity.

Step 1912 can include varying the output torque and the output angular velocity to generate a second motor efficiency map. The second motor efficiency map can correspond to the second unique subset and can include the second efficiency, along with other efficiencies that are recorded as the output torque and the output angular velocity are adjusted to different values. The second motor efficiency map can link individual torque and angular velocity values to respective efficiency values for the second unique subset. The second motor efficiency map can be the same or similar to that shown in FIG. 6, though it need not be graphically displayed.

The process of steps 1902-1906/1908-1912 can be repeated for any number of unique subsets, to generate, for example, third, fourth, fifth, sixth, seventh, eighth, ninth, tenth, etc. motor efficiency maps corresponding to third, fourth, fifth, sixth, seventh, eighth, ninth, tenth, etc. unique subsets of electric motors and including third, fourth, fifth, sixth, seventh, eighth, ninth, tenth, etc. efficiencies, respectively. Each of the unique subsets can include a different number, specifications, and/or positions of the electric motors.

In aspects, method 1900 can further include encoding the first motor efficiency map and the second motor efficiency maps into a first lookup table and a second lookup table, respectively. In aspects, the first and second motor efficiency maps can be encoded into first and second lookup tables using computer software instructions. In aspects, each of the first and second lookup tables can include an indexed array that can be queried (e.g., using computer software instructions) using a torque need and an output angular velocity as indices to retrieve an efficiency value. As noted above, this does not mean that exact values for the torque need and output angular velocity necessarily be used as indices. Instead, the efficiency value can be indexed under the torque and the angular velocity in the sense that the efficiency value corresponds to indices that represent the torque need and output angular velocity, as described above.

In aspects, method 1900 can further include storing the first and second lookup tables in memory of a control system (e.g., control system 402 or 1602) of an EV (e.g., vehicle 100), for example, as computer software.

In aspects, recording the first and second efficiencies in step 1904 can include operating the electric engine or a substantially equivalent electric engine to produce the output torque and the output angular velocity using the first and second unique subsets of electric motors, respectively. A substantially equivalent electric engine is one that can be used to gather testing data that can be applied in the operation and control of the electric engine. In aspects, the electric engine or substantially equivalent electric engine can be controlled to produce, by the first or second unique subset, the output torque. A load can be applied to the electric engine or substantially equivalent electric engine to cause it to produce the angular velocity at the output torque. The efficiency, the ratio of output mechanical power (torque×angular velocity) to input electrical power (voltage×current), can be measured for at the output torque and angular velocity. In aspects, the output torque and angular velocity can be those of the electric engine's or substantially equivalent electric engine's output shaft (e.g., output shaft 310, 808, 1306). The load and requested output torque can be varied and different efficiencies of the first and second unique subsets can be measured to generate a full motor efficiency map.

In aspects, recording the first and second efficiencies in step 1904 can include performing simulations of the electric engine or a substantially equivalent electric engine producing the output torque and the output angular velocity using the first and second unique subsets of electric motors, respectively. That is, a computer simulation can use data on individual motors of the electric engine or substantially equivalent electric engine (e.g., motor type, dimensions, materials, etc.) and/or data on characteristics of the electric engine or substantially equivalent electric engine (gear ratios, etc.) to compute the first and second efficiencies based on the output torque and angular velocity. The output torque and angular velocity can be varied and different efficiencies of the first and second unique subsets can be simulated to generate full motor efficiency maps.

The terms "output torque," "torque need," and "output angular velocity/RPM" have been used herein to describe parameters that can be used to select a maximally efficient subset of electric motors to produce a torque need at an output angular velocity. For example, a torque need and output angular velocity requested/measured during an operation phase can be mapped to an output torque and output angular velocity of a motor efficiency map, thereby identifying an efficiency value to be used in the selection process. The use of the above terms does not imply that the "output torque," "torque need," or "output angular velocity/RPM" must always be tied to a particular component of an electric engine (e.g., of motor assembly 202 or engine 1300). In aspects, the "output torque" can be tied to any reference point on a drivetrain. For example, the output torque can be the torque output by one or more output shafts (e.g., output shaft 310, 808, or 1306) of one or more electric engines, the torque output by one or more axles of an EV, or the sum of torques output by shafts of individual motors 322 of one or more electric engines. However the output torque was measured in a motor efficiency map generation phase (e.g., at the output shaft) should correspond to how torque demand system 406 and/or control system 402/1602 requests the torque need from an electric engine (e.g., as a torque value to be produced by the output shaft). Accordingly, the torque need can undergo a conversion (before and/or after it is received by control system 402/1602) from raw input data (e.g., the angle of an accelerator) to a specific torque value that is tied to a certain point on the drivetrain (e.g., the output shaft). In this way, no matter what point on a drivetrain the "output torque" is tied to (e.g., at which point it is measured) in a motor efficiency map generation phase, the torque need can be converted to the proper form (value and reference point) to be mapped to a specific output torque on the Y-axis of the generated motor efficiency map.

Likewise, in aspects, the "output angular velocity/RPM" can be tied to any reference point on a drivetrain. For example, it can be the angular velocity of one or more output shafts (e.g., output shaft 310, 808, or 1306) of one or more electric engines, the angular velocity of one or more axles of an EV, or angular velocity of some other component of the drivetrain. Similarly to the torque need, however the output angular velocity was measured in a motor efficiency map generation phase (e.g., at the output shaft) should correspond to how control system 402/1602 measures the output angular velocity in an operation phase. In this way, no matter what point on a drivetrain the "output angular velocity" is tied to in a motor efficiency map generation phase, the output angular velocity in an operation phase can be properly mapped to a specific output angular velocity on the X-axis of the generated motor efficiency map.

Additionally, an "output torque," "torque need," or "output angular velocity/RPM" tied to a certain point on the drivetrain can be converted to an "output torque," "torque need," or "output angular velocity/RPM" tied to another point on the drive train using the gear ratios between the two points on the drivetrain.

In aspects, motor efficiency maps corresponding to individual motors 322 can be used rather than a motor efficiency map corresponding to a unique subset of motors 322 (though a unique subset can be a single motor 322). For example, in aspects, a system level torque need can be divided by torque demand system 406 and/or control system 402/1602 into micro torque needs(s), with each of the micro torque need(s) being less than or equal to the amount of torque a single motor 322 can produce. In aspects, the number of micro torque needs can correspond to the number of motors 322 that torque demand system 406 and/or control system 402/1602 is considering for simultaneous activation.

As an example, all motors 322 within a device (e.g., an EV) may be capable of producing a combined peak torque (e.g., as measured at the shafts of the motors 322) of 400 N·m. This represents 100% of the system level torque available. Based on accelerator engagement level (e.g., pedal position), torque demand system 406 can determine that 75% of the system level torque is requested. This constitutes a system level torque need. In aspects comprising multiple drive units 102, depending on an all-wheel drive setting and other factors (operating conditions, the value of the system level torque need, etc.), torque demand system 406 can determine how this system level torque need will be divided among drive units 102. In aspects, torque demand system 406 can then communicate a torque need to control system 402/1602 for each of the drive units 102 selected to produce the system level torque need (which in some cases can be only one drive unit 102). The torque need can be communicated in any form (e.g., a percentage of system level torque available, a specific number, etc.). At some point, the torque need in the form of a number (e.g., 150 N·m) can be determined by torque demand system 406 and/or control system 402/1602.

In aspects, control system 402/1602 can divide the torque need into micro torque needs for individual motors 322. In aspects, the number of micro torque needs can correspond to how many motors 322 are being considered for simultaneous activation, since the value(s) of the micro torque needs represents to what extent the torque need will be spread across multiple motors 322. For example, dividing 150 N·m into 10 micro torque needs of 15 N·m can mean that 10 motors 322 (e.g., of engine 1300) are being considered as a potential unique subset for activation.

Once micro torque needs are determined for each motor 322 in a unique subset being considered by control system 402/1602, the efficiency for each motor 322 in producing a micro torque need can be determined. This can be performed using the current output angular velocity (e.g., RPM) of each motor 322, which can be determined using its resolver and/or using an angular velocity measured at a certain point (e.g., a wheel, output shaft of a motor assembly 202/engine 1300, etc.) and information on gear ratios between the point and the shaft of the motor 322. Control system 402/1602 can use a micro torque need and a current output angular velocity of a motor 322 as inputs to access an efficiency value of the motor 322 in producing the micro torque need at the current output angular velocity. Control system 402/1602 can do this for each motor in a unique subset and can use the determined efficiency values to decide whether the unique subset is a maximally efficient subset for producing the torque need initially received by control system 402/1602 before the division into micro torque needs.

For example, control system 402/1602 can divide a torque need into a number (1+) of first micro torque needs, receive and/or determine an output angular velocity of a motor 322, and retrieve an efficiency value from a motor efficiency map corresponding to the motor 322 based on a first micro torque need of the first micro torque needs and the output angular velocity. In aspects, this efficiency value can be extrapolated to other motors 322 if one or more of the first micro torque needs are equal and the other motors 322 have substantially the same motor efficiency maps (e.g., have substantially the same specifications). Alternatively or additionally, efficiency values for other motors 322 can be determined the same way as for the motor 322 using a first micro torque need, an output angular velocity, and a motor efficiency map. In this way, control system 402/1602 can retrieve first efficiency values for a number of motors 322 (a first unique subset) equaling the number of first micro torque needs. In aspects, control system 402/1602 can determine the mean of the first efficiency values.

Control system 402/1602 can divide a torque need into a number (1+) of second micro torque needs, receive and/or determine an output angular velocity of a motor 322, and retrieve an efficiency value from a motor efficiency map corresponding to the motor 322 based on a second micro torque need of the second micro torque needs and the output angular velocity. In aspects, this efficiency value can be extrapolated to other motors 322 if one or more of the second micro torque needs are equal and the other motors 322 have substantially the same motor efficiency maps (e.g., have substantially the same specifications). Alternatively or additionally, efficiency values for other motors 322 can be determined the same way as for the motor 322 using a second micro torque need, an output angular velocity, and a motor efficiency map. In this way, control system 402/1602 can retrieve second efficiency values for a number of motors 322 (a second unique subset) equaling the number of second micro torque needs. In aspects, control system 402/1602 can determine the mean of the second efficiency values.

In aspects, control system 402/1602 can continue this process to assemble representations of the efficiencies of a plurality of unique subsets (including the first and second unique subsets) in producing the torque need. In aspects, the representations can be the means of efficiency values associated with individual motors 322 of a unique subset. Control system 402/1602 can compare these representations and determine which of the plurality of unique subsets is a maximally efficient subset. Control system 402/1602 can cause the maximally efficient subset of motors 322 to be simultaneously activated.

In aspects, the micro torque need(s) into which a torque need is divided can be equal. In aspects, the micro torque need(s) into which a torque need is divided can be unequal, for example, if motors 322 of different specifications are included in a unique subset. In either case, control system 402/1602 can determine micro torque need(s) based on specifications of motors 322 in a unique subset and/or gear ratios formed between the motors 322 and an output component (e.g., wheel, output shaft of a motor assembly 202/engine 1300, etc.). In aspects in which the micro torque need(s) are unequal, control system 402/1602 can pair individual micro torque need(s) with individual motors 322 based on the specifications of an individual motor 322 and/or the gear ratio the individual motor forms with the output component.

While torque demand system 406 and control system 402/1602 are shown as separate systems, in aspects, one or more of the functions described herein as performed by torque demand system 406 can be performed by control system 402/1602, and vice-versa.

In aspects, control system(s) 402/1602 disclosed herein can comprise a system level control system that can perform a system level determination of a maximally efficient subset of motors 322, across all drive units 102, for producing a system level torque need determined by torque demand system 406. The system level determination can be performed using any of the methods disclosed herein for determining a maximally efficient subset of motors 322 for producing a torque need. In aspects, the system level control system, and/or torque demand system 406, can determine how motors of the maximally efficient subset are split between drive units 102. In aspects, the system level control system, and/or torque demand system 406, can determine to assign the maximally efficient subset to a single drive unit 102. In aspects, the split or assignment can be based on an efficiency, associated with the split or assignment, in producing the system level torque need. For example, in aspects, different splits can be compared using motor efficiency maps as described herein, and a maximally efficient split can be selected. (In aspects, this can be done as part of selecting the maximally efficient subset if the positions of motors 322, in this case which drive unit 102 a motor 322 occupies, are considered in the maximally efficient subset selection process). Alternatively or additionally, in aspects, the split or assignment can be based on an all-wheel drive setting and/or driving conditions. For example, in aspects, the maximally efficient split can be selected to maximize efficiency while being limited to splits that comply with an all-wheel drive setting and/or the demands of current driving conditions. In aspects, torque demand system 406 and/or the system level control system can determine how the system level torque need and/or motors of the maximally efficient subset will be split between drive units 102 based on efficiency, motor usage, continuous torque ratings of individual motors 322, and/or other factors.

In aspects, torque demand system 406 and/or any of the control systems 402/1602 described herein can dynamically determine a maximally efficient subset of motors 322 (and/or operating configuration of the subset) for producing a torque need using trial and error. For example, in aspects, the amount of power being transferred from energy storage system 104 to one or more engines 1300 can be measured. Simultaneously, a control system 402/1602 (either system level or engine 1300 level) can cycle through various unique subsets of motors 322 (and/or operating configurations of the subsets) while the power draw is being measured. The control system 402/1602 can select for simultaneous activation the unique subset of motors 322 that minimizes the amount of power being transferred from energy storage system 104 to the one or more engines. In aspects, the control system 402/1602 can cycle through unique subsets that have been determined by calculation to be most efficient using any of the methods described herein.

In aspects, artificial intelligence (AI) can be used to determine a maximally efficient subset of motors 322 (and/or operating configuration of the subset) for producing a torque need at an output angular velocity. For example, while various unique subsets of motors 322 are activated, a machine learning algorithm can receive one or more of the following: input power (e.g., from energy storage system 104), number and/or identification of motors 322 simultaneously activated, torque outputs of individual motors 322 (which in aspects control system 402/1602 can vary for the learning process of the algorithm) and/or other components along the drivetrain, angular velocity outputs of individual motors 322 and/or other components along the drivetrain, a system level torque need, sub-system level torque needs as described herein, etc. Using this data, the machine learning algorithm can train a model that receives a torque need and current output angular velocity and determines a maximally efficient subset of motors 322 (and/or operating configuration of the subset), either at the system level or engine 1300 level as described herein. In aspects, the model can be implemented by control system 402/1602. In aspects, the model can be trained in a "training mode" in which control system 402/1602 cycles through various unique subsets or motors 322 and/or operating configurations of simultaneously activated motors 322 while a user operates the EV. In aspects, the model can be trained while control system 402/1602 cycles through various unique subsets and/or operating configurations using trial and error as described above.

In aspects, once a particular unique subset of motors 322 has been determined to be most efficient for producing a torque need at an output angular velocity using any of the methods described herein, control system 402/1602 can store the unique subset in memory in association with the torque need and the output angular velocity. Accordingly, if a future torque need and output angular velocity matches the stored values (within certain tolerances set by control system 402/1602 or a programmer thereof), control system 402/1602 can select the unique subset for simultaneous activation without performing additional calculations.

Figure 20:
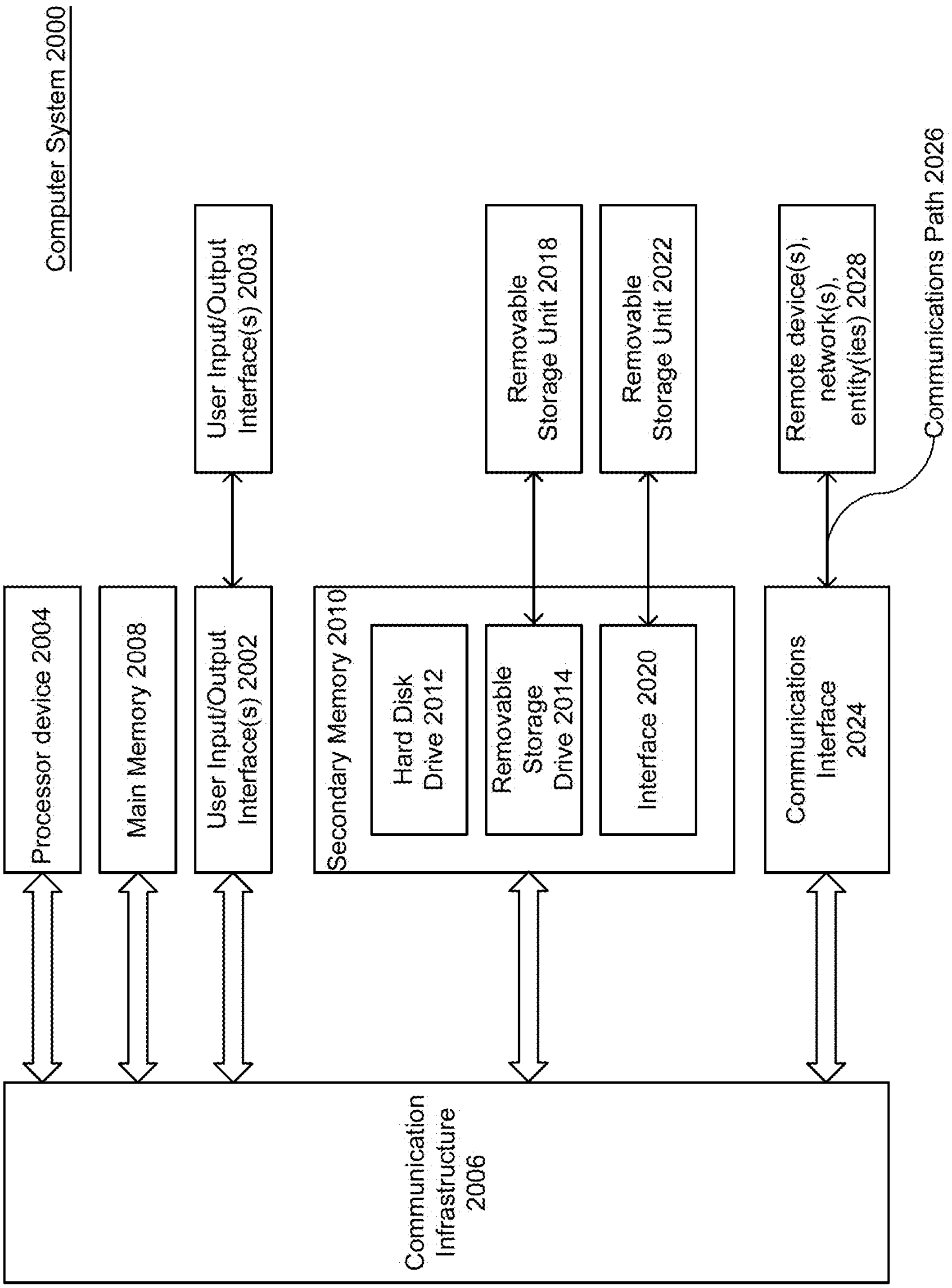
FIG. 20 shows a diagram of a computer system according to aspects of the disclosure.

FIG. 20 shows an exemplary computer system 2000 by which aspects, or portions thereof, can be implemented as computer-readable code, according to aspects. For example, aspects of the processes discussed herein can be implemented by computer system 2000 using hardware, software, firmware, tangible computer readable media having instructions stored thereon, or a combination thereof and can be implemented by one or more computer systems or other processing systems.

If programmable logic is used, such logic can execute on a commercially available processing platform or a special purpose device. One of ordinary skill in the art can appreciate that aspects of the disclosed subject matter can be practiced with various computer system configurations, including multi-core multiprocessor systems, minicomputers, and mainframe computers, computer linked or clustered with distributed functions, as well as pervasive or miniature computers that can be embedded into virtually any device.

For instance, at least one processor device and a memory can be used to implement the above-described aspects. A processor device can be a single processor, a plurality of processors, or combinations thereof. Processor devices can have one or more processor "cores."

Various aspects described herein can be implemented in terms of this example computer system 2000. After reading this description, it will become apparent to a person skilled in the relevant art how to implement one or more of the aspects using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in aspects the order of operations can be rearranged without departing from the spirit of the disclosed subject matter.

Processor device 2004 can be a special purpose or a general-purpose processor device. As will be appreciated by persons skilled in the relevant art, processor device 2004 can also be a single processor in a multi-core/multiprocessor system, such system operating alone, or in a cluster of computing devices operating in a cluster or server farm. Processor device 2004 is connected to a communication infrastructure 2006, for example, a bus, message queue, network, or multi-core message-passing scheme.

Computer system 2000 also includes a main memory 2008, for example, random access memory (RAM), and can also include a secondary memory 2010. Secondary memory 2010 can include, for example, a hard disk drive 2012, or removable storage drive 2014. Removable storage drive 2014 can include a floppy disk drive, a magnetic tape drive, an optical disk drive, a flash memory, a Universal Serial Bus (USB) drive, or the like. The removable storage drive 2014 reads from and/or writes to a removable storage unit 2018 in a well-known manner. Removable storage unit 2018 can include a floppy disk, magnetic tape, optical disk, etc. which is read by and written to by removable storage drive 2014. As will be appreciated by persons skilled in the relevant art, removable storage unit 2018 includes a computer usable storage medium having stored therein computer software and/or data.

Computer system 2000 (optionally) includes a user input/output interface 2002 (which can include input and output devices such as keyboards, touchscreens, buttons etc.) that forwards graphics, text, and other data from communication infrastructure 2006 (or from a frame buffer not shown) for display on a display unit 2003.

In additional and/or alternative implementations, secondary memory 2010 can include other similar means for allowing computer programs or other instructions to be loaded into computer system 2000. Such means can include, for example, a removable storage unit 2022 and an interface 2020. Examples of such means can include a program cartridge and cartridge interface (such as that found in video game devices), a removable memory chip (such as an EPROM, or PROM) and associated socket, and other removable storage units 2022 and interfaces 2020 which allow software and data to be transferred from the removable storage unit 2022 to computer system 2000.

Computer system 2000 can also include a communications interface 2024. Communications interface 2024 allows software and data to be transferred between computer system 2000 and external devices. Communications interface 2024 can include a modem, a network interface (such as an Ethernet card), a communication port, a PCMCIA slot and card, or the like. Software and data transferred via communications interface 2024 can be in the form of signals, which can be electronic, electromagnetic, optical, or other signals capable of being received by communications interface 2024. These signals can be provided to communications interface 2024 via a communications path 2026. Communications path 2026 carries signals and can be implemented using wire or cable, fiber optics, a phone line, a cellular phone link, an RF link or other communication channels.

In this document, the terms "computer program medium" and "computer usable medium" are used to generally refer to media such as removable storage unit 2018, removable storage unit 2022, and a hard disk installed in hard disk drive 2012. Computer program medium and computer usable medium can also refer to memories, such as main memory 2008 and secondary memory 2010, which can be memory semiconductors (for example, DRAMs, etc.).

Computer programs (also called computer control logic) are stored in main memory 2008 and/or secondary memory 2010. Computer programs can also be received via communications interface 2024. Such computer programs, when executed, enable computer system 2000 to implement the aspects as discussed herein. In particular, the computer programs, when executed, enable processor device 2004 to implement the processes of the aspects discussed here. Accordingly, such computer programs represent controllers of the computer system 2000. Where the aspects are implemented using software, the software can be stored in a computer program product and loaded into computer system 2000 using removable storage drive 2014, interface 2020, and hard disk drive 2012, or communications interface 2024.

Aspects described herein also can be directed to computer program products including software stored on any computer useable medium. Such software, when executed in one or more data processing device, causes a data processing device(s) to operate as described herein. Aspects described herein can employ any computer useable or readable medium. Examples of computer useable mediums include, but are not limited to, primary storage devices (for example, any type of random access memory), secondary storage devices (for example, hard drives, floppy disks, CD ROMS, ZIP disks, tapes, magnetic storage devices, and optical storage devices, MEMS, nanotechnological storage device, etc.).

Example Aspects are Described Below

1. An electric engine comprising:
   electric motor assemblies, each of the electric motor assemblies comprising:
      a rotatable sub-output shaft configured to transfer a torque to a component external to an electric motor assembly,
      a gear assembly comprising a sub-output gear and adjacent gears coupled to the sub-output gear, the sub-output gear being coupled to the rotatable sub-output shaft,
      electric motors, each of the electric motors being coupled to an adjacent gear of the adjacent gears, and
      a controller to activate and deactivate one or more of the electric motors; and
   receiving gears, each of the receiving gears being coupled to a rotatable sub-output shaft of an electric motor assembly of the electric motor assemblies;
   an output gear coupled to the receiving gears; and
   an output shaft coupled to the output gear.

2. The electric engine of aspect 1, wherein the output gear comprises a ring gear coupled to the receiving gears, the receiving gears being coupled to the ring gear inside a perimeter of the ring gear.

3. The electric engine of aspect 1 or 2, wherein the total number of electric motor assemblies of the electric engine is an even number.

4. The electric engine of any one of aspects 1-3, wherein the rotatable sub-output shafts of the electric motor assemblies define a ring, and wherein a projection of the ring along the rotatable sub-output shafts encompasses no full electric motor assembly.

5. An electric engine, comprising:
   electric motor assemblies, each of the electric motor assemblies comprising:
      a rotatable sub-output shaft configured to transfer a torque to a component external to an electric motor assembly,
      a drive plate coupled to the rotatable sub-output shaft,
      a gear assembly comprising:
         a ring gear coupled to the drive plate; and
         adjacent gears coupled to the ring gear, the adjacent gears comprising inner adjacent gears coupled to the ring gear inside a perimeter of the ring gear and one or more outer adjacent gears coupled to the ring gear outside the perimeter of the ring gear, and
      electric motors, each of the electric motors being coupled to an adjacent gear of the adjacent gears, and
      a controller to activate and deactivate one or more of the electric motors; and
   receiving gears, each of the receiving gears being coupled to a rotatable sub-output shaft of an electric motor assembly of the electric motor assemblies;
   an output gear coupled to the receiving gears; and
   an output shaft coupled to the output gear.

6. The electric engine of aspect 5, wherein the output gear comprises a ring gear coupled to the receiving gears, the receiving gears being coupled to the ring gear inside a perimeter of the ring gear.

7. The electric engine of aspect 5 or 6, wherein the total number of electric motor assemblies of the electric engine is an even number.

8. The electric engine of any one of aspects 5-7, wherein the rotatable sub-output shafts of the electric motor assemblies define a ring, and wherein a projection of the ring along the rotatable sub-output shafts encompasses no full electric motor assembly.

9. A vehicle comprising:
   an electric drive system comprising:
      an electric engine comprising:
         electric motor assemblies, each of the electric motor assemblies comprising:
            a rotatable sub-output shaft configured to transfer a torque to a component external to an electric motor assembly,
            a gear assembly comprising a sub-output gear and adjacent gears coupled to the sub-output gear, the sub-output gear being coupled to the rotatable sub-output shaft, and
            electric motors, each of the electric motors being coupled to an adjacent gear of the adjacent gears; and
         receiving gears, each of the receiving gears being coupled to a rotatable sub-output shaft of an electric motor assembly of the electric motor assemblies;
         an output gear coupled to the receiving gears; and
         an output shaft coupled to the output gear,
      a control system to selectively activate and deactivate the electric motors of each of the electric motor assemblies,
      an energy storage system coupled to the electric motor assemblies, and
      a torque demand system to communicate a torque need to the control system, the control system being configured to cause a number of a total number of electric motors of all the electric motor assemblies to be simultaneously activated, the number of simultaneously activated electric motors depending on the torque need.

10. The vehicle of aspect 9, wherein the number of simultaneously activated electric motors of the total number is a maximally efficient number of electric motors for producing the torque need.

11. The vehicle of aspect 9 or 10, wherein the output gear comprises a ring gear coupled to the receiving gears, the receiving gears being coupled to the ring gear inside a perimeter of the ring gear.

12. The vehicle of any one of aspects 9-11, wherein the total number of electric motor assemblies of the electric engine is an even number.

13. The vehicle of any one of aspects 9-12, wherein the rotatable sub-output shafts of the electric motor assemblies define a ring, and wherein a projection of the ring along the rotatable sub-output shafts encompasses no full electric motor assembly.

14. The vehicle of any one of aspects 9-13, wherein the number of simultaneously activated electric motors is evenly divided among the electric motor assemblies.

15. The vehicle of any one of aspects 9-13, wherein the number of simultaneously activated electric motors is unevenly divided among the electric motor assemblies.

16. The vehicle of aspect 15, wherein the number of simultaneously activated electric motors is distributed among only a subset of the electric motor assemblies.

17. The electric vehicle of any one of aspects 9-16, wherein:
- the gear assembly of each of the electric motor assemblies comprises a ring gear coupled to the adjacent gears; and
- the adjacent gears comprise inner adjacent gears coupled to the ring gear inside a perimeter of the ring gear and one or more outer adjacent gears coupled to the ring gear outside the perimeter of the ring gear.

18. The electric vehicle of aspect 17, wherein:
- each of the electric motor assemblies further comprises a drive plate coupled to the rotatable sub-output shaft;
- the ring gear is coupled to the drive plate; and
- the sub-output gear comprises the ring gear.

19. The electric vehicle of aspect 17 or 18, wherein:
- each of the electric motors is coupled to an outer adjacent gear of the one more outer adjacent gears;
- the gear assembly of each of the electric motor assemblies comprises a sun gear coupled to the inner adjacent gears;
- each of the electric motor assemblies further comprises:
  - an electric motor coupled to the sun gear, and
  - a plate;
- the inner adjacent gears comprise:
  - planetary gears rotatably fixed relative to the plate and coupled to the sun gear; and
- the planetary gears are enmeshed with gear teeth disposed on an inner side of the ring gear.

20. The electric vehicle of aspect 19, wherein:
- each of the electric motor assemblies comprises:
  - a support plate to which the gear assembly is coupled, the plate being rotatably coupled to the support plate, and
  - a clutch to mechanically engage and disengage the electric motor coupled to the sun gear from the ring gear, the clutch selectively securing the plate relative to the support plate,
  - wherein the control system is further configured to mechanically disengage, by operating the clutch, the electric motor coupled to the sun gear from the ring gear in conjunction with the electric motors coupled to the one or more outer adjacent gears being deactivated.

21. The electric vehicle of aspect 19, wherein:
- each of the electric motor assemblies further comprises:
  - a clutch to mechanically engage and disengage the electric motor coupled to the sun gear from the sun gear, the clutch selectively securing the sun gear relative to a shaft of the electric motor coupled to the sun gear,
  - wherein the control system is further configured to mechanically disengage, by operating the clutch, the electric motor coupled to the sun gear from the sun gear in conjunction with the electric motors coupled to the one or more outer adjacent gears being deactivated.

22. An electric motor assembly, comprising:
- a support plate;
- a plate rotatably coupled to the support plate;
- a clutch to selectively secure the plate relative to the support plate; and
- a gear assembly coupled to the support plate, the gear assembly comprising:
  - a sun gear coupled to a rotatable output shaft configured to transfer a torque to an external component,
  - a ring gear, and
  - adjacent gears coupled to the sun gear, the adjacent gears comprising:
    - planetary gears coupled to the sun gear and rotatably fixed relative to the plate, the planetary gears being enmeshed with gear teeth disposed on an inner side of the ring gear; and
  - one or more outer adjacent gears coupled to the ring gear on an outer side of the ring gear; and
- electric motors coupled to the one or more outer adjacent gears and the sun gear;
- the electric motor assembly at least one of comprising or being coupled to a control system configured to:
  - receive a torque need, and
  - cause a number of the electric motors to be simultaneously activated based on the torque need, the number being a maximally efficient number of electric motors for producing the torque need.

23. An electric motor assembly, comprising:
- a gear assembly, comprising:
  - an output gear coupled to a rotatable output shaft configured to transfer a torque to an external component, and
  - adjacent gears coupled to the output gear;
- electric motors coupled to at least one of the adjacent gears or the output gear; and
- a clutch to selectively secure the output gear relative to the rotatable output shaft;
- the electric motor assembly at least one of comprising or being coupled to a control system configured to:
  - receive a torque need; and
  - cause a number of the electric motors to be simultaneously activated based on the torque need, the number being a maximally efficient number of electric motors for producing the torque need.

24. A method of controlling one or more electric engines comprising electric motors, the method comprising:
- receiving, by one or more computer processors, a torque need;
- at least one of receiving or determining, by the one or more computer processors, an output angular velocity of the one or more electric engines;

retrieving, by the one or more computer processors, an efficiency value from each of a plurality of motor efficiency maps based on the torque need and the output angular velocity, each of the plurality of motor efficiency maps corresponding to a unique subset of the electric motors and linking individual torque and angular velocity values to respective efficiency values for the unique subset;

identifying, by the one or more computer processors, a maximum efficiency value of the retrieved efficiency values, the maximum efficiency value corresponding to a maximally efficient subset of the electric motors for producing the torque need at the output angular velocity; and causing, by the one or more computer processors, the maximally efficient subset of the electric motors to be simultaneously activated.

25. A method of controlling the one or more electric engines, comprising dynamically repeating, by the one or more computer processors, the method of aspect 24 at a frequency greater than or equal to 20 times per minute to account for changes in at least one of the torque need or the output angular velocity.

26. The method of aspect 24 or 25, wherein:

each of the plurality of motor efficiency maps comprises a lookup table stored as an indexed array; and retrieving the efficiency value from each of the plurality of motor efficiency maps comprises querying the lookup table of each of the motor efficiency maps, the efficiency value comprising an element of the indexed array indexed under the torque need and the output angular velocity.

27. The method of any one of aspects 24-26, wherein the maximally efficient subset of the electric motors comprises a maximally efficient number of electric motors to be activated.

28. The method of any one of aspects 24-27, wherein the maximally efficient subset of the electric motors comprises a position of electric motors to be activated.

29. The method of any one of aspects 24-28, wherein each of the unique subsets of the electric motors comprises a pair of electric motors arranged on opposite sides of an electric motor assembly of the one or more electric engines.

30. The method of any one of aspects 24-29, wherein the one or more electric engines are installed in an electric vehicle and the torque need is based on a user's operation of the electric vehicle.

31. The method of any one of aspects 24-30, wherein the torque need exceeds a continuous output torque of the maximally efficient subset of the electric motors.

32. The method of any one of aspects 24-31, further comprising receiving, by the one or more computer processors, temperature data for electric motors of the maximally efficient subset.

33. The method of aspect 32, further comprising:

determining, by the one or more computer processors, a temperature of one or more of the electric motors of the maximally efficient subset exceeds a predetermined threshold; and in response to the temperature exceeding the predetermined threshold, activating, by the one or more computer processors, one or more of the electric motors of the one or more electric engines other than those of the maximally efficient subset.

34. A method of generating motor efficiency maps for use in control of one or more electric engines, the method comprising:

selecting a first unique subset of electric motors to be simultaneously activated to produce an output torque at an output angular velocity;

recording a first efficiency of the first unique subset of electric motors in producing the output torque at the output angular velocity;

varying the output torque and the output angular velocity to generate a first motor efficiency map corresponding to the first unique subset and comprising the first efficiency;

selecting a second unique subset of electric motors to be simultaneously activated to produce the output torque at the output angular velocity;

recording a second efficiency of the second unique subset of electric motors in producing the output torque at the output angular velocity; and varying the output torque and the output angular velocity to generate a second motor efficiency map corresponding to the second unique subset and comprising the second efficiency.

35. The method of aspect 34, further comprising encoding the first motor efficiency map and the second motor efficiency map into a first lookup table and a second lookup table, respectively, each of the first and second lookup tables comprising an indexed array that can be queried using a torque need and an output angular velocity as indices to retrieve an efficiency value.

36. The method of aspect 35, further comprising storing the first and second lookup tables in memory of a control system of an electric vehicle.

37. The method of any one of aspects 34-36, wherein recording the first and second efficiencies comprises operating the one or more electric engines or a substantially equivalent one or more electric engines to produce the output torque and the output angular velocity using the first and second unique subsets of electric motors, respectively.

38. The method of any one of aspects 34-37, wherein recording the first and second efficiencies comprises performing simulations of the one or more electric engines or a substantially equivalent one or more electric engines producing the output torque and the output angular velocity using the first and second unique subsets of electric motors, respectively.

39. A method of controlling one or more electric engines comprising electric motors, the method comprising:

receiving, by one or more computer processors, a torque need;

dividing, by the one or more computer processors, the torque need into one or more micro torque needs;

at least one of receiving or determining, by the one or more computer processors, an output angular velocity of an electric motor of the electric motors;

retrieving, by the one or more computer processors, an efficiency value from a motor efficiency map based a micro torque need of the one or more micro torque needs and the output angular velocity, the motor efficiency map corresponding to the electric motor of the electric motors;

determining, by the one or more computer processors based on the efficiency value, a representation of an efficiency of a unique subset of the electric motors comprising the electric motor;

determining, by the one or more computer processors based on the representation, whether the unique subset is a maximally efficient subset of the electric motors for producing the torque need; and in response to determining that the unique subset is the maximally efficient subset, causing, by the one or more computer processors, the unique subset of the electric motors to be simultaneously activated.

40. The method of aspect 39, wherein the one or more micro torque needs are equal.

41. The method of aspect 39, wherein the one or more micro torque needs are unequal.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The term "about" or "substantially" or "approximately" as used herein means the value of a given quantity that can vary based on a particular technology. Based on the particular technology, the term "about" or "substantially" or "approximately" can indicate a value of a given quantity that varies within, for example, 0.1-10% of the value (e.g., ±0.1%, ±1%, ±2%, ±5%, or ±10% of the value).

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. An electric engine comprising:

a plurality of electric motor assemblies, each of the plurality of electric motor assemblies comprising:

a rotatable sub-output shaft configured to transfer a torque to a component external to at least one of the plurality of electric motor assemblies, a gear assembly comprising a sub-output gear and adjacent gears coupled to the sub-output gear, the sub-output gear being coupled to the rotatable sub-output shaft, electric motors, each of the electric motors being coupled to an adjacent gear of the adjacent gears, and a controller to activate and deactivate one or more of the electric motors; and receiving gears, each of the receiving gears being coupled to a rotatable sub-output shaft of an electric motor assembly of the plurality of electric motor assemblies;

an output gear coupled to the receiving gears; and an output shaft coupled to the output gear.

2. The electric engine of claim 1, wherein the output gear comprises a ring gear coupled to the receiving gears, the receiving gears being coupled to the ring gear inside a perimeter of the ring gear.

3. The electric engine of claim 1, wherein the total number of electric motor assemblies of the electric engine is an even number.

4. The electric engine of claim 1, wherein the rotatable sub-output shafts of the plurality of electric motor assemblies define a ring, and wherein a projection of the ring along the rotatable sub-output shafts encompasses no full electric motor assembly.

5. An electric engine, comprising:

a plurality of electric motor assemblies, each of the plurality of electric motor assemblies comprising:

a rotatable sub-output shaft configured to transfer a torque to a component external to at least one of the plurality of electric motor assemblies, a drive plate coupled to the rotatable sub-output shaft, a gear assembly comprising:

a ring gear coupled to the drive plate; and adjacent gears coupled to the ring gear, the adjacent gears comprising inner adjacent gears coupled to the ring gear inside a perimeter of the ring gear and one or more outer adjacent gears coupled to the ring gear outside the perimeter of the ring gear, electric motors, each of the electric motors being coupled to an adjacent gear of the adjacent gears, and a controller to activate and deactivate one or more of the electric motors;

receiving gears, each of the receiving gears being coupled to a rotatable sub-output shaft of an electric motor assembly of the plurality of electric motor assemblies;

an output gear coupled to the receiving gears; and an output shaft coupled to the output gear.

6. The electric engine of claim 5, wherein the output gear comprises a ring gear coupled to the receiving gears, the receiving gears being coupled to the ring gear inside a perimeter of the ring gear.

7. The electric engine of claim 5, wherein the total number of electric motor assemblies of the electric engine is an even number.

8. The electric engine of claim 5, wherein the rotatable sub-output shafts of the plurality of electric motor assemblies define a ring, and wherein a projection of the ring along the rotatable sub-output shafts encompasses no full electric motor assembly.

9. A vehicle comprising:

an electric drive system comprising:

an electric engine comprising:

a plurality of electric motor assemblies, each of the plurality of electric motor assemblies comprising:

a rotatable sub-output shaft configured to transfer a torque to a component external to at least one of the plurality of electric motor assemblies,
a gear assembly comprising a sub-output gear and adjacent gears coupled to the sub-output gear, the sub-output gear being coupled to the rotatable sub-output shaft, and
electric motors, each of the electric motors being coupled to an adjacent gear of the adjacent gears;
receiving gears, each of the receiving gears being coupled to a rotatable sub-output shaft of an electric motor assembly of the plurality of electric motor assemblies;
an output gear coupled to the receiving gears; and
an output shaft coupled to the output gear,
a control system to selectively activate and deactivate the electric motors of each of the plurality of electric motor assemblies,
an energy storage system coupled to the plurality of electric motor assemblies, and
a torque demand system to communicate a torque need to the control system, the control system being configured to cause a number of a total number of electric motors of all the plurality of electric motor assemblies to be simultaneously activated, the number of simultaneously activated electric motors depending on the torque need.

10. The vehicle of claim 9, wherein the number of simultaneously activated electric motors of the total number is a maximally efficient number of electric motors for producing the torque need.

11. The vehicle of claim 9, wherein the output gear comprises a ring gear coupled to the receiving gears, the receiving gears being coupled to the ring gear inside a perimeter of the ring gear.

12. The vehicle of claim 9, wherein the total number of electric motor assemblies of the electric engine is an even number.

13. The vehicle of claim 9, wherein the rotatable sub-output shafts of the plurality of electric motor assemblies define a ring, and wherein a projection of the ring along the rotatable sub-output shafts encompasses no full electric motor assembly.

14. The vehicle of claim 9, wherein the number of simultaneously activated electric motors is evenly divided among the plurality of electric motor assemblies.

15. The vehicle of claim 9, wherein the number of simultaneously activated electric motors is unevenly divided among the plurality of electric motor assemblies.

16. The vehicle of claim 15, wherein the number of simultaneously activated electric motors is distributed among only a subset of the plurality of electric motor assemblies.

17. The vehicle of claim 9, wherein:
the gear assembly of each of the plurality of electric motor assemblies comprises a ring gear coupled to the adjacent gears; and
the adjacent gears comprise inner adjacent gears coupled to the ring gear inside a perimeter of the ring gear and one or more outer adjacent gears coupled to the ring gear outside the perimeter of the ring gear.

18. The vehicle of claim 17, wherein:
each of the plurality of electric motor assemblies further comprises a drive plate coupled to the rotatable sub-output shaft;
the ring gear is coupled to the drive plate; and
the sub-output gear comprises the ring gear.

19. The vehicle of claim 17, wherein:
each of the electric motors coupled to an adjacent gear of the adjacent gears is coupled to an outer adjacent gear of the one or more outer adjacent gears;
the gear assembly of each of the plurality of electric motor assemblies comprises a sun gear coupled to the inner adjacent gears;
each of the plurality of electric motor assemblies further comprises:
an electric motor coupled to the sun gear, and
a plate;
the inner adjacent gears comprise:
planetary gears rotatably fixed relative to the plate and coupled to the sun gear; and
the planetary gears are enmeshed with gear teeth disposed on an inner side of the ring gear.

20. The vehicle of claim 19, wherein:
each of the plurality of electric motor assemblies comprises:
a support plate to which the gear assembly is coupled, the plate being rotatably coupled to the support plate, and
a clutch to mechanically engage and disengage the electric motor coupled to the sun gear from the ring gear, the clutch selectively securing the plate relative to the support plate,
wherein the control system is further configured to mechanically disengage, by operating the clutch, the electric motor coupled to the sun gear from the ring gear in conjunction with the electric motors coupled to the one or more outer adjacent gears being deactivated.

21. The vehicle of claim 19, wherein:
each of the plurality of electric motor assemblies further comprises:
a clutch to mechanically engage and disengage the electric motor coupled to the sun gear from the sun gear, the clutch selectively securing the sun gear relative to a shaft of the electric motor coupled to the sun gear,
wherein the control system is further configured to mechanically disengage, by operating the clutch, the electric motor coupled to the sun gear from the sun gear in conjunction with the electric motors coupled to the one or more outer adjacent gears being deactivated.

* * * * *